US012680961B2

(12) United States Patent
Helmerich et al.

(10) Patent No.: US 12,680,961 B2
(45) Date of Patent: Jul. 14, 2026

(54) SUB-10 NANOMETER FLUORESCENCE IMAGING

(71) Applicant: Julius-Maximilians-Universität Würzburg, Würzburg (DE)

(72) Inventors: Dominic Helmerich, Würzburg (DE); Gerti Beliu, Würzburg (DE); Soren Doose, Würzburg (DE); Markus Sauer, Würzburg (DE)

(73) Assignee: Julius-Maximilians-Universität Würzburg, Würzburg (DE)

( * ) Notice: Subject to any disclaimer, the term of this patent is extended or adjusted under 35 U.S.C. 154(b) by 57 days.

(21) Appl. No.: 18/835,837

(22) PCT Filed: Feb. 4, 2023

(86) PCT No.: PCT/EP2023/052746
§ 371 (c)(1),
(2) Date: Aug. 5, 2024

(87) PCT Pub. No.: WO2023/148359
PCT Pub. Date: Aug. 10, 2023

(65) Prior Publication Data
US 2025/0327751 A1      Oct. 23, 2025

Related U.S. Application Data

(60) Provisional application No. 63/267,556, filed on Feb. 4, 2022.

(51) Int. Cl.
*G01N 21/64* (2006.01)
*G02B 21/00* (2006.01)
(52) U.S. Cl.
CPC ..... *G01N 21/6458* (2013.01); *G01N 21/6402* (2013.01); *G01N 21/6428* (2013.01);
(Continued)

(58) Field of Classification Search
CPC ........... G01N 21/6458; G01N 21/6402; G01N 21/6428; G01N 2021/6441; G01N 2201/0612; G02B 21/0076
See application file for complete search history.

(56) References Cited

U.S. PATENT DOCUMENTS

2016/0069903 A1      3/2016  Lakadamyali et al.
2025/0085210 A1*     3/2025  Pertsinidis ......... G01N 21/6458

FOREIGN PATENT DOCUMENTS

WO         2020/198750 A1    10/2020

OTHER PUBLICATIONS

Blom et al., "Stimulated Emission Depletion Microscopy," 2017, Chemical Reviews, vol. 117, No. 11, pp. 7377-7427, XP055710257.
(Continued)

*Primary Examiner* — Jamil Ahmed
(74) *Attorney, Agent, or Firm* — Chiesa Shahinian & Giantomasi PC

(57) ABSTRACT

The disclosure includes a system and method for imaging cells. The method includes: labeling transfected one or more cells with a dye; exciting the dye with an energy source, wherein the dye is configured to emit an emission light; imaging one or more portions of the transfected one or more cells with a sensor, for a predetermined exposure time, a plurality of times to form a plurality of images; classifying each image of the plurality of images into a first group of images above a predetermined threshold for a number of photons per image or a second group of images below the predetermined threshold the number of photons per image; and determining whether the emission energy is from one or more independently emitting quantum systems based on the measured emission, the tracked locations of the one or more portions and the fluorescence trajectory.

18 Claims, 24 Drawing Sheets

Specification includes a Sequence Listing.

(52) U.S. Cl.
CPC . *G02B 21/0076* (2013.01); *G01N 2021/6441*
(2013.01); *G01N 2201/0612* (2013.01)

(56) References Cited

OTHER PUBLICATIONS

Neubert et al., "Bioorthogonal Click Chemistry Enables Site-specific Fluorescence Labeling of Functional NMDA Receptors for Super-Resolution Imaging," 2018, Angewandte Chemire International Edition, vol. 57, No. 50, pp. 16364-16369, XP072103699.
Helmerich et al., "Photoswitching fingerprint analysis bypasses the 10-nm resolution barrier," 2022, Nature Methods, Nature Publishing Group, vol. 19, No. 8, pp. 986-994, XP037921618.
International Search Report and Written Opinion mailed Apr. 25, 2023, in connection with International Patent Application No. PCT/EP2023/052746, 1 pgs.
Almahayni et al., "Fluorophores' talk turns them dark," 2022, Nature Methods, vol. 19, pp. 932-933.

\* cited by examiner 18 nm origami

A

B

```
                        SEQUENCE LISTING

Sequence total quantity: 210
SEQ ID NO: 1            moltype = DNA  length = 40
FEATURE                Location/Qualifiers
source                 1..40
                       mol_type = other DNA
                       organism = Synthetic construct
SEQUENCE: 1
cgaattcgcc gggtaccgat agcatgtcaa tctacctcga                    40

SEQ ID NO: 2            moltype = DNA  length = 40
FEATURE                Location/Qualifiers
source                 1..40
                       mol_type = other DNA
                       organism = synthetic construct
SEQUENCE: 2
gtggatgttc ttctaagtgg ttgtatatcc cataatcggc                    40

SEQ ID NO: 3            moltype = DNA  length = 40
FEATURE                Location/Qualifiers
source                 1..40
                       mol_type = other DNA
                       organism = Synthetic construct
SEQUENCE: 3
tataactact taggttgggc acaagaattg agagagacta                    40

SEQ ID NO: 4            moltype = DNA  length = 40
FEATURE                Location/Qualifiers
source                 1..40
                       mol_type = other DNA
                       organism = Synthetic construct
SEQUENCE: 4
gtgagtgaat aaatcaatag aaacgtcacc aatacctttt                    40

SEQ ID NO: 5            moltype = DNA  length = 30
FEATURE                Location/Qualifiers
source                 1..30
                       mol_type = other DNA
                       organism = Synthetic construct
SEQUENCE: 5
ataaatcaag tacctttaat tgctttcggt                               30
```

```
SEQ ID NO: 6            moltype = DNA   length = 32
FEATURE                Location/Qualifiers
source                 1..32
                       mol_type = other DNA
                       organism = Synthetic construct
SEQUENCE: 6
atggtggtag aatagcccga gatacctgtt tg                                    32

SEQ ID NO: 7            moltype = DNA   length = 24
FEATURE                Location/Qualifiers
source                 1..24
                       mol_type = other DNA
                       organism = Synthetic construct
SEQUENCE: 7
aactggctca ttatacaatc aggt                                             24

SEQ ID NO: 8            moltype = DNA   length = 19
FEATURE                Location/Qualifiers
source                 1..19
                       mol_type = other DNA
                       organism = Synthetic construct
SEQUENCE: 8
catagtaaag tattaagag                                                   19

SEQ ID NO: 9            moltype = DNA   length = 24
FEATURE                Location/Qualifiers
source                 1..24
                       mol_type = other DNA
                       organism = Synthetic construct
SEQUENCE: 9
gacgacaata aacaacgagc cagt                                             24

SEQ ID NO: 10           moltype = DNA   length = 40
FEATURE                Location/Qualifiers
source                 1..40
                       mol_type = other DNA
                       organism = Synthetic construct
SEQUENCE: 10
aatactgcaa acgagaatca ccggaaccag agtataacag                           40

SEQ ID NO: 11           moltype = DNA   length = 24
FEATURE                Location/Qualifiers
source                 1..24
                       mol_type = other DNA
                       organism = Synthetic construct
SEQUENCE: 11
attaaagaac gtggactccc ttat                                             24

SEQ ID NO: 12           moltype = DNA   length = 40
FEATURE                Location/Qualifiers
source                 1..40
                       mol_type = other DNA
                       organism = Synthetic construct
SEQUENCE: 12
gactcctcac agttaaaaga aaaatctacg ttagttcaga                           40

SEQ ID NO: 13           moltype = DNA   length = 32
FEATURE                Location/Qualifiers
source                 1..32
                       mol_type = other DNA
                       organism = Synthetic construct
SEQUENCE: 13
ggaggtttcg taacgatcta aagttttgtt aa                                   32

SEQ ID NO: 14           moltype = DNA   length = 32
FEATURE                Location/Qualifiers
source                 1..32
                       mol_type = other DNA
                       organism = Synthetic construct
SEQUENCE: 14
gtaccaaaga tgaacggtaa tcgtaaaacg ct                                   32

SEQ ID NO: 15           moltype = DNA   length = 32
FEATURE                Location/Qualifiers
source                 1..32
                       mol_type = other DNA
                       organism = Synthetic construct
SEQUENCE: 15
gagcaacact atcatataat agtactttac cc                                   32
```

-continued

```
SEQ ID NO: 16            moltype = DNA   length = 24
FEATURE                 Location/Qualifiers
source                  1..24
                        mol_type = other DNA
                        organism = Synthetic construct
SEQUENCE: 16
caaatccaat cgcaagtagg tctg                                       24

SEQ ID NO: 17            moltype = DNA   length = 21
FEATURE                 Location/Qualifiers
source                  1..21
                        mol_type = other DNA
                        organism = Synthetic construct
SEQUENCE: 17
gctgacatta cccgctggct g                                          21

SEQ ID NO: 18            moltype = DNA   length = 32
FEATURE                 Location/Qualifiers
source                  1..32
                        mol_type = other DNA
                        organism = Synthetic construct
SEQUENCE: 18
tattctaagc taatatcaga gagataacct ta                              32

SEQ ID NO: 19            moltype = DNA   length = 24
FEATURE                 Location/Qualifiers
source                  1..24
                        mol_type = other DNA
                        organism = Synthetic construct
SEQUENCE: 19
aagagaagat aacgccaaaa ggaa                                       24

SEQ ID NO: 20            moltype = DNA   length = 40
FEATURE                 Location/Qualifiers
source                  1..40
                        mol_type = other DNA
                        organism = Synthetic construct
SEQUENCE: 20
cagtaccatt aggaatacca cattatctga caggaggttg                      40

SEQ ID NO: 21            moltype = DNA   length = 20
FEATURE                 Location/Qualifiers
source                  1..20
                        mol_type = other DNA
                        organism = Synthetic construct
SEQUENCE: 21
cagtatgttt tttgagagat                                            20

SEQ ID NO: 22            moltype = DNA   length = 40
FEATURE                 Location/Qualifiers
source                  1..40
                        mol_type = other DNA
                        organism = Synthetic construct
SEQUENCE: 22
agacttttgg ctacagcagc atcggaacga ggtccaacgt                      40

SEQ ID NO: 23            moltype = DNA   length = 24
FEATURE                 Location/Qualifiers
source                  1..24
                        mol_type = other DNA
                        organism = Synthetic construct
SEQUENCE: 23
ctccctcaga gccgccacta aagt                                       24

SEQ ID NO: 24            moltype = DNA   length = 32
FEATURE                 Location/Qualifiers
source                  1..32
                        mol_type = other DNA
                        organism = Synthetic construct
SEQUENCE: 24
ttcaggtttt tacatcggga gaaacgtaga tt                              32

SEQ ID NO: 25            moltype = DNA   length = 40
FEATURE                 Location/Qualifiers
source                  1..40
                        mol_type = other DNA
                        organism = Synthetic construct
SEQUENCE: 25
```

-continued

```
aaacatcaga agatgatgaa gccagaatgg aattcatttc                            40

SEQ ID NO: 26           moltype = DNA   length = 32
FEATURE                 Location/Qualifiers
source                  1..32
                        mol_type = other DNA
                        organism = Synthetic construct
SEQUENCE: 26
ttgggcttcg acgataaaaa ccaaaataga cc                                    32

SEQ ID NO: 27           moltype = DNA   length = 40
FEATURE                 Location/Qualifiers
source                  1..40
                        mol_type = other DNA
                        organism = Synthetic construct
SEQUENCE: 27
tcatgaggaa ttcgacaact cgtattaaat ccgcgaaaga                            40

SEQ ID NO: 28           moltype = DNA   length = 24
FEATURE                 Location/Qualifiers
source                  1..24
                        mol_type = other DNA
                        organism = Synthetic construct
SEQUENCE: 28
gtgcatctct gaacaagaaa aata                                             24

SEQ ID NO: 29           moltype = DNA   length = 24
FEATURE                 Location/Qualifiers
source                  1..24
                        mol_type = other DNA
                        organism = Synthetic construct
SEQUENCE: 29
ccaaaaggag cctttacatg ttac                                             24

SEQ ID NO: 30           moltype = DNA   length = 24
FEATURE                 Location/Qualifiers
source                  1..24
                        mol_type = other DNA
                        organism = Synthetic construct
SEQUENCE: 30
acaaaatcgc gcagagtaca gtaa                                             24

SEQ ID NO: 31           moltype = DNA   length = 40
FEATURE                 Location/Qualifiers
source                  1..40
                        mol_type = other DNA
                        organism = Synthetic construct
SEQUENCE: 31
gaaccgcccg taacactgta gcattcatcg ccgaatttct                            40

SEQ ID NO: 32           moltype = DNA   length = 40
FEATURE                 Location/Qualifiers
source                  1..40
                        mol_type = other DNA
                        organism = Synthetic construct
SEQUENCE: 32
aagtgtaaga gccggaagca gctaaatcgg ttcgctcaca                            40

SEQ ID NO: 33           moltype = DNA   length = 24
FEATURE                 Location/Qualifiers
source                  1..24
                        mol_type = other DNA
                        organism = Synthetic construct
SEQUENCE: 33
taagaggtta atagtagtag catt                                             24

SEQ ID NO: 34           moltype = DNA   length = 22
FEATURE                 Location/Qualifiers
source                  1..22
                        mol_type = other DNA
                        organism = Synthetic construct
SEQUENCE: 34
ggaaggtaaa tattaccatt tt                                               22

SEQ ID NO: 35           moltype = DNA   length = 40
FEATURE                 Location/Qualifiers
source                  1..40
                        mol_type = other DNA
                        organism = Synthetic construct
```

-continued

```
SEQUENCE: 35
caaaagaatc aaatatcgcg ttttaattcc cttaatgaat                                40

SEQ ID NO: 36           moltype = DNA   length = 40
FEATURE                 Location/Qualifiers
source                  1..40
                        mol_type = other DNA
                        organism = Synthetic construct
SEQUENCE: 36
tttgcccgtt ttcacgagga ctaagaaaga ggaagggaac                                40

SEQ ID NO: 37           moltype = DNA   length = 32
FEATURE                 Location/Qualifiers
source                  1..32
                        mol_type = other DNA
                        organism = Synthetic construct
SEQUENCE: 37
tttaccagcg ccaaagacgc aaagaagccc tt                                        32

SEQ ID NO: 38           moltype = DNA   length = 38
FEATURE                 Location/Qualifiers
source                  1..38
                        mol_type = other DNA
                        organism = Synthetic construct
SEQUENCE: 38
caaaagaagt aacaaagctg ctcactctga aacatgaa                                  38

SEQ ID NO: 39           moltype = DNA   length = 40
FEATURE                 Location/Qualifiers
source                  1..40
                        mol_type = other DNA
                        organism = Synthetic construct
SEQUENCE: 39
aagacgctcg atagcttaga tcaatagaaa atcccttaga                                40

SEQ ID NO: 40           moltype = DNA   length = 24
FEATURE                 Location/Qualifiers
source                  1..24
                        mol_type = other DNA
                        organism = Synthetic construct
SEQUENCE: 40
tacatttaac aatttcgcga atta                                                 24

SEQ ID NO: 41           moltype = DNA   length = 40
FEATURE                 Location/Qualifiers
source                  1..40
                        mol_type = other DNA
                        organism = Synthetic construct
SEQUENCE: 41
atagttagag taccgccacc ctcacgagag ggtacaggag                                40

SEQ ID NO: 42           moltype = DNA   length = 40
FEATURE                 Location/Qualifiers
source                  1..40
                        mol_type = other DNA
                        organism = Synthetic construct
SEQUENCE: 42
aaccagacca ataaagcctc agagcataaa tagtgcctaa                                40

SEQ ID NO: 43           moltype = DNA   length = 24
FEATURE                 Location/Qualifiers
source                  1..24
                        mol_type = other DNA
                        organism = Synthetic construct
SEQUENCE: 43
agccgttttt attttcttct tacc                                                 24

SEQ ID NO: 44           moltype = DNA   length = 40
FEATURE                 Location/Qualifiers
source                  1..40
                        mol_type = other DNA
                        organism = Synthetic construct
SEQUENCE: 44
gaacaaacag ggtttttccca gtcacgacgt cttgggcacg                               40

SEQ ID NO: 45           moltype = DNA   length = 32
FEATURE                 Location/Qualifiers
source                  1..32
                        mol_type = other DNA
```

-continued

```
                                    organism = Synthetic construct
SEQUENCE: 45
ttgaggattt agaagtatta gactcaaagg gc                                      32

SEQ ID NO: 46          moltype = DNA   length = 20
FEATURE                Location/Qualifiers
source                 1..20
                       mol_type = other DNA
                       organism = Synthetic construct
SEQUENCE: 46
gcacccagct acgcgtcttt                                                    20

SEQ ID NO: 47          moltype = DNA   length = 24
FEATURE                Location/Qualifiers
source                 1..24
                       mol_type = other DNA
                       organism = Synthetic construct
SEQUENCE: 47
cccttcaccg cctggcagag gcgg                                               24

SEQ ID NO: 48          moltype = DNA   length = 20
FEATURE                Location/Qualifiers
source                 1..20
                       mol_type = other DNA
                       organism = Synthetic construct
SEQUENCE: 48
aagcattaga ccggagaggg                                                    20

SEQ ID NO: 49          moltype = DNA   length = 48
FEATURE                Location/Qualifiers
source                 1..48
                       mol_type = other DNA
                       organism = Synthetic construct
SEQUENCE: 49
tgtttcctgt gtgaaagtgc ttgtatatgt acgtgagcga gtaacaac                    48

SEQ ID NO: 50          moltype = DNA   length = 24
FEATURE                Location/Qualifiers
source                 1..24
                       mol_type = other DNA
                       organism = Synthetic construct
SEQUENCE: 50
ccccagcgac aagaaccgga tatt                                               24

SEQ ID NO: 51          moltype = DNA   length = 24
FEATURE                Location/Qualifiers
source                 1..24
                       mol_type = other DNA
                       organism = Synthetic construct
SEQUENCE: 51
gtcacgttta cgagcaaagg cgat                                               24

SEQ ID NO: 52          moltype = DNA   length = 27
FEATURE                Location/Qualifiers
source                 1..27
                       mol_type = other DNA
                       organism = Synthetic construct
SEQUENCE: 52
gtttagctat attttcgaag agaagcc                                            27

SEQ ID NO: 53          moltype = DNA   length = 24
FEATURE                Location/Qualifiers
source                 1..24
                       mol_type = other DNA
                       organism = Synthetic construct
SEQUENCE: 53
caaaaacacc tgaatcagcc agct                                               24

SEQ ID NO: 54          moltype = DNA   length = 24
FEATURE                Location/Qualifiers
source                 1..24
                       mol_type = other DNA
                       organism = Synthetic construct
SEQUENCE: 54
ctaatgcatc aggaagatcg cact                                               24

SEQ ID NO: 55          moltype = DNA   length = 32
FEATURE                Location/Qualifiers
source                 1..32
```

-continued

```
                          mol_type = other DNA
                          organism = Synthetic construct
SEQUENCE: 55
actacgaatg ccctgacgag aaacaccagc ag                          32

SEQ ID NO: 56            moltype = DNA   length = 24
FEATURE                  Location/Qualifiers
source                   1..24
                          mol_type = other DNA
                          organism = Synthetic construct
SEQUENCE: 56
ggaatcgtcg ttttcatcgg catt                                   24

SEQ ID NO: 57            moltype = DNA   length = 24
FEATURE                  Location/Qualifiers
source                   1..24
                          mol_type = other DNA
                          organism = Synthetic construct
SEQUENCE: 57
ttgataccga tagttgtaca aact                                    24

SEQ ID NO: 58            moltype = DNA   length = 25
FEATURE                  Location/Qualifiers
source                   1..25
                          mol_type = other DNA
                          organism = Synthetic construct
SEQUENCE: 58
ttaccagaga gatggtttaa tttca                                   25

SEQ ID NO: 59            moltype = DNA   length = 32
FEATURE                  Location/Qualifiers
source                   1..32
                          mol_type = other DNA
                          organism = Synthetic construct
SEQUENCE: 59
taattgctca accgattgag ggagtacata ca                          32

SEQ ID NO: 60            moltype = DNA   length = 32
FEATURE                  Location/Qualifiers
source                   1..32
                          mol_type = other DNA
                          organism = Synthetic construct
SEQUENCE: 60
gccaccaccc tcattgatta taccaagcgc ga                          32

SEQ ID NO: 61            moltype = DNA   length = 22
FEATURE                  Location/Qualifiers
source                   1..22
                          mol_type = other DNA
                          organism = Synthetic construct
SEQUENCE: 61
gtagcgcata aatattcatt ga                                     22

SEQ ID NO: 62            moltype = DNA   length = 27
FEATURE                  Location/Qualifiers
source                   1..27
                          mol_type = other DNA
                          organism = Synthetic construct
SEQUENCE: 62
tcattaaagg tgaattagat agccgaa                                27

SEQ ID NO: 63            moltype = DNA   length = 24
FEATURE                  Location/Qualifiers
source                   1..24
                          mol_type = other DNA
                          organism = Synthetic construct
SEQUENCE: 63
tcccgactac accctgaaca aagt                                    24

SEQ ID NO: 64            moltype = DNA   length = 40
FEATURE                  Location/Qualifiers
source                   1..40
                          mol_type = other DNA
                          organism = Synthetic construct
SEQUENCE: 64
gcgaaaatgt ttgccccaga acgagtagta aaagttgcag                  40

SEQ ID NO: 65            moltype = DNA   length = 32
FEATURE                  Location/Qualifiers
```

-continued

```
source                 1..32
                       mol_type = other DNA
                       organism = Synthetic construct
SEQUENCE: 65
gtcatagcat tccacacaac atactaatca tg                             32

SEQ ID NO: 66          moltype = DNA  length = 32
FEATURE                Location/Qualifiers
source                 1..32
                       mol_type = other DNA
                       organism = Synthetic construct
SEQUENCE: 66
agtaacatag gaacaactaa aggatctttg ac                             32

SEQ ID NO: 67          moltype = DNA  length = 32
FEATURE                Location/Qualifiers
source                 1..32
                       mol_type = other DNA
                       organism = Synthetic construct
SEQUENCE: 67
ttacaaacaa gtttccatta aacgggtaat gt                             32

SEQ ID NO: 68          moltype = DNA  length = 24
FEATURE                Location/Qualifiers
source                 1..24
                       mol_type = other DNA
                       organism = Synthetic construct
SEQUENCE: 68
aatatagggg ccttgacgcc ctgg                                      24

SEQ ID NO: 69          moltype = DNA  length = 24
FEATURE                Location/Qualifiers
source                 1..24
                       mol_type = other DNA
                       organism = Synthetic construct
SEQUENCE: 69
aggctttgtt gaaaattcaa tcat                                      24

SEQ ID NO: 70          moltype = DNA  length = 32
FEATURE                Location/Qualifiers
source                 1..32
                       mol_type = other DNA
                       organism = Synthetic construct
SEQUENCE: 70
caattctgcg aacgagtctt ttcataatca aa                             32

SEQ ID NO: 71          moltype = DNA  length = 32
FEATURE                Location/Qualifiers
source                 1..32
                       mol_type = other DNA
                       organism = Synthetic construct
SEQUENCE: 71
aaacgacgag tgactctatg ataccgacag tg                             32

SEQ ID NO: 72          moltype = DNA  length = 24
FEATURE                Location/Qualifiers
source                 1..24
                       mol_type = other DNA
                       organism = Synthetic construct
SEQUENCE: 72
agctttccgg caccgcccaa tcca                                      24

SEQ ID NO: 73          moltype = DNA  length = 24
FEATURE                Location/Qualifiers
source                 1..24
                       mol_type = other DNA
                       organism = Synthetic construct
SEQUENCE: 73
aatccgcgac ctgctcattg tatc                                      24

SEQ ID NO: 74          moltype = DNA  length = 48
FEATURE                Location/Qualifiers
source                 1..48
                       mol_type = other DNA
                       organism = Synthetic construct
SEQUENCE: 74
caactaatga actaacccct gagtaacagt gcatcttttc agggatag            48

SEQ ID NO: 75          moltype = DNA  length = 40
```

-continued

```
FEATURE             Location/Qualifiers
source              1..40
                    mol_type = other DNA
                    organism = Synthetic construct
SEQUENCE: 75
agtgagactt tttctttttcc gagaggcttt tgtttgcgta                        40

SEQ ID NO: 76       moltype = DNA   length = 24
FEATURE             Location/Qualifiers
source              1..24
                    mol_type = other DNA
                    organism = Synthetic construct
SEQUENCE: 76
aaatgttttt attagcgatt aaga                                          24

SEQ ID NO: 77       moltype = DNA   length = 23
FEATURE             Location/Qualifiers
source              1..23
                    mol_type = other DNA
                    organism = Synthetic construct
SEQUENCE: 77
tccaagaaga taagtcgcca gtt                                           23

SEQ ID NO: 78       moltype = DNA   length = 24
FEATURE             Location/Qualifiers
source              1..24
                    mol_type = other DNA
                    organism = Synthetic construct
SEQUENCE: 78
tatcggccga acgcgcctgt ttat                                          24

SEQ ID NO: 79       moltype = DNA   length = 24
FEATURE             Location/Qualifiers
source              1..24
                    mol_type = other DNA
                    organism = Synthetic construct
SEQUENCE: 79
tgccccctgc ctatttgcgc atag                                          24

SEQ ID NO: 80       moltype = DNA   length = 40
FEATURE             Location/Qualifiers
source              1..40
                    mol_type = other DNA
                    organism = Synthetic construct
SEQUENCE: 80
gccagtgcca agctttctca ggagtaagtt ggaaggggga                         40

SEQ ID NO: 81       moltype = DNA   length = 32
FEATURE             Location/Qualifiers
source              1..32
                    mol_type = other DNA
                    organism = Synthetic construct
SEQUENCE: 81
acgatttttt gtttaaatcg taggaatcag cc                                 32

SEQ ID NO: 82       moltype = DNA   length = 18
FEATURE             Location/Qualifiers
source              1..18
                    mol_type = other DNA
                    organism = Synthetic construct
SEQUENCE: 82
agtaccgcac agggctta                                                 18

SEQ ID NO: 83       moltype = DNA   length = 40
FEATURE             Location/Qualifiers
source              1..40
                    mol_type = other DNA
                    organism = Synthetic construct
SEQUENCE: 83
tgggataggc gggccttgtg ctgctgtaga aacaaaataa                         40

SEQ ID NO: 84       moltype = DNA   length = 32
FEATURE             Location/Qualifiers
source              1..32
                    mol_type = other DNA
                    organism = Synthetic construct
SEQUENCE: 84
taccatatct gaataatgga agggcgccga ca                                 32
```

-continued

```
SEQ ID NO: 85            moltype = DNA  length = 24
FEATURE                  Location/Qualifiers
source                   1..24
                         mol_type = other DNA
                         organism = Synthetic construct
SEQUENCE: 85
gggcttaagc tacgtgatcg gctg                                              24

SEQ ID NO: 86            moltype = DNA  length = 40
FEATURE                  Location/Qualifiers
source                   1..40
                         mol_type = other DNA
                         organism = Synthetic construct
SEQUENCE: 86
ggattttgta aacagcaacc atcgcccacg cataaccgat                             40

SEQ ID NO: 87            moltype = DNA  length = 40
FEATURE                  Location/Qualifiers
source                   1..40
                         mol_type = other DNA
                         organism = Synthetic construct
SEQUENCE: 87
aaatatttgc attaaaccag agcctaattt gccgccattc                             40

SEQ ID NO: 88            moltype = DNA  length = 32
FEATURE                  Location/Qualifiers
source                   1..32
                         mol_type = other DNA
                         organism = Synthetic construct
SEQUENCE: 88
gcttctgtat ccttgaaaac atagataacc tt                                     32

SEQ ID NO: 89            moltype = DNA  length = 40
FEATURE                  Location/Qualifiers
source                   1..40
                         mol_type = other DNA
                         organism = Synthetic construct
SEQUENCE: 89
taaaggtgag ctgataaatt aatgcgggag aaataaaaac                             40

SEQ ID NO: 90            moltype = DNA  length = 40
FEATURE                  Location/Qualifiers
source                   1..40
                         mol_type = other DNA
                         organism = Synthetic construct
SEQUENCE: 90
gtaacgccgg cggattgacc gtaattcatc aacgtctggc                             40

SEQ ID NO: 91            moltype = DNA  length = 40
FEATURE                  Location/Qualifiers
source                   1..40
                         mol_type = other DNA
                         organism = Synthetic construct
SEQUENCE: 91
tgtaatttag gcagaggcat tttcatgttc agaacaagca                             40

SEQ ID NO: 92            moltype = DNA  length = 48
FEATURE                  Location/Qualifiers
source                   1..48
                         mol_type = other DNA
                         organism = Synthetic construct
SEQUENCE: 92
cacataaatc atttctctcg tcgggtaagc aacggccctg ccattgta                    48

SEQ ID NO: 93            moltype = DNA  length = 40
FEATURE                  Location/Qualifiers
source                   1..40
                         mol_type = other DNA
                         organism = Synthetic construct
SEQUENCE: 93
gaattcatgt caaccttatg acaatgtccc gcccaatcaa                             40

SEQ ID NO: 94            moltype = DNA  length = 24
FEATURE                  Location/Qualifiers
source                   1..24
                         mol_type = other DNA
                         organism = Synthetic construct
SEQUENCE: 94
gcgacagaag gcaggtcaga cgat                                              24
```

```
SEQ ID NO: 95            moltype = DNA   length = 32
FEATURE                  Location/Qualifiers
source                   1..32
                         mol_type = other DNA
                         organism = Synthetic construct
SEQUENCE: 95
ccacatcagt tgagatggcg gataagtgcc gt                                      32

SEQ ID NO: 96            moltype = DNA   length = 32
FEATURE                  Location/Qualifiers
source                   1..32
                         mol_type = other DNA
                         organism = Synthetic construct
SEQUENCE: 96
aaataaacag ggaagctatt ttgtaagggt ga                                      32

SEQ ID NO: 97            moltype = DNA   length = 40
FEATURE                  Location/Qualifiers
source                   1..40
                         mol_type = other DNA
                         organism = Synthetic construct
SEQUENCE: 97
gaaagactgt tttgccagag ggggaccctc gtattttaag                              40

SEQ ID NO: 98            moltype = DNA   length = 40
FEATURE                  Location/Qualifiers
source                   1..40
                         mol_type = other DNA
                         organism = Synthetic construct
SEQUENCE: 98
atattcactc gatagcagca ccgtctcatc accagtagca                              40

SEQ ID NO: 99            moltype = DNA   length = 32
FEATURE                  Location/Qualifiers
source                   1..32
                         mol_type = other DNA
                         organism = Synthetic construct
SEQUENCE: 99
taaccaatct tcctgtttac caaccgatcg gt                                      32

SEQ ID NO: 100           moltype = DNA   length = 32
FEATURE                  Location/Qualifiers
source                   1..32
                         mol_type = other DNA
                         organism = Synthetic construct
SEQUENCE: 100
agcgcagtag tatagcccgg aataggtgtt cg                                      32

SEQ ID NO: 101           moltype = DNA   length = 40
FEATURE                  Location/Qualifiers
source                   1..40
                         mol_type = other DNA
                         organism = Synthetic construct
SEQUENCE: 101
ccatcaatat gataatttta agaaaagtaa gcatcaccgt                              40

SEQ ID NO: 102           moltype = DNA   length = 24
FEATURE                  Location/Qualifiers
source                   1..24
                         mol_type = other DNA
                         organism = Synthetic construct
SEQUENCE: 102
accctcagga tttgtatcca caga                                               24

SEQ ID NO: 103           moltype = DNA   length = 40
FEATURE                  Location/Qualifiers
source                   1..40
                         mol_type = other DNA
                         organism = Synthetic construct
SEQUENCE: 103
atcttctgtt ttagttaata aggcttatcc ggcgcgagaa                              40

SEQ ID NO: 104           moltype = DNA   length = 24
FEATURE                  Location/Qualifiers
source                   1..24
                         mol_type = other DNA
                         organism = Synthetic construct
SEQUENCE: 104
```

-continued

```
ttaactgatg cgggaggttt tgaa                                        24

SEQ ID NO: 105          moltype = DNA   length = 24
FEATURE                 Location/Qualifiers
source                  1..24
                        mol_type = other DNA
                        organism = Synthetic construct
SEQUENCE: 105
taacgtcaga tgaatattag aacc                                        24

SEQ ID NO: 106          moltype = DNA   length = 24
FEATURE                 Location/Qualifiers
source                  1..24
                        mol_type = other DNA
                        organism = Synthetic construct
SEQUENCE: 106
aggaacgcca tcaaaaaaat tttt                                        24

SEQ ID NO: 107          moltype = DNA   length = 40
FEATURE                 Location/Qualifiers
source                  1..40
                        mol_type = other DNA
                        organism = Synthetic construct
SEQUENCE: 107
aaattaagcg gaagcaaact ccaaggaagc cccggattgc                       40

SEQ ID NO: 108          moltype = DNA   length = 24
FEATURE                 Location/Qualifiers
source                  1..24
                        mol_type = other DNA
                        organism = Synthetic construct
SEQUENCE: 108
cttcgctatt acgccaataa ttcg                                        24

SEQ ID NO: 109          moltype = DNA   length = 32
FEATURE                 Location/Qualifiers
source                  1..32
                        mol_type = other DNA
                        organism = Synthetic construct
SEQUENCE: 109
ttagccggac cttcatcaag agtaccgtat aa                               32

SEQ ID NO: 110          moltype = DNA   length = 22
FEATURE                 Location/Qualifiers
source                  1..22
                        mol_type = other DNA
                        organism = Synthetic construct
SEQUENCE: 110
gacgacagcc ggaaacaaac ca                                          22

SEQ ID NO: 111          moltype = DNA   length = 32
FEATURE                 Location/Qualifiers
source                  1..32
                        mol_type = other DNA
                        organism = Synthetic construct
SEQUENCE: 111
atcaagtttg cctttattag agctacggtg tc                               32

SEQ ID NO: 112          moltype = DNA   length = 40
FEATURE                 Location/Qualifiers
source                  1..40
                        mol_type = other DNA
                        organism = Synthetic construct
SEQUENCE: 112
gcgcacgact taagtgttta acaacaacaa tacgggtatt                       40

SEQ ID NO: 113          moltype = DNA   length = 32
FEATURE                 Location/Qualifiers
source                  1..32
                        mol_type = other DNA
                        organism = Synthetic construct
SEQUENCE: 113
ttgatatact ctgaatttac cgtttggcct tg                               32

SEQ ID NO: 114          moltype = DNA   length = 32
FEATURE                 Location/Qualifiers
source                  1..32
                        mol_type = other DNA
                        organism = Synthetic construct
```

```
SEQUENCE: 114
tgctgatgaa cttttttcaaa tatatatgta aa                                            32

SEQ ID NO: 115          moltype = DNA   length = 24
FEATURE                 Location/Qualifiers
source                  1..24
                        mol_type = other DNA
                        organism = Synthetic construct
SEQUENCE: 115
caactgttgg gaaggggcta acga                                                      24

SEQ ID NO: 116          moltype = DNA   length = 32
FEATURE                 Location/Qualifiers
source                  1..32
                        mol_type = other DNA
                        organism = Synthetic construct
SEQUENCE: 116
gtccagacta gcaagcaaat cagatatagt tc                                             32

SEQ ID NO: 117          moltype = DNA   length = 24
FEATURE                 Location/Qualifiers
source                  1..24
                        mol_type = other DNA
                        organism = Synthetic construct
SEQUENCE: 117
ttgggcgcca gggtggagct gcat                                                      24

SEQ ID NO: 118          moltype = DNA   length = 40
FEATURE                 Location/Qualifiers
source                  1..40
                        mol_type = other DNA
                        organism = Synthetic construct
SEQUENCE: 118
attgcgaaaa aaggcttttg cgggatcgtc accctcagca                                     40

SEQ ID NO: 119          moltype = DNA   length = 24
FEATURE                 Location/Qualifiers
source                  1..24
                        mol_type = other DNA
                        organism = Synthetic construct
SEQUENCE: 119
gcagatacga ttaggattag cggg                                                      24

SEQ ID NO: 120          moltype = DNA   length = 24
FEATURE                 Location/Qualifiers
source                  1..24
                        mol_type = other DNA
                        organism = Synthetic construct
SEQUENCE: 120
agccatatta tttatcttct ggtg                                                      24

SEQ ID NO: 121          moltype = DNA   length = 24
FEATURE                 Location/Qualifiers
source                  1..24
                        mol_type = other DNA
                        organism = Synthetic construct
SEQUENCE: 121
agcttgcttt cgaggttgat aaat                                                      24

SEQ ID NO: 122          moltype = DNA   length = 24
FEATURE                 Location/Qualifiers
source                  1..24
                        mol_type = other DNA
                        organism = Synthetic construct
SEQUENCE: 122
aaatcaacta cactaaaaca ctca                                                      24

SEQ ID NO: 123          moltype = DNA   length = 24
FEATURE                 Location/Qualifiers
source                  1..24
                        mol_type = other DNA
                        organism = Synthetic construct
SEQUENCE: 123
atgaccataa atcaaacagt cagg                                                      24

SEQ ID NO: 124          moltype = DNA   length = 40
FEATURE                 Location/Qualifiers
source                  1..40
                        mol_type = other DNA
```

-continued

```
                          organism = Synthetic construct
SEQUENCE: 124
gaatagaata tcattttgcg gaacaaagaa acatattcgg                           40

SEQ ID NO: 125        moltype = DNA   length = 32
FEATURE               Location/Qualifiers
source                1..32
                      mol_type = other DNA
                      organism = Synthetic construct
SEQUENCE: 125
gctgattgca agcggtccac gctggggcaa ca                                   32

SEQ ID NO: 126        moltype = DNA   length = 29
FEATURE               Location/Qualifiers
source                1..29
                      mol_type = other DNA
                      organism = Synthetic construct
SEQUENCE: 126
tttatcatat attttaaatg ctcattttt                                       29

SEQ ID NO: 127        moltype = DNA   length = 32
FEATURE               Location/Qualifiers
source                1..32
                      mol_type = other DNA
                      organism = Synthetic construct
SEQUENCE: 127
gcgttgcgtg agtgagctaa ctcattgtta tc                                   32

SEQ ID NO: 128        moltype = DNA   length = 40
FEATURE               Location/Qualifiers
source                1..40
                      mol_type = other DNA
                      organism = Synthetic construct
SEQUENCE: 128
tccagtttgg gttgagtgta atacgtaatg ccaaatcaaa                           40

SEQ ID NO: 129        moltype = DNA   length = 32
FEATURE               Location/Qualifiers
source                1..32
                      mol_type = other DNA
                      organism = Synthetic construct
SEQUENCE: 129
aacattcaac cgttctgcaa catataaaag aa                                   32

SEQ ID NO: 130        moltype = DNA   length = 24
FEATURE               Location/Qualifiers
source                1..24
                      mol_type = other DNA
                      organism = Synthetic construct
SEQUENCE: 130
agagaatcaa cattatgacc ctgt                                            24

SEQ ID NO: 131        moltype = DNA   length = 29
FEATURE               Location/Qualifiers
source                1..29
                      mol_type = other DNA
                      organism = Synthetic construct
SEQUENCE: 131
attttaatca ttgtgaatta cgaaagagg                                       29

SEQ ID NO: 132        moltype = DNA   length = 24
FEATURE               Location/Qualifiers
source                1..24
                      mol_type = other DNA
                      organism = Synthetic construct
SEQUENCE: 132
ttgaaatacc gaccgtacaa agaa                                            24

SEQ ID NO: 133        moltype = DNA   length = 27
FEATURE               Location/Qualifiers
source                1..27
                      mol_type = other DNA
                      organism = Synthetic construct
SEQUENCE: 133
acggtgtaca gaccagcgga acctatt                                         27

SEQ ID NO: 134        moltype = DNA   length = 40
FEATURE               Location/Qualifiers
source                1..40
```

-continued

```
                        mol_type = other DNA
                        organism = Synthetic construct
SEQUENCE: 134
ttatacttca aaattatttg cacgtgtttg gaatcctgat                          40

SEQ ID NO: 135          moltype = DNA   length = 32
FEATURE                 Location/Qualifiers
source                  1..32
                        mol_type = other DNA
                        organism = Synthetic construct
SEQUENCE: 135
agcgaaccaa taagaaagca gcctttacag ag                                  32

SEQ ID NO: 136          moltype = DNA   length = 24
FEATURE                 Location/Qualifiers
source                  1..24
                        mol_type = other DNA
                        organism = Synthetic construct
SEQUENCE: 136
ttgcctgaga gtctggaaaa gccc                                           24

SEQ ID NO: 137          moltype = DNA   length = 32
FEATURE                 Location/Qualifiers
source                  1..32
                        mol_type = other DNA
                        organism = Synthetic construct
SEQUENCE: 137
cgccaacaat tgagaatcgc catatcctta gt                                  32

SEQ ID NO: 138          moltype = DNA   length = 40
FEATURE                 Location/Qualifiers
source                  1..40
                        mol_type = other DNA
                        organism = Synthetic construct
SEQUENCE: 138
ttattacggc aataatgtag gtaaagattc aataaaattc                          40

SEQ ID NO: 139          moltype = DNA   length = 40
FEATURE                 Location/Qualifiers
source                  1..40
                        mol_type = other DNA
                        organism = Synthetic construct
SEQUENCE: 139
aattagcaaa taacctatta gatacatttc gcaagcaaag                          40

SEQ ID NO: 140          moltype = DNA   length = 32
FEATURE                 Location/Qualifiers
source                  1..32
                        mol_type = other DNA
                        organism = Synthetic construct
SEQUENCE: 140
gtcgtgccca gtcgggaaag agcttcaaag cg                                  32

SEQ ID NO: 141          moltype = DNA   length = 29
FEATURE                 Location/Qualifiers
source                  1..29
                        mol_type = other DNA
                        organism = Synthetic construct
SEQUENCE: 141
caaagggaga cagtcaaatc aagaataac                                      29

SEQ ID NO: 142          moltype = DNA   length = 35
FEATURE                 Location/Qualifiers
source                  1..35
                        mol_type = other DNA
                        organism = Synthetic construct
SEQUENCE: 142
tgtgtcgaca agcccaatag gaactttaac ggggt                               35

SEQ ID NO: 143          moltype = DNA   length = 40
FEATURE                 Location/Qualifiers
source                  1..40
                        mol_type = other DNA
                        organism = Synthetic construct
SEQUENCE: 143
ccgccacccc ctcagagcca ccactagagc cagcaaaaac                          40

SEQ ID NO: 144          moltype = DNA   length = 40
FEATURE                 Location/Qualifiers
```

-continued

```
source                  1..40
                        mol_type = other DNA
                        organism = Synthetic construct
SEQUENCE: 144
taataattaa cgttattaat tttaaaagtt tgaggccgct                        40

SEQ ID NO: 145          moltype = DNA   length = 19
FEATURE                 Location/Qualifiers
source                  1..19
                        mol_type = other DNA
                        organism = Synthetic construct
SEQUENCE: 145
tgaggggacg ccttaaatc                                               19

SEQ ID NO: 146          moltype = DNA   length = 40
FEATURE                 Location/Qualifiers
source                  1..40
                        mol_type = other DNA
                        organism = Synthetic construct
SEQUENCE: 146
tcaggtcagc atgattaaga ctccaacatc cacgcgagct                        40

SEQ ID NO: 147          moltype = DNA   length = 32
FEATURE                 Location/Qualifiers
source                  1..32
                        mol_type = other DNA
                        organism = Synthetic construct
SEQUENCE: 147
tcaatagtcc tttttaacct ccgggagaag ag                                32

SEQ ID NO: 148          moltype = DNA   length = 24
FEATURE                 Location/Qualifiers
source                  1..24
                        mol_type = other DNA
                        organism = Synthetic construct
SEQUENCE: 148
tgactattat agtcagctta tgcg                                         24

SEQ ID NO: 149          moltype = DNA   length = 24
FEATURE                 Location/Qualifiers
source                  1..24
                        mol_type = other DNA
                        organism = Synthetic construct
SEQUENCE: 149
cggccaacgc gcggggcatt aatt                                         24

SEQ ID NO: 150          moltype = DNA   length = 32
FEATURE                 Location/Qualifiers
source                  1..32
                        mol_type = other DNA
                        organism = Synthetic construct
SEQUENCE: 150
accaagttaa ttacctgagc aaaactttga at                                32

SEQ ID NO: 151          moltype = DNA   length = 40
FEATURE                 Location/Qualifiers
source                  1..40
                        mol_type = other DNA
                        organism = Synthetic construct
SEQUENCE: 151
cctttttgatt gattccgaaa aggtggcatc aagaggaaac                       40

SEQ ID NO: 152          moltype = DNA   length = 40
FEATURE                 Location/Qualifiers
source                  1..40
                        mol_type = other DNA
                        organism = Synthetic construct
SEQUENCE: 152
aggtagaaag attgtatgta ctggtaataa gtccatgtac                        40

SEQ ID NO: 153          moltype = DNA   length = 24
FEATURE                 Location/Qualifiers
source                  1..24
                        mol_type = other DNA
                        organism = Synthetic construct
SEQUENCE: 153
tgagtttcgt caccagtttg atga                                         24

SEQ ID NO: 154          moltype = DNA   length = 32
```

-continued

```
FEATURE              Location/Qualifiers
source               1..32
                     mol_type = other DNA
                     organism = Synthetic construct
SEQUENCE: 154
aatcagtaaa ccgccaagaa ccaccaccag ag                                    32

SEQ ID NO: 155       moltype = DNA  length = 24
FEATURE              Location/Qualifiers
source               1..24
                     mol_type = other DNA
                     organism = Synthetic construct
SEQUENCE: 155
ctcactgccc gctttcagcc tggg                                             24

SEQ ID NO: 156       moltype = DNA  length = 21
FEATURE              Location/Qualifiers
source               1..21
                     mol_type = other DNA
                     organism = Synthetic construct
SEQUENCE: 156
agaaattgta aaacagaaac g                                                21

SEQ ID NO: 157       moltype = DNA  length = 32
FEATURE              Location/Qualifiers
source               1..32
                     mol_type = other DNA
                     organism = Synthetic construct
SEQUENCE: 157
tgaaaccaaa acaaataaat cctcattaaa ac                                    32

SEQ ID NO: 158       moltype = DNA  length = 20
FEATURE              Location/Qualifiers
source               1..20
                     mol_type = other DNA
                     organism = Synthetic construct
SEQUENCE: 158
ctacaaaggc taagtaatgt                                                  20

SEQ ID NO: 159       moltype = DNA  length = 32
FEATURE              Location/Qualifiers
source               1..32
                     mol_type = other DNA
                     organism = Synthetic construct
SEQUENCE: 159
atcaaaaagt ttgccataga tttagtttga cc                                    32

SEQ ID NO: 160       moltype = DNA  length = 40
FEATURE              Location/Qualifiers
source               1..40
                     mol_type = other DNA
                     organism = Synthetic construct
SEQUENCE: 160
aattgagcga acgcgaggcg ttttccatta ccgcgcccaa                            40

SEQ ID NO: 161       moltype = DNA  length = 24
FEATURE              Location/Qualifiers
source               1..24
                     mol_type = other DNA
                     organism = Synthetic construct
SEQUENCE: 161
tttttgttaa atcagcaatg cctg                                             24

SEQ ID NO: 162       moltype = DNA  length = 24
FEATURE              Location/Qualifiers
source               1..24
                     mol_type = other DNA
                     organism = Synthetic construct
SEQUENCE: 162
caggcaaagc gccattcagt taca                                             24

SEQ ID NO: 163       moltype = DNA  length = 24
FEATURE              Location/Qualifiers
source               1..24
                     mol_type = other DNA
                     organism = Synthetic construct
SEQUENCE: 163
agcgtcatac atggctcctc agag                                             24
```

-continued

```
SEQ ID NO: 164            moltype = DNA   length = 41
FEATURE                   Location/Qualifiers
source                    1..41
                          mol_type = other DNA
                          organism = Synthetic construct
SEQUENCE: 164
attcagtgaa cagatgacga actgaccaac tttgtagcaa c                        41

SEQ ID NO: 165            moltype = DNA   length = 32
FEATURE                   Location/Qualifiers
source                    1..32
                          mol_type = other DNA
                          organism = Synthetic construct
SEQUENCE: 165
ttaatggtta aataagaata aacaacctaa at                                  32

SEQ ID NO: 166            moltype = DNA   length = 24
FEATURE                   Location/Qualifiers
source                    1..24
                          mol_type = other DNA
                          organism = Synthetic construct
SEQUENCE: 166
gaaatagcaa tagctacgtc aaaa                                           24

SEQ ID NO: 167            moltype = DNA   length = 42
FEATURE                   Location/Qualifiers
source                    1..42
                          mol_type = other DNA
                          organism = Synthetic construct
SEQUENCE: 167
catagccccc agactggata gcgtccttac gaggacgttg gg                       42

SEQ ID NO: 168            moltype = DNA   length = 24
FEATURE                   Location/Qualifiers
source                    1..24
                          mol_type = other DNA
                          organism = Synthetic construct
SEQUENCE: 168
gcgacattga atataatgct gtag                                           24

SEQ ID NO: 169            moltype = DNA   length = 40
FEATURE                   Location/Qualifiers
source                    1..40
                          mol_type = other DNA
                          organism = Synthetic construct
SEQUENCE: 169
cctgattgca ataacggata tcaccgtact cacagtacct                          40

SEQ ID NO: 170            moltype = DNA   length = 40
FEATURE                   Location/Qualifiers
source                    1..40
                          mol_type = other DNA
                          organism = Synthetic construct
SEQUENCE: 170
acaccacgaa taataagagc aagacagagg gtatgaaaat                          40

SEQ ID NO: 171            moltype = DNA   length = 40
FEATURE                   Location/Qualifiers
source                    1..40
                          mol_type = other DNA
                          organism = Synthetic construct
SEQUENCE: 171
agcaaacaag aaccctttca acgcaaggat aaaaatggtc                          40

SEQ ID NO: 172            moltype = DNA   length = 32
FEATURE                   Location/Qualifiers
source                    1..32
                          mol_type = other DNA
                          organism = Synthetic construct
SEQUENCE: 172
ggaaccgcct caaatgcttt aaacaataaa ac                                  32

SEQ ID NO: 173            moltype = DNA   length = 24
FEATURE                   Location/Qualifiers
source                    1..24
                          mol_type = other DNA
                          organism = Synthetic construct
SEQUENCE: 173
ataaggctgg caccaaccta aaac                                           24
```

-continued

```
SEQ ID NO: 174          moltype = DNA   length = 40
FEATURE                 Location/Qualifiers
source                  1..40
                        mol_type = other DNA
                        organism = Synthetic construct
SEQUENCE: 174
aagccaggcc ccgcttctaa tctatttacg ctgctggcga                        40

SEQ ID NO: 175          moltype = DNA   length = 32
FEATURE                 Location/Qualifiers
source                  1..32
                        mol_type = other DNA
                        organism = Synthetic construct
SEQUENCE: 175
agtataaagc caacgctcaa cagttcatcg ag                                32

SEQ ID NO: 176          moltype = DNA   length = 24
FEATURE                 Location/Qualifiers
source                  1..24
                        mol_type = other DNA
                        organism = Synthetic construct
SEQUENCE: 176
tccgaaatcg gcaaaacctg agag                                         24

SEQ ID NO: 177          moltype = DNA   length = 43
FEATURE                 Location/Qualifiers
source                  1..43
                        mol_type = other DNA
                        organism = Synthetic construct
SEQUENCE: 177
tctttccaga cgttagtaaa gatgatggca attcatcaat ata                    43

SEQ ID NO: 178          moltype = DNA   length = 32
FEATURE                 Location/Qualifiers
source                  1..32
                        mol_type = other DNA
                        organism = Synthetic construct
SEQUENCE: 178
aataagagaa tataaagtac cgacaaaaga tt                                32

SEQ ID NO: 179          moltype = DNA   length = 40
FEATURE                 Location/Qualifiers
source                  1..40
                        mol_type = other DNA
                        organism = Synthetic construct
SEQUENCE: 179
tcgtaaccag gctgcgtgtc tttccttatc atgctgaatt                        40

SEQ ID NO: 180          moltype = DNA   length = 48
FEATURE                 Location/Qualifiers
source                  1..48
                        mol_type = other DNA
                        organism = Synthetic construct
SEQUENCE: 180
aagcctgtac tagaaaccgg aatcatagta aagtaattct taaggcgt               48

SEQ ID NO: 181          moltype = DNA   length = 34
FEATURE                 Location/Qualifiers
source                  1..34
                        mol_type = other DNA
                        organism = Synthetic construct
SEQUENCE: 181
aagattaacg tttagctata gcaaacgtag aaaa                              34

SEQ ID NO: 182          moltype = DNA   length = 40
FEATURE                 Location/Qualifiers
source                  1..40
                        mol_type = other DNA
                        organism = Synthetic construct
SEQUENCE: 182
acaaaaggca ccgactatgt tttaaatatg caaccctcag                        40

SEQ ID NO: 183          moltype = DNA   length = 32
FEATURE                 Location/Qualifiers
source                  1..32
                        mol_type = other DNA
                        organism = Synthetic construct
SEQUENCE: 183
```

-continued

```
ttagtatcat atgcgttata caaagtgata aa                         32

SEQ ID NO: 184        moltype = DNA   length = 24
FEATURE               Location/Qualifiers
source                1..24
                      mol_type = other DNA
                      organism = Synthetic construct
SEQUENCE: 184
aaatcgtcgc tattaaattt gaat                                  24

SEQ ID NO: 185        moltype = DNA   length = 24
FEATURE               Location/Qualifiers
source                1..24
                      mol_type = other DNA
                      organism = Synthetic construct
SEQUENCE: 185
tcctaattgg tgtagatggg cgca                                  24

SEQ ID NO: 186        moltype = DNA   length = 40
FEATURE               Location/Qualifiers
source                1..40
                      mol_type = other DNA
                      organism = Synthetic construct
SEQUENCE: 186
ctaaacaagg agcggaatta tcatcatatt ccatgacaac                 40

SEQ ID NO: 187        moltype = DNA   length = 32
FEATURE               Location/Qualifiers
source                1..32
                      mol_type = other DNA
                      organism = Synthetic construct
SEQUENCE: 187
ttaagcccga ataagtttat tttgtcacaa tt                         32

SEQ ID NO: 188        moltype = DNA   length = 24
FEATURE               Location/Qualifiers
source                1..24
                      mol_type = other DNA
                      organism = Synthetic construct
SEQUENCE: 188
cattaaatcc cggttgataa tcag                                  24

SEQ ID NO: 189        moltype = DNA   length = 32
FEATURE               Location/Qualifiers
source                1..32
                      mol_type = other DNA
                      organism = Synthetic construct
SEQUENCE: 189
agtaaacata aagacggagg atccgtgtaa tg                         32

SEQ ID NO: 190        moltype = DNA   length = 24
FEATURE               Location/Qualifiers
source                1..24
                      mol_type = other DNA
                      organism = Synthetic construct
SEQUENCE: 190
gaaaggcctt accagaagga aacc                                  24

SEQ ID NO: 191        moltype = DNA   length = 32
FEATURE               Location/Qualifiers
source                1..32
                      mol_type = other DNA
                      organism = Synthetic construct
SEQUENCE: 191
acaacggaaa ccgccaccct cagagttttg ct                         32

SEQ ID NO: 192        moltype = DNA   length = 24
FEATURE               Location/Qualifiers
source                1..24
                      mol_type = other DNA
                      organism = Synthetic construct
SEQUENCE: 192
gaatttatca aaatcattaa tttt                                  24

SEQ ID NO: 193        moltype = DNA   length = 40
FEATURE               Location/Qualifiers
source                1..40
                      mol_type = other DNA
                      organism = Synthetic construct
```

```
SEQUENCE: 193
cggagtgagg tttatctcgc tgaggcttgc agggagttaa                                     40

SEQ ID NO: 194              moltype = DNA  length = 40
FEATURE                     Location/Qualifiers
source                      1..40
                            mol_type = other DNA
                            organism = Synthetic construct
SEQUENCE: 194
tgattatcat gaattttctg tatgcagccc tcacaacgcc                                     40

SEQ ID NO: 195              moltype = DNA  length = 20
FEATURE                     Location/Qualifiers
source                      1..20
                            mol_type = other DNA
                            organism = Synthetic construct
SEQUENCE: 195
tgcggatggc gcgtcagact                                                           20

SEQ ID NO: 196              moltype = DNA  length = 37
FEATURE                     Location/Qualifiers
source                      1..37
                            mol_type = other DNA
                            organism = Synthetic construct
SEQUENCE: 196
cagtgggaac aacattatta cccgccgcca gcatccc                                        37

SEQ ID NO: 197              moltype = DNA  length = 24
FEATURE                     Location/Qualifiers
source                      1..24
                            mol_type = other DNA
                            organism = Synthetic construct
SEQUENCE: 197
aacggaatac ccaaaaattt gggg                                                      24

SEQ ID NO: 198              moltype = DNA  length = 32
FEATURE                     Location/Qualifiers
source                      1..32
                            mol_type = other DNA
                            organism = Synthetic construct
SEQUENCE: 198
agtccactga aaaaccgtct atcaggaaca ag                                             32

SEQ ID NO: 199              moltype = DNA  length = 24
FEATURE                     Location/Qualifiers
source                      1..24
                            mol_type = other DNA
                            organism = Synthetic construct
SEQUENCE: 199
aacgaggcgc agacggctcc aaaa                                                      24

SEQ ID NO: 200              moltype = DNA  length = 48
FEATURE                     Location/Qualifiers
source                      1..48
                            mol_type = other DNA
                            organism = Synthetic construct
SEQUENCE: 200
ccgtccctcc tggttgccga actctgagga ttctccgtgg acgcattt                           48

SEQ ID NO: 201              moltype = DNA  length = 24
FEATURE                     Location/Qualifiers
source                      1..24
                            mol_type = other DNA
                            organism = Synthetic construct
SEQUENCE: 201
tgagccattt gggaattctt accg                                                      24

SEQ ID NO: 202              moltype = DNA  length = 20
FEATURE                     Location/Qualifiers
source                      1..20
                            mol_type = other DNA
                            organism = Synthetic construct
SEQUENCE: 202
aaattgtaag ttgctatttt                                                           20

SEQ ID NO: 203              moltype = DNA  length = 48
FEATURE                     Location/Qualifiers
source                      1..48
                            mol_type = other DNA
```

-continued

```
                            organism = Synthetic construct
SEQUENCE: 203
caggtcagga ttagagtaca ggcaaggcaa agaatacttt tgcggctg                     48

SEQ ID NO: 204        moltype = DNA   length = 32
FEATURE               Location/Qualifiers
source                1..32
                      mol_type = other DNA
                      organism = Synthetic construct
SEQUENCE: 204
aaattaattt aatggaaaca gtacagaaaa ca                                      32

SEQ ID NO: 205        moltype = DNA   length = 40
FEATURE               Location/Qualifiers
source                1..40
                      mol_type = other DNA
                      organism = Synthetic construct
SEQUENCE: 205
ttctgacgga aattattgga agtttcattc caccaccacc                              40

SEQ ID NO: 206        moltype = DNA   length = 32
FEATURE               Location/Qualifiers
source                1..32
                      mol_type = other DNA
                      organism = Synthetic construct
SEQUENCE: 206
caccagaact ttcaacagtt tcagaacaaa gt                                      32

SEQ ID NO: 207        moltype = DNA   length = 32
FEATURE               Location/Qualifiers
source                1..32
                      mol_type = other DNA
                      organism = Synthetic construct
SEQUENCE: 207
tcatatggcc attaccatta gcaaggccgt at                                      32

SEQ ID NO: 208        moltype = DNA   length = 24
FEATURE               Location/Qualifiers
source                1..24
                      mol_type = other DNA
                      organism = Synthetic construct
SEQUENCE: 208
aattttatgg aagattgtat aagc                                               24

SEQ ID NO: 209        moltype = DNA   length = 40
FEATURE               Location/Qualifiers
source                1..40
                      mol_type = other DNA
                      organism = Synthetic construct
SEQUENCE: 209
cgaattcgcc gggtaccgat agcatgtcaa tctacctcga                              40

SEQ ID NO: 210        moltype = DNA   length = 40
FEATURE               Location/Qualifiers
source                1..40
                      mol_type = other DNA
                      organism = Synthetic construct
SEQUENCE: 210
gtggatgttc ttctaagtgg ttgtatatcc cataatcggc                              40
```

SUB-10 NANOMETER FLUORESCENCE IMAGING

CROSS-REFERENCE TO RELATED APPLICATIONS

This application is a National Stage application under 35 U.S.C. 371 of International Patent Application No. PCT/EP2023/052746, filed Feb. 4, 2023, which claims priority to U.S. Provisional Application No. 63/267,556, filed Feb. 4, 2022; the contents of all of which are incorporated by reference in the present disclosure in their entirety.

REFERENCE TO SEQUENCE LISTING

A computer readable txt file entitled "Sequence Listing.txt", that was created on Apr. 22, 2025, with a file size of about 56000 bytes, contains the sequence listing for this application, has been filed with this application, and is hereby incorporated by reference in its entirety.

BACKGROUND

Over the past decade, superresolution fluorescence imaging by single-molecule localization has evolved as a powerful method for subdiffraction-resolution fluorescence imaging of cells and structural investigations of cellular organelles. However, although single-molecule localization microscopy (SMLM) methods can now provide a spatial resolution of ~20 nm, i.e. well below the diffraction limit of light microscopy, they do not provide true molecular resolution of a few nanometers which is required to comprehensively understand the composition and 3D organization of organelles, multiprotein complexes or protein-dense networks in real biological samples such as cells or tissues.

Two central parameters that determine image resolution in SMLM experiments are the localization precision (the spread of the measured position coordinates around its mean value) and the localization accuracy (the deviation of the mean of the measured coordinates from the true position). Previous research has focused mainly on improving the localization precision as one of the two key determinants of image resolution. For instance, the use of sequential structured illumination in combination with single-molecule detection as used in Minimal photon fluxes (MINFLUX), Structured Illumination Based Point Localization Estimator (SIMPLE) and Structured Illumination Microscopy FLUX (SIMFLUX) allowed to improve the localization precision of direct stochastic optical reconstruction microscopy (dSTORM) using the red-absorbing cyanine dyes Alexa Fluor 647 and Cy5 in photoswitching buffer to the 1-5 nm range. Such localization precisions permitted to resolve some fluorophores separated by only 6 nm on DNA origami and ~10 nm in nuclear pore complexes (NPCs), respectively. However, the results also created a dispute regarding the spatial resolution claimed and the reliability of the method. In particular, the images revealed a low detection probability of fluorophores when separated by only a few nanometers evidenced by a high number of incomplete DNA origami and missing protein signals in the biological samples. On the other hand, these reports demonstrated that anisotropic photon emission of fluorophores due to limited rotational mobility, which has been assumed to cause substantial localization bias, can be neglected for highly water soluble cyanine dyes such as Alexa Fluor 647 and Cy5. Hence, the observed low localization probability of fluorophores separated by <10 nm remains unsolved.

Since site-specific and quantitative labeling of DNA origami with fluorophores is feasible even for sub-10 nm interfluorophore distances, it remains obscured why nanometer localization precisions cannot be translated into molecular resolution with higher reliability. To date, a model that explains the observed behavior does not exist.

Thus, what is desired are methods and devices that can perform imaging at about the 10 nm level, and about the sub-10 nm level.

BRIEF SUMMARY OF THE DISCLOSURE

In accordance with one or more embodiments, devices and methods are provided.

The disclosure includes a method for imaging cells, the method comprising: transfecting one or more cells with one or more plasmids to form transfected one or more cells; labeling the transfected one or more cells with a dye; exciting the dye with an energy source, wherein the dye is configured to emit an emission light; imaging one or more portions of the transfected one or more cells with a sensor, for a predetermined exposure time, a plurality of times to form a plurality of images; classifying each image of the plurality of images into a first group of images above a predetermined threshold for a number of photons per image or a second group of images below the predetermined threshold the number of photons per image; analyzing the first group of images to track locations of the one or more portions for each of the first group of images and to track a fluorescence trajectory of each photon in the first group of images; applying a pulsed, excitation light energy to the transfected one or more cells; measuring an emission energy from the excited, transfected one or more cells; and determining whether the emission energy is from one or more independently emitting quantum systems based on the measured emission, the tracked locations of the one or more portions and the fluorescence trajectory.

The disclosure includes a system configured to image one or more cells, the system comprising: a holder configured to receive dye labeled, transfected one or more cells; an energy source configured to excite the dye of the dye labeled, transfected one or more cells; an imaging sensor configured to image one or more portions of the dye labeled, transfected one or more cells, for a predetermined exposure time, a plurality of times to form a plurality of images; an excitation light energy source configured to apply a pulsed, excitation light energy to the dye labeled, transfected one or more cells; an emission energy sensor configured to measure an emission energy from the excited, transfected one or more cells; and a processor comprising hardware, the processor configured to: classify each image of the plurality of images into a first group of images above a predetermined threshold for a number of photons per image or a second group of images below the predetermined threshold the number of photons per image; analyze the first group of images to track locations of the one or more portions for each of the first group of images and to track a fluorescence trajectory of each photon in the first group of images; and determine whether the emission energy is from one or more independently emitting quantum systems based on the measured emission, the tracked locations of the one or more portions and the fluorescence trajectory.

These and other advantages of the disclosure will be apparent to those of ordinary skill in the art by reference to the following detailed description and the accompanying drawings.

BRIEF DESCRIPTION OF THE DRAWINGS

The accompanying drawings, which are incorporated in and constitute a part of this specification, illustrate embodiments of the disclosure, and, together with the summary given above, and the detailed description of the embodiments below, serve as a further explanation and disclosure to explain and/or illustrate embodiments of the disclosure.

FIG. 1A is a scheme of DNA origami labeled with four Cy5 at interfluorophore distances of 18, 9, 6, and 3 nm. FIGS. 1B and 1C are selected dSTORM and DNA-PAINT images of DNA origami. FIG. 1D is analysis of fluorescence trajectories recorded from individual DNA origami imaged using 640 nm excitation at an intensity of 5 kW cm-2. FIGS. 1E and 1F are graphical illustrations of the relative occurrence of fluorescence intensity ms-1 in the on-state (Intensity), lifetime of the on-state (On-time), lifetime of the off-state (Off-time), and number of on-states (On-events) detected for DNA origami with different interfluorophore distances in (FIG. 1E) dSTORM and (FIG. 1F) DNA-PAINT experiments (Color code: singly labeled reference (grey), 18 nm (dark blue), 9 nm (light blue), 6 nm (red), 3 nm (orange)). FIG. 1G is a graphical illustration of the number of on-events (localizations) detected per frame as a function of time during 10 min dSTORM video captures of DNA origami with different interfluorophore distance. FIG. 1H are histograms of the times after which 80% of all localizations were detected per individual DNA origami.

FIGS. 2A-2E illustrate Fluorescence trajectories recorded for singly-labeled reference (FIG. 2A), 18 nm (FIG. 2B), 9 nm (FIG. 2C), 6 nm (FIG. 2D), and 3 nm (FIG. 2E) DNA origamis in dSTORM photoswitching buffer. (Color code: singly labeled reference (grey), 18 nm (dark blue), 9 nm (light blue), 6 nm (red), 3 5 nm (orange)). Zoomed-in trajectories of the first seconds show fast blinking observed for the 6 and 3 nm DNA origamis. Time bins, 1 ms. FIG. 2F is an illustration of fluorescence trajectory recorded for a 3 nm DNA origami in trolox buffer and zoomed-in fluorescence signals of the first two seconds. Time bin, 1 ms. FIG. 2G is an illustration of average fluorescence decays form n=7-10 individual fluorescence trajectories of a singly labeled reference and the 3 nm DNA origamis measured in trolox and photoswitching buffer, respectively, revealing different energy transfer pathways between the Cy5 fluorophores. FIG. 2H is an illustration of average intensity autocorrelation functions calculated from n=7-10 individual fluorescence trajectories of a singly labeled reference and the 3 nm DNA origamis measured in trolox and photoswitching buffer, respectively, normalized to 1 ms. FIG. 2I is a histogram of average fluorescence lifetimes measured for individual DNA origami with different interfluorophore distances of 18, 9, 6, and 3 nm in photoswitching buffer. FIG. 2J is an illustration of fluorescence trajectory of a 3 nm DNA origami in photoswitching and corresponding fluorescence decays with average fluorescence lifetimes of 0.66 ns, 1.25 ns, and 1.77 ns recorded during the gray marked areas. FIG. 2K is an illustration of fluorescence lifetime (FLIM) images of the 18, 9, 6, and 3 nm DNA origami measured in trolox buffer emphasize the increased 5 blinking and shorter fluorescence lifetime of Cy5 fluorophores in the sub-10 nm range (moving from top left to the bottom right). The samples were excited at 640 nm with 2.5 kW cm-2 at an integration time of 5 μs pixel$^{-1}$.

FIGS. 3A-3C illustrate molecular structures of the pentameric GABA-A (PDB-ID 6HUG) and tetrameric GluK2 receptor (PDB-ID 5KUF) with incorporation sites of ncAAs shown as black circles (blue: γ2-subunit GABA-A, red: dimeric α2 GABA-A, red: homotetrameric GluK2) and corresponding dSTORM images of HEK293T membrane sections shown fluorescence signals of individual receptors (5 nm pixel-1). The ncAAs were labeled by click chemistry with Met-Tet-Cy5. In the GABA-AS181TAG mutant the distance between the two fluorophores in the α2-subunits is ~5 nm. In the GluK2S398TAG mutant the distance between the four Cy5 molecules is ~7 nm. FIG. 3D illustrates the relative occurrence of lifetimes of the off-state (Off-time), and number of on-states (On-events) detected from individual receptors in dSTORM experiments. FIG. 3E illustrates the number of on-events (localizations) detected per frame as a function of time during 10 min dSTORM experiments of membrane receptors. FIG. 3F is rFLIM images of HEK293T cells expressing monomeric γ2-subunit of GABA-A (left), dimeric α2-subunit of GABA-A (middle), and homotetrameric GluK2 receptors click-labeled with Met-Tet-Cy5 5 measured by confocal TCSPC imaging in photoswitching buffer at an irradiation intensity of 2.5 kW cm$^{-2}$. To minimize photobleaching of fluorophores FLIM images were recorded at 5 μs integration time per pixel. No intensity threshold was applied. FIG. 3G illustrates average fluorescence decays form n=10 FLIM images of HEK293T cells expressing receptors labeled with one, two, and four Cy5 fluorophores.

FIG. 6A illustrates relative occurrence of fluorescence intensity ms$^{-1}$ in the on-state (Intensity), lifetime of the on-state (On-time), lifetime of the off-state (Off-time), and number of on-states (On-events) detected for DNA origami with different interfluorophore distances (n=4) (Color code: singly labeled reference (grey), 18 nm (dark blue), 9 nm (light blue), 6 nm (red), 3 nm (orange)). FIG. 6B illustrates number of on-events (cumulative localizations, cum. locs.) detected per frame as a function of time during 10 min dSTORM movies of DNA origami with different interfluorophore distance.

histogram measured for the entire trajectory of singly Cy5-labeled reference DNA origami measured by single-molecule sensitive confocal fluorescence microscopy in photoswitching buffer excited at 640 nm with 2.5 kW cm$^{-2}$ (1 ms binning).

Figure 11:
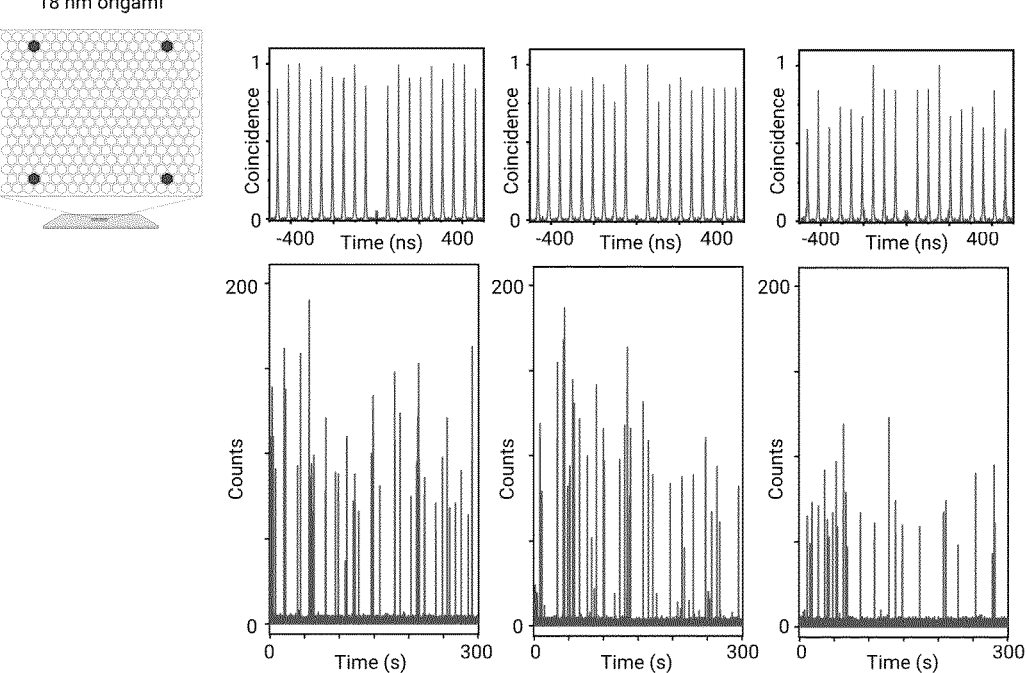

FIG. 11 is illustrations of fluorescence trajectories and corresponding normalized interphoton time (coincidence) histogram measured for the entire trajectory of 18 nm DNA origami measured by single-molecule sensitive confocal fluorescence microscopy in photoswitching buffer excited at 640 nm with 2.5 kW cm-2 (1 ms binning).

Figure 12:
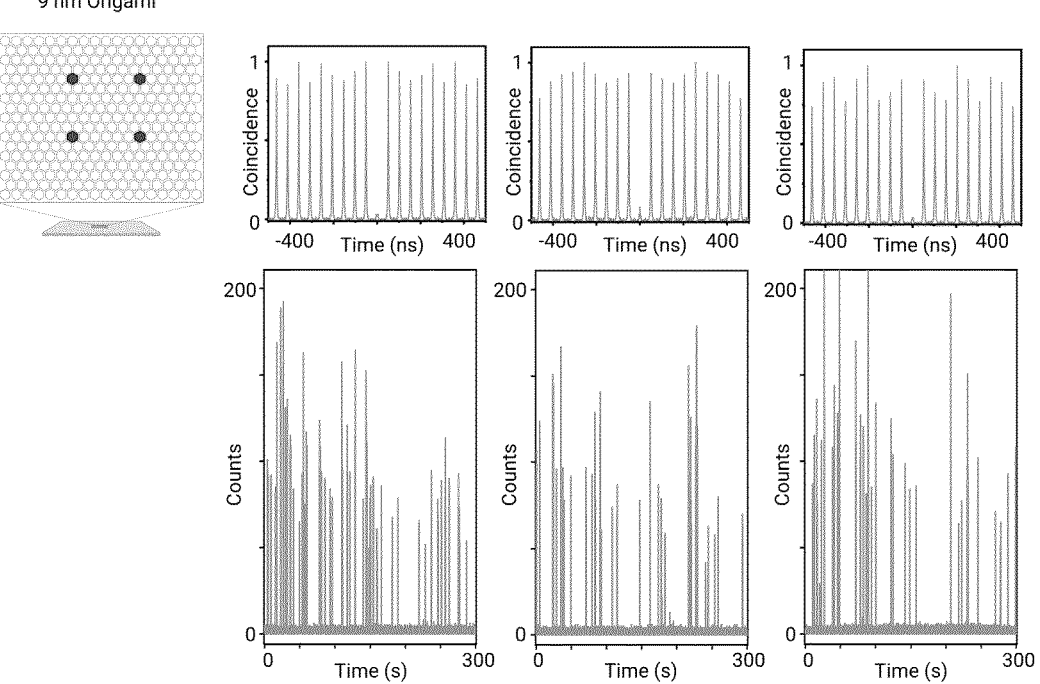

FIG. 12 is illustrations of fluorescence trajectories and corresponding normalized interphoton time (coincidence) histogram measured for the entire trajectory of 9 nm DNA origami measured by single-molecule sensitive confocal fluorescence microscopy in photoswitching buffer excited at 640 nm with 2.5 kW cm$^{-2}$ (1 ms binning).

Figure 13:
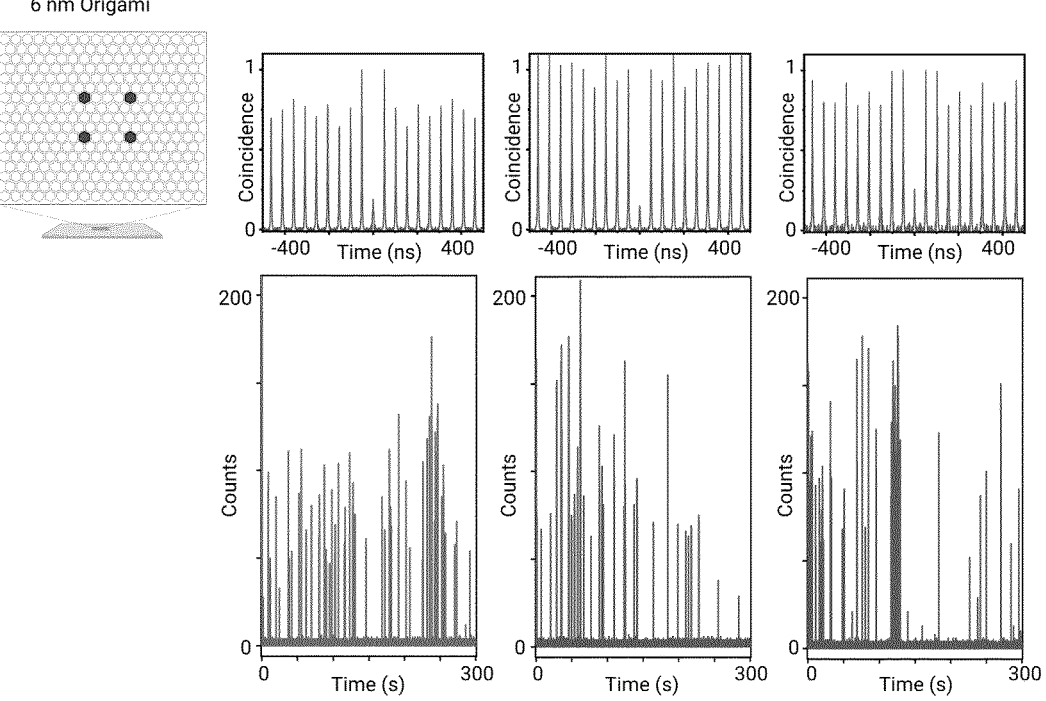

FIG. 13 is illustrations of fluorescence trajectories and corresponding normalized interphoton time (coincidence) histogram measured for the entire trajectory of 6 nm DNA origami measured by single-molecule sensitive confocal fluorescence microscopy in photoswitching buffer excited at 640 nm with 2.5 kW cm$^{-2}$ (1 ms binning).

Figure 14:
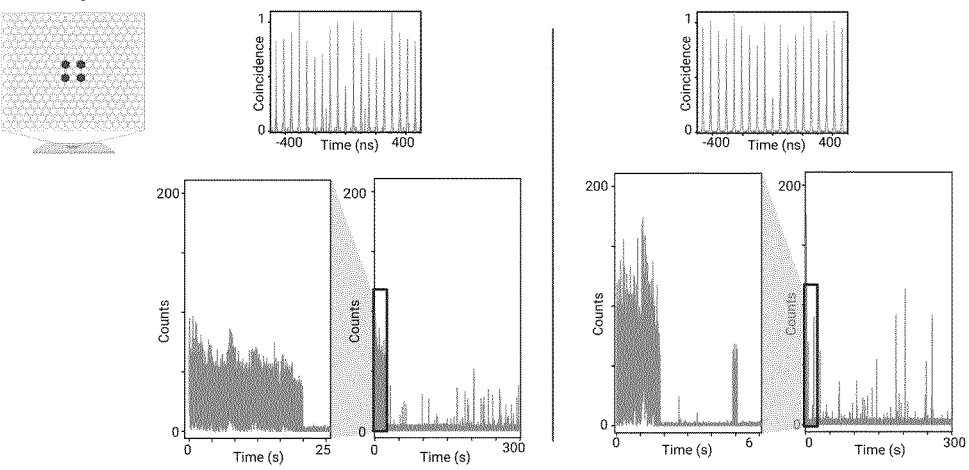

FIG. 14 is illustrations of fluorescence trajectories and corresponding normalized interphoton time (coincidence) histogram measured for the entire trajectory of 3 nm DNA origami measured by single-molecule sensitive confocal fluorescence microscopy in photoswitching buffer excited at 640 nm with 2.5 kW cm$^{-2}$ (1 ms binning).

Figure 15:
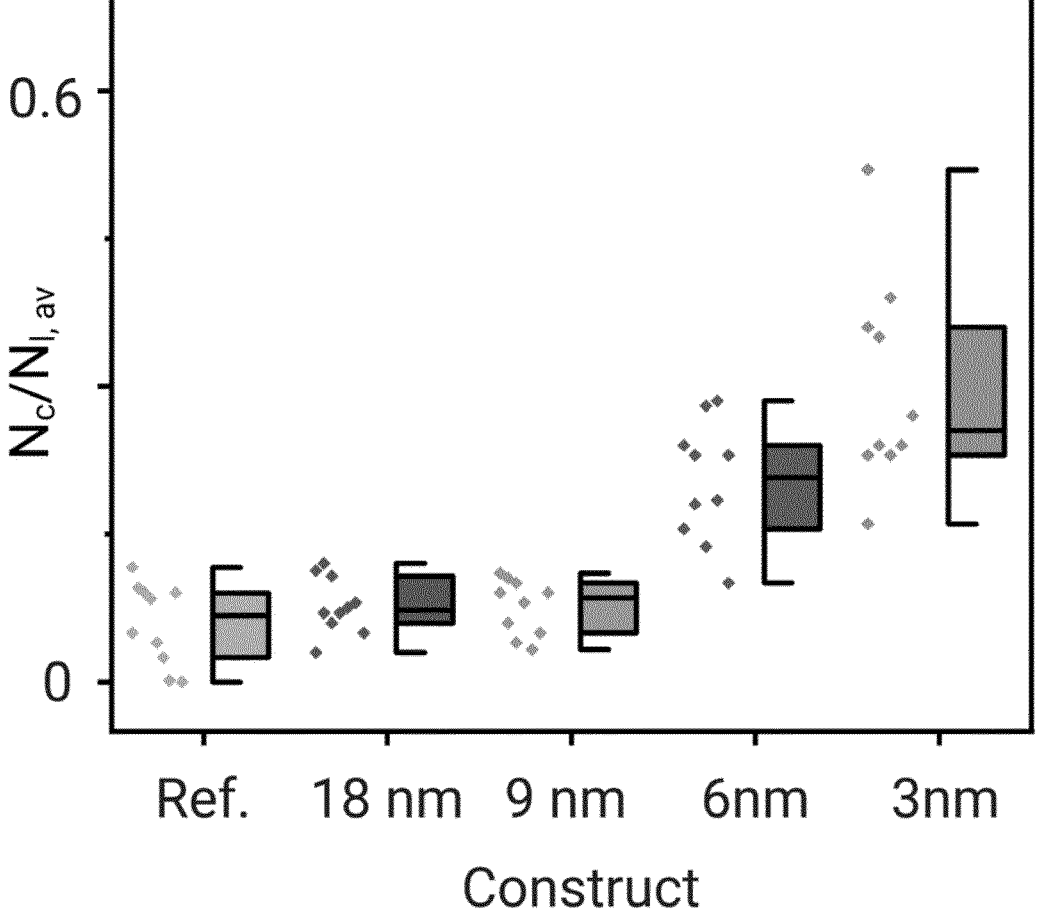

FIG. 15 is an illustration of $N_c/N_{l,av}$ ratios measured for n=10 single-molecule trajectories of the different DNA origami in photoswitching buffer.

Figure 16:
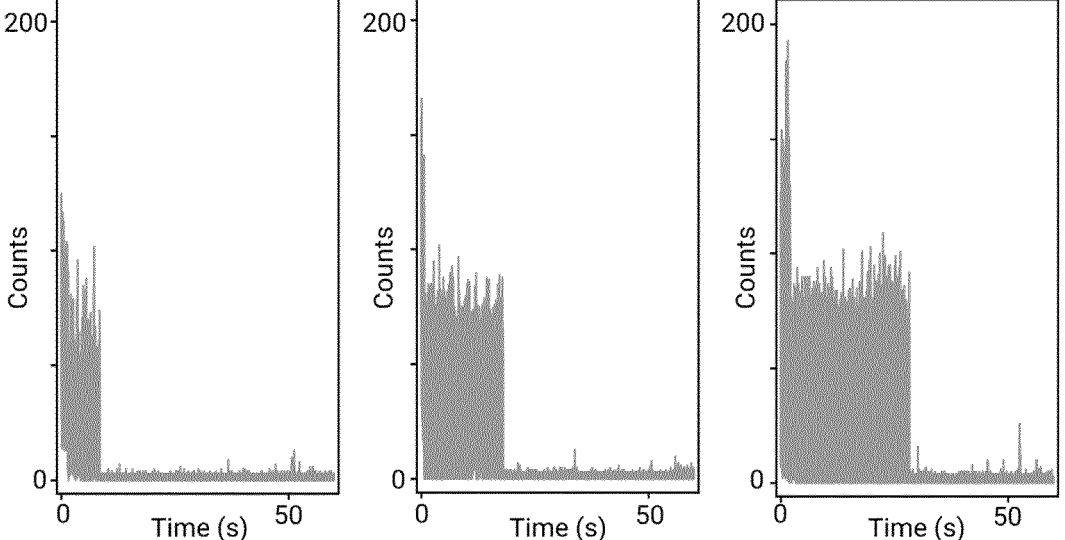

FIG. 16 is illustrations of fluorescence trajectories of 3 nm DNA origami in PBS, pH 7.6 containing 1 mM trolox/troloxquinone and an oxygen scavenging system measured by single-molecule sensitive confocal fluorescence microscopy excited at 640 nm with 2.5 kW cm$^{-2}$ (1 ms binning).

Figure 17:
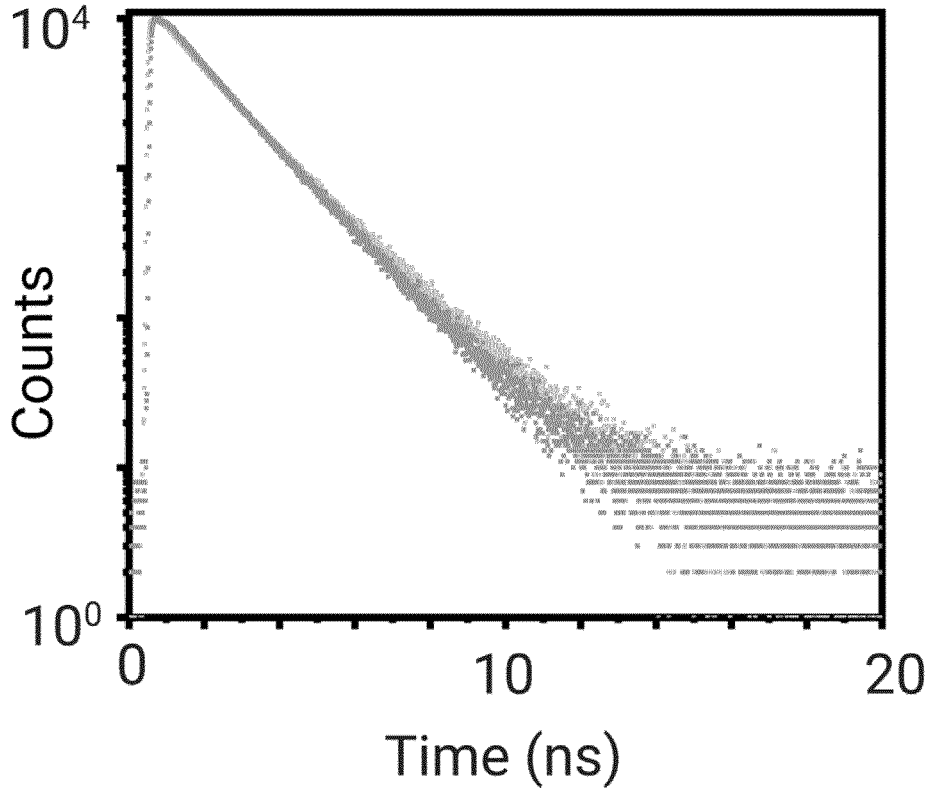

FIG. 17 is an illustration of an ensemble of fluorescence decays of oligonucleotides labeled with one (5'-3': TAC-GATTCGATTACGTTACCATTAGCATTGCATTAGCT-TATAT-Cy5) and four (5'-3': TACGATTCGATT-Cy5ACGTTACCATT-Cy5AGCATTGCATT-Cy5AGCTTATAT-Cy5) dyes measured by TCSP in PBS, pH 7.6.

Figures 18A, 18B, 18C:
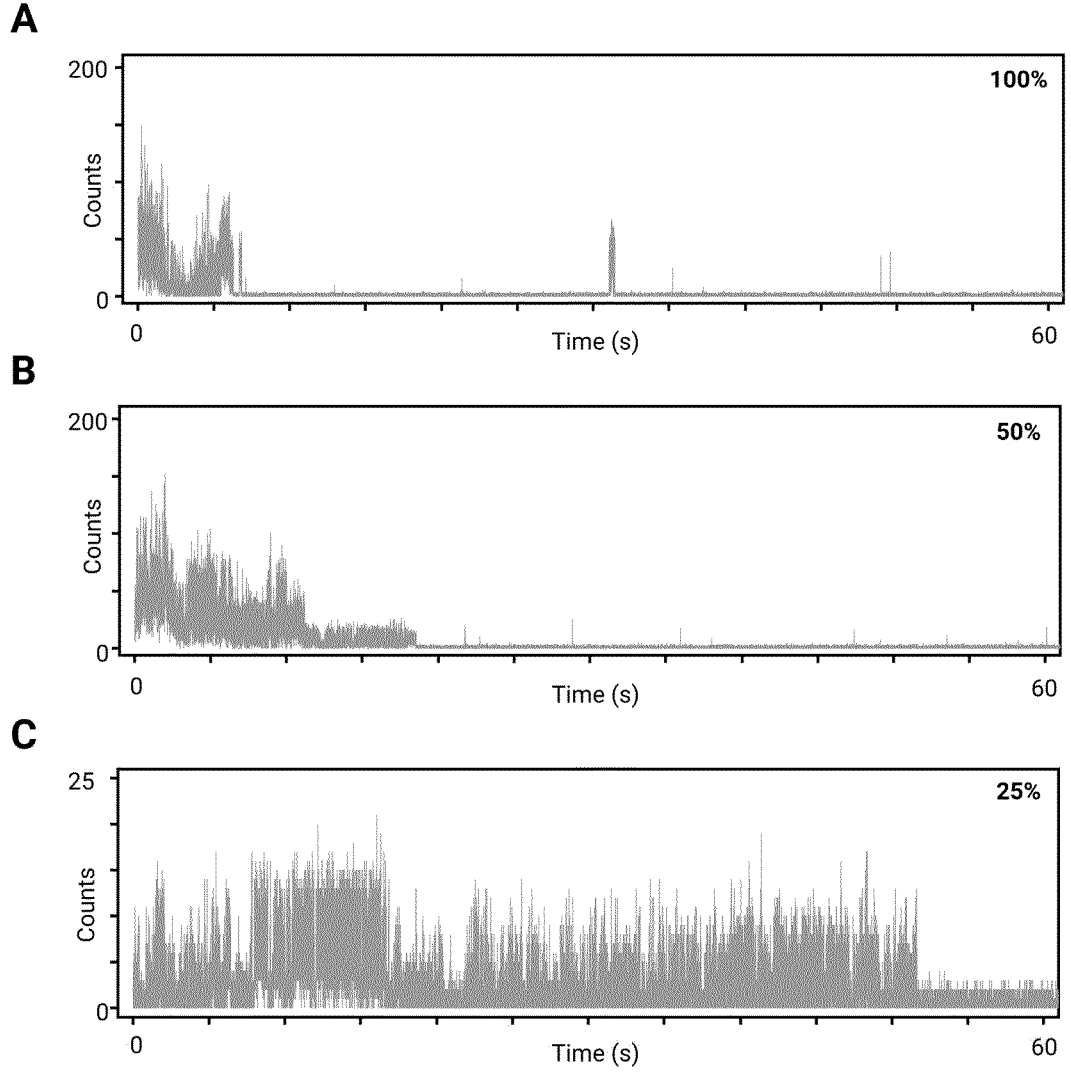

FIGS. 18A-18C are illustrations of fluorescence trajectories of 3 nm DNA measured by single-molecule sensitive confocal fluorescence microscopy in photoswitching buffer excited at 640 nm with different irradiation intensities: FIG. 18A—100% laser power; FIG. 18B—50% laser power; and FIG. 18C—25% laser power. (1 ms binning). 100%: 2.5 kW cm$^{-2}$.

Figure 19:
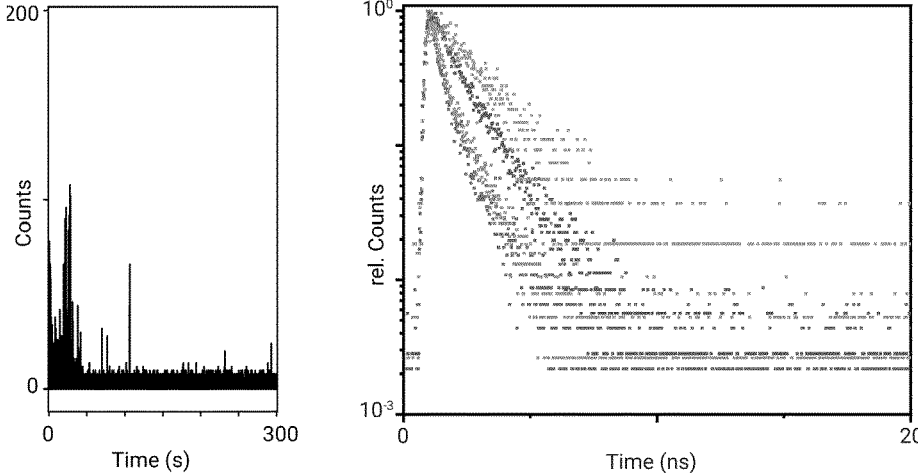

FIG. 19 is illustrations of fluorescence trajectories of a 3 nm DNA origami in photoswitching buffer and corresponding fluorescence decays recorded at different times indicate that the lifetime increases with time due to stepwise photobleaching of fluorophores and corresponding lower energy transfer efficiency (dark blue decay: 0-2 s; light blue decay: 2-25 s; red decay: 25-28 s; orange decay: 25-5 100 s).

Figure 20:
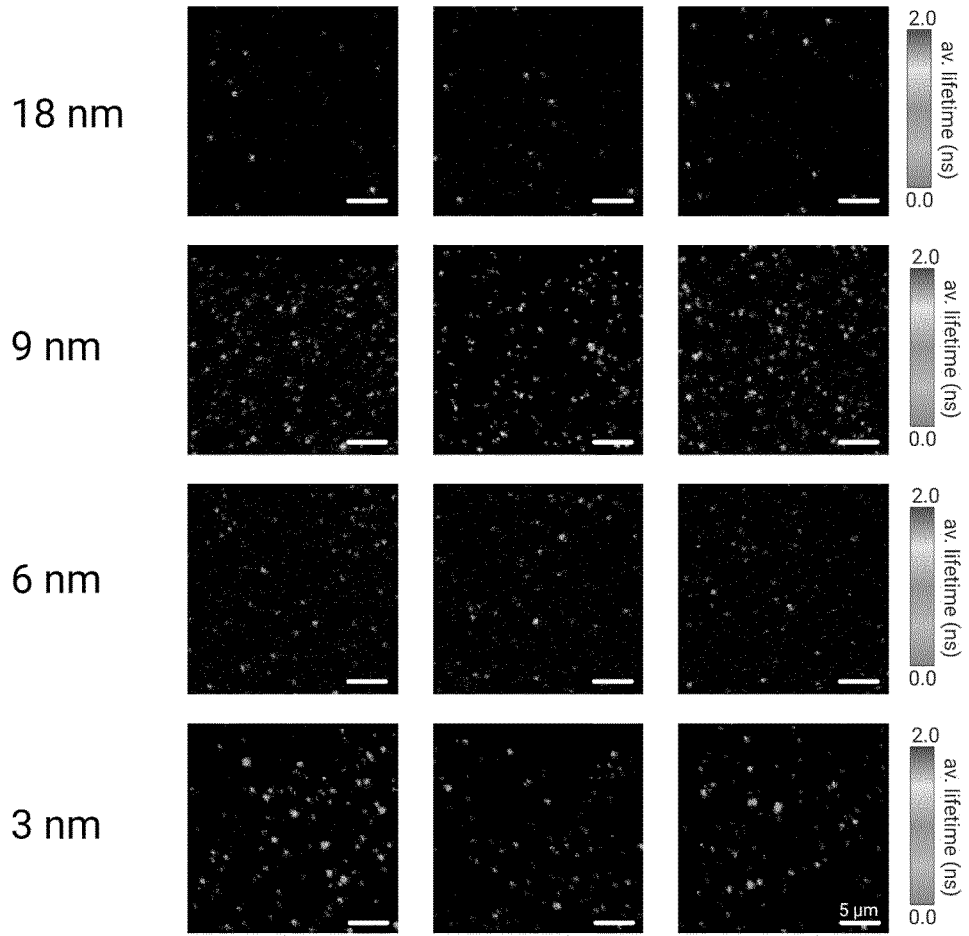

FIG. 20 are FLIM images of 18, 9, 6, 3 nm DNA origami measured in PBS, pH 7.6 containing 1 mM trolox/trolox-quinone and an oxygen scavenging system measured by single-molecule sensitive confocal fluorescence microscopy excited at 640 nm with 2.5 kW cm$^{-2}$ at an integration time of 5 μs pixel$^{-1}$.

Figures 21A, 21B:
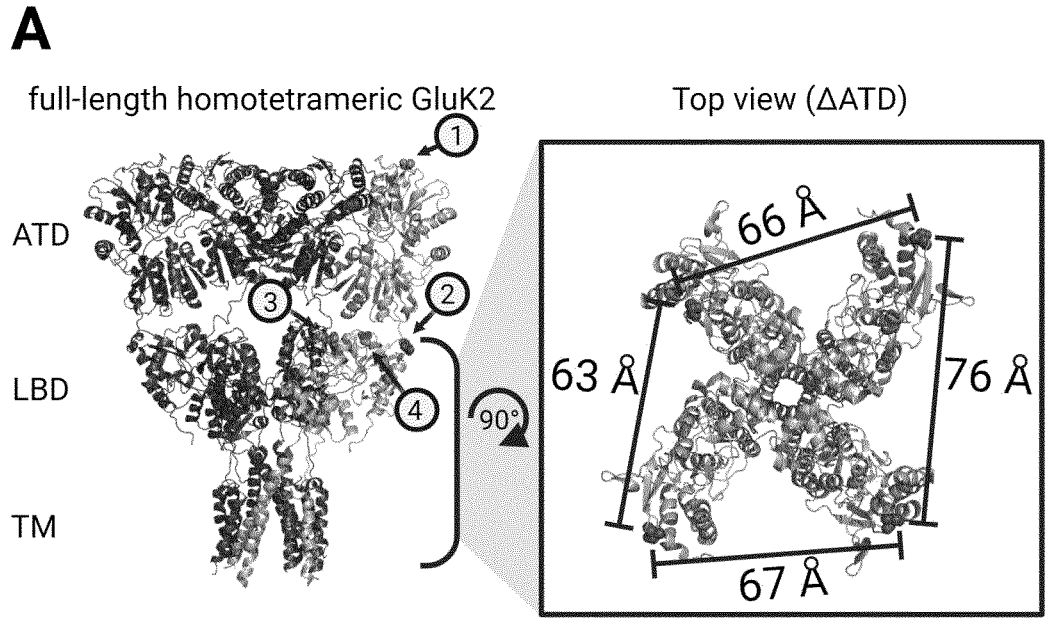

FIGS. 21A and 21B are schemes explaining click labeling and construct design of GluK2. In FIG. 21A, different mutants 1-4 were generated within one monomeric subunit of GluK2. Calculation of the distances was performed with PyMOL (Molecular Graphics System, Version 1.2r3pre, Schrödinger, LLC) on basis of the crystal structure (PDB-ID: 5KUF). In FIG. 21B, to check the efficiency of ncAA incorporation of the different mutants, click labeling was performed with H-Tet-Cy5. Control 5 experiments without the addition of ncAA resulted in inefficient amber suppression efficiency which leads to premature translation termination and no click labeling.

Figures 22A, 22B, 22C:
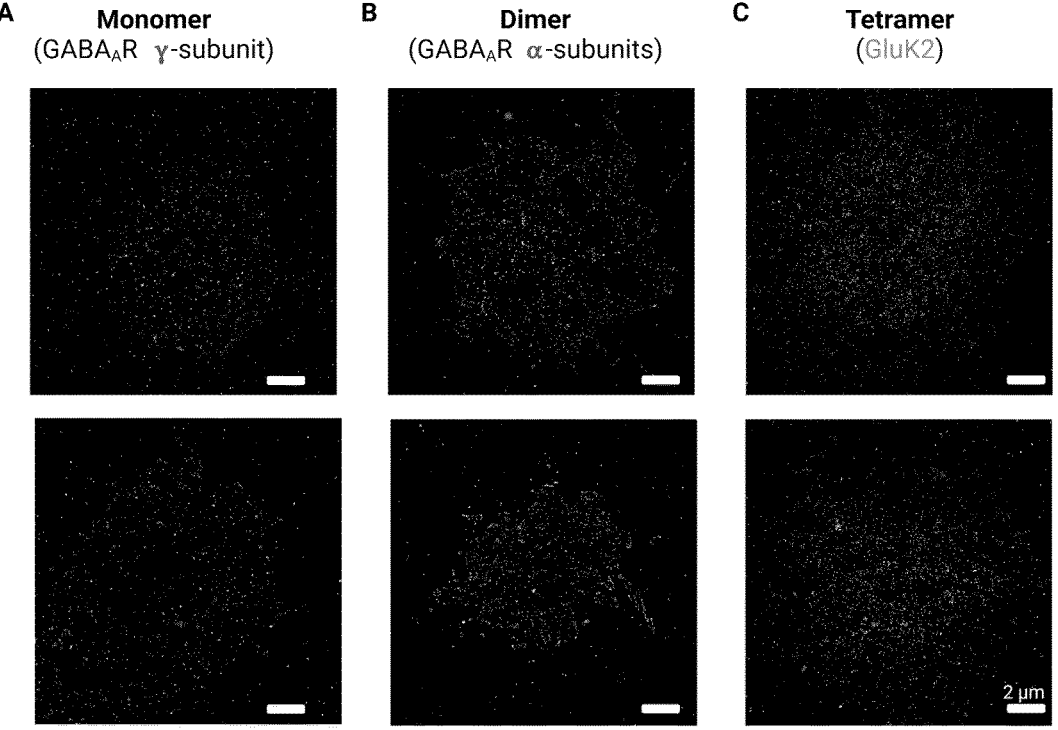

FIGS. 22A-22C are dSTORM images of membrane receptors (20 nm pixel$^{-1}$).

Figures 23A, 23B:
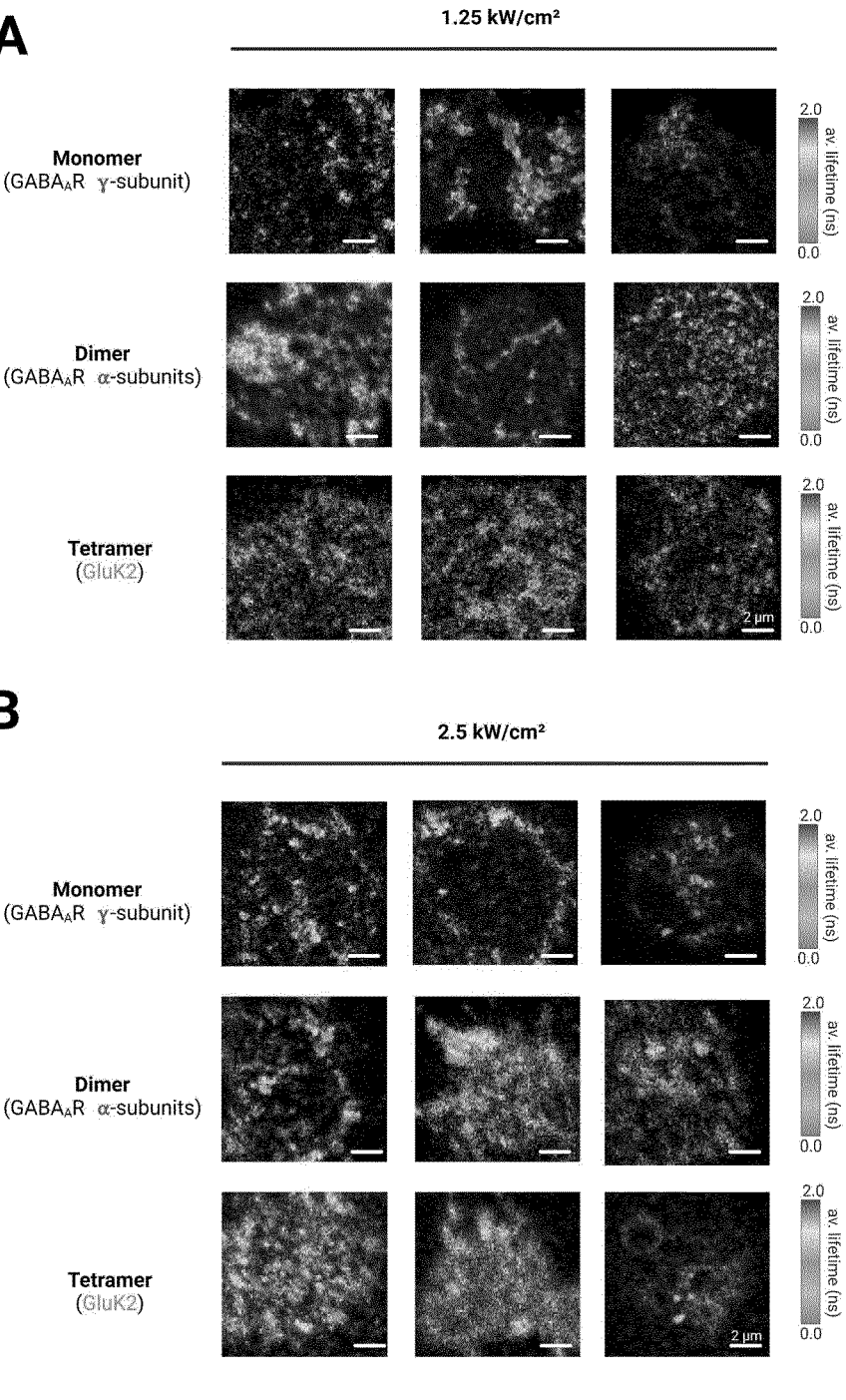

FIGS. 23A-23C are FLIM images of HEK293T cells expressing monomeric γ2-subunit of GABA-A, dimeric α2-subunit of GABA-A, and homotetrameric GluK2 receptors click-labeled with Met-Tet-Cy5 measured by confocal TCSPC imaging in photoswitching buffer at different irradiation intensities and an integration time of 5 μs pixel$^{-1}$ without applying an intensity threshold.

Figure 24:
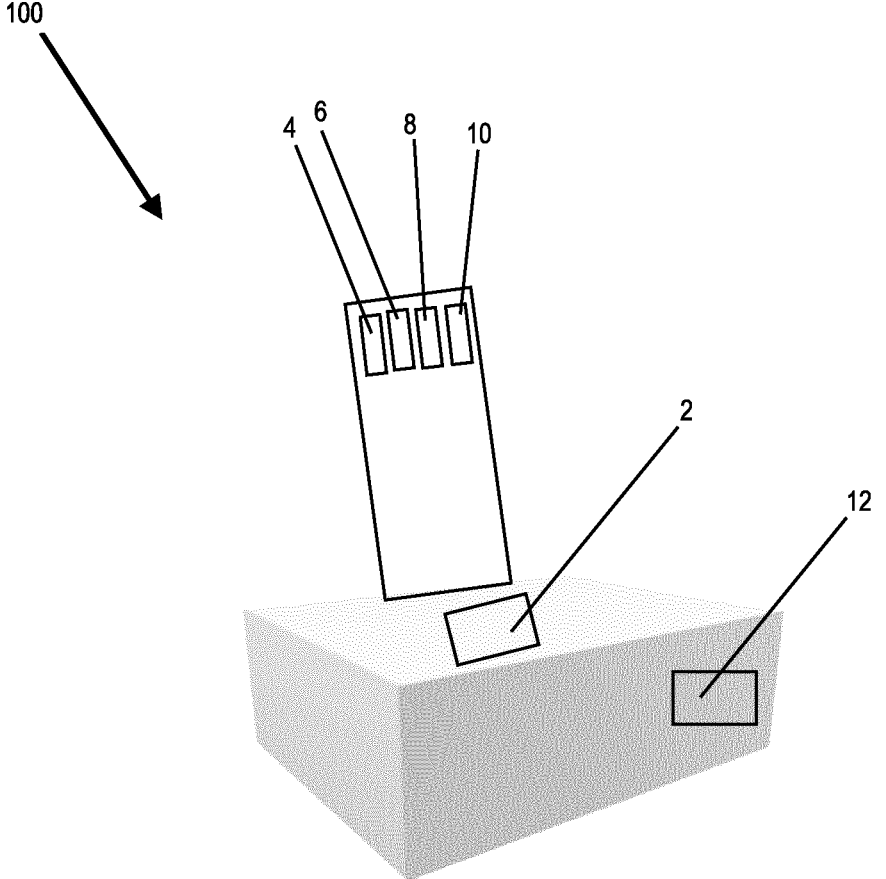

FIG. 24 is an illustrative view of one example of a system of the present disclosure.

DETAILED DESCRIPTION

To facilitate the understanding of this disclosure a number of terms of in quotation marks are defined below. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that various embodiments of the present application may be practiced without these specific details. In other instances, well-known structures or processing steps have not been described in detail in order to avoid obscuring the present application.

Throughout this disclosure, unless the context requires otherwise, the word "comprise" and variations such as "comprises" and "comprising" will be understood to imply the inclusion of a stated integer or step or group of integers or steps but not the exclusion of any other integer or step or group of integers or steps.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when element is referred to as being "beneath" or "under" another element, it can be directly beneath or under the other element, or intervening elements ay be present. In contrast, when an element is referred to as being "directly beneath" or "directly under" another element, there are no intervening elements present.

As used herein, the term "substantially" or "substantial", is equally applicable when used in a negative connotation to refer to the complete or near complete lack of an action, characteristic, property, state, structure, item, or result. For example, a surface that is "substantially" flat would either be completely at, or so nearly flat that the effect would be the same as if it were completely flat.

As used herein, terms defined in the singular are intended to include those terms defined in the plural and vice versa.

As used in this specification and its appended claims, terms such as "a", "an" and "the" are not intended to refer to only a singular entity, but include the general class of which a specific example may be used for illustration, unless the context dictates otherwise. The terminology herein is used to describe specific embodiments of the invention, but their usage does not delimit the invention, except as outlined in the claims.

Unless otherwise indicated, all numbers expressing quantities of ingredients, properties such as molecular weights, reaction conditions, and so forth as used in the specification and claims are to be understood as being modified in all instances by the term "about." Accordingly, unless indicated to the contrary, the numerical parameters in the specification and claims are approximations that may vary depending upon the desired properties sought to be obtained by the present invention. At the very least, and without limiting the application of the doctrine of equivalents to the scope of the claims, each numerical parameter should at least be construed in light of the number of reported significant digits and by applying ordinary rounding techniques. Notwithstanding that the numerical ranges and parameters describing the broad scope of the invention are approximations, the numerical values in the specific examples are reported as precisely as possible. Any numerical value, however, inherently contains standard deviations that necessarily result from the errors found in the numerical value's testing measurements.

Thus, reference herein to any numerical range expressly includes each numerical value (including fractional numbers and whole numbers) encompassed by that range. To illustrate, reference herein to a range of "at least 50" or "at least about 50" includes whole numbers of 50, 51, 52, 53, 54, 55, 56, 57, 58, 59, 60, etc., and fractional numbers 50.1, 50.2 50.3, 50.4, 50.5, 50.6, 50.7, 50.8, 50.9, etc. In a further illustration, reference herein to a range of "less than 50" or "less than about 50" includes whole numbers 49, 48, 47, 46, 45, 44, 43, 42, 41, 40, etc., and fractional numbers 49.9, 49.8, 49.7, 49.6, 49.5, 49.4, 49.3, 49.2, 49.1, 49.0, etc. In yet another illustration, reference herein to a range of from "5 to 10" includes whole numbers of 5, 6, 7, 8, 9, and 10, and fractional numbers 5.1, 5.2, 5.3, 5.4, 5.5, 5.6, 5.7, 5.8, 5.9, etc.

In the discussion and claims herein, the term "about" indicates that the value listed may be somewhat altered, as long as the alteration does not result in nonconformance of the process or structure to the illustrated embodiment. For example, for some elements the term "about" can refer to a variation of ±0.1%, for other elements, the term "about" can refer to a variation of ±1% or ±10%, or any point therein.

Results and steps of the disclosed methods are discussed in the Examples section below and are shown in FIGS. 1A-23B.

This disclosure includes a method for imaging cells. The method includes several steps, the order of which can be modified where applicable, and/or optional when applicable. The method of the present disclosure includes transfecting one or more cells with one or more plasmids to form transfected one or more cells. The transfection process can be any suitable process, including those disclosed herein and those sufficiently similar, and the plasmid can be any suitable plasmid, including those disclosed herein and those sufficiently similar.

The method includes a step of labeling the transfected one or more cells with a dye. The dye can be any suitable dye such as those selected from the group consisting of a cyanine dye, a rhodamine dye, a silicon-rhodamine dye, fluorescein dyes, oxazine dyes, Bodipy-dyes, and combinations thereof. Additionally, the dye can be selected from the group consisting of Cy5, Alexa Fluor 647. Additionally, the dye can be any dye disclosed herein and those sufficiently similar.

The method includes a step of exciting the dye with an energy source, wherein the dye is configured to emit an emission light. The energy source can be any suitable energy source, including those discussed in reference to the system 100 below, as well as those disclosed herein and those sufficiently similar. The energy source can excites the dye with any suitable irradiation intensity, including those of about 1.5 KW cm$^{-2}$ to about 5 KW cm$^{-2}$ and those of about 0.5 KW cm$^{-2}$ to about 10 KW cm$^{-2}$ those of about 0.1 KW cm$^{-2}$ to about 20 KW cm$^{-2}$ and those substantially smaller than about 0.1 KW cm$^{-2}$, such as 5% smaller, 10% smaller, 20% smaller, 50% smaller, 100% smaller or even smaller, and those substantially higher than about 20 KW cm$^{-2}$, such as 5% higher, 10% higher, 20% higher, 50% higher, 100% higher or even higher. The predetermined exposure time of the energy source is between about 5 ms (frame rate 200 Hz) to about 100 ms (frame rate 10 Hz), or about 1 ms to about 200 ms, or about 0.1 ms to about 300 ms, or about 0.01 ms to about 500 ms, and those substantially shorter than about 0.01 ms, such as 5% shorter, 10% shorter, 20% shorter, 50% shorter, 100% shorter or even shorter, and those substantially longer than about 500 ms, such as 5% longer, 10% longer, 20% longer, 50% longer, 100% longer or even longer. Additionally, several other energy levels and time periods are disclosed in the present applications, each of these values can be of a suitable range of at least the scope of those ranges disclosed in this paragraph.

The method includes a step of imaging one or more portions of the transfected one or more cells with a sensor, for a predetermined exposure time, a plurality of times to form a plurality of images. The plurality of times can be any suitable amount of times, such as about 18,000 times to about 120,000 times or about 10,000 times to about 150,000 times or about 5,000 times to about 200,000 times or about 2,000 times to about 200,000 times or about 1,000 times to about 300,000 times, or about 500 times to about 350,000 times or about 100 times to about 500,000 times or about 20 times to about 1,000,000 times, or fewer than 20 time such as 5% fewer, 10% fewer, 20% fewer, 50% fewer, 100% fewer or even fewer, and those substantially more than about 1,000,000, such as 5% more, 10% more, 20% more, 50% more, 100% more or even more.

The method includes a step classifying each image of the plurality of images into a first group of images above a predetermined threshold for a number of photons per image or a second group of images below the predetermined threshold the number of photons per image, using any suitable technique and/or process disclosed herein and those sufficiently similar.

The method includes a step of analyzing the first group of images to track locations of the one or more portions for each of the first group of images and to track a fluorescence trajectory of each photon in the first group of images, using any suitable technique and/or process disclosed herein and those sufficiently similar.

The method includes a step of applying a pulsed, excitation light energy to the transfected one or more cells. The pulsed, excitation light energy can be created by any suitable element, such as a light and/or a laser light and/or radiation, etc., including excitation light energy sources disclosed herein and those sufficiently similar. The irradiation intensity of the pulsed, excitation light can be within any suitable range, such as about 0.5 kW cm$^{-2}$ to about 2.5 kW cm$^{-2}$ and those of about 0.4 KW cm$^{-2}$ to about 5 KW cm 2 those of about 0.2 KW cm$^{-2}$ to about 10 KW cm$^{-2}$ and those substantially smaller than about 0.1 KW cm$^{-2}$, such as 5% smaller, 10% smaller, 20% smaller, 50% smaller, 100% smaller or even smaller, and those substantially higher than about 10 KW cm$^{-2}$, such as 5% higher, 10% higher, 20% higher, 50% higher, 100% higher or even higher.

The method includes a step of measuring an emission energy from the excited, transfected one or more cells with any suitable sensor, such as those disclosed herein and those sufficiently similar.

The method also includes a step of determining whether the emission energy is from one or more independently emitting quantum systems based on the measured emission, the tracked locations of the one or more portions and the fluorescence trajectory, using any suitable technique and/or process disclosed herein and those sufficiently similar.

The disclosed method can also include a step wherein the locations of the one or more portions, for each of the first group of images are tracked within a predetermined tracking radius of about 150 nm (or any suitable radius, such as about 100 nm to about 200 nm, about 50 nm to about 300 nm, or those substantially smaller than about 100 nm, such as 5% smaller, 10% smaller, 20% smaller, 50% smaller, 100% smaller or even smaller, and those substantially larger than about 10 300 nm, such as 5% larger, 10% larger, 20% larger, 50% larger, 100% larger or even larger) using any suitable technique and/or process disclosed herein and those sufficiently similar.

The disclosed method can include a step, subsequent to the analyzing the first group of images step, of determining an inside number of images of the first group of images within the predetermined tracking radius and an outside number of images of the first group of images external to the predetermined tracking radius, using any suitable technique and/or process disclosed herein and those sufficiently similar.

As seen in FIG. 24, a system 100 is shown, which is configured to image one or more cells. The system includes a holder 2 that is configured to receive dye labeled, trans-fected one or more cells (not shown). The holder 2 can be any suitable vessel, such as a well of a plate, a plate, a dish, a beaker, etc. Also included in the system 100 is an energy source 4, which is configured to excite the dye of the dye labeled, transfected one or more cells. The energy source 4 can be any suitable element that is capable of exciting a dye, such as a light and/or a laser light and/or radiation, etc., including energy sources disclosed herein.

The system 100 includes an imaging sensor 6, which is configured to image one or more portions of the dye labeled, transfected one or more cells, for a predetermined exposure time, a plurality of times to form a plurality of images. These images can be stored in any suitable memory, such as a memory within the system 100 and/or a memory outside of the system 100. The imaging sensor 6 generally refers to a device or a combination of a plurality of devices configured for sensing at least one parameter. Imaging sensor 6 can also refer to a device that detects, converts, and/or conveys data constituting an image. The sensor can detect light passing through and/or reflected by an object, convert the variations or attenuations of light into signals, and then convey the signals to a processing entity (e.g., a processor 12, controller, etc.). Image sensors described herein, including imaging sensor 6, can detect electromagnetic radiation including, but not limited to infrared light, visible light, ultraviolet light, fluorescence, or other types of radiation falling in the electromagnetic spectrum. In some embodiments, imaging sensor 6 includes, without limitation, cameras, semiconductor charge-coupled device (CCD) sensors, diodes, photo-diodes, photodiode arrays, active pixel sensors having complementary metal-oxide-semiconductor (CMOS) constructions, or N-type metal-oxide-semiconductor (NMOS, Live MOS) technologies, including imaging sensors disclosed herein.

The system 100 includes an excitation light energy source 8, which is configured to apply a pulsed, excitation light energy to the dye labeled, transfected one or more cells. The excitation light energy source 8 can be any suitable element that is capable of applying a pulsed, excitation light, such as a light and/or a laser light and/or radiation, etc., including excitation light energy sources disclosed herein. In some embodiments the energy source 4 and the excitation light energy source 8 can be a single energy source or part of a same device.

The system 100 also includes an emission energy sensor 10, which is configured to measure an emission energy from the excited, transfected one or more cells. Sensors described herein, including emission energy sensor 10, can detect electromagnetic radiation including, but not limited to infrared light, visible light, ultraviolet light, fluorescence, or other types of radiation falling in the electromagnetic spectrum. In some embodiments, imaging sensor 6 includes, without limitation, cameras, semiconductor charge-coupled device (CCD) sensors, diodes, photodiodes, photodiode arrays, active pixel sensors having complementary metal-oxide-semiconductor (CMOS) constructions, or N-type metal-oxide-semiconductor (NMOS, Live MOS) technologies, including imaging sensors disclosed herein. In some embodiments the emission energy sensor 10 and the imaging sensor 6 can be a single sensor or part of a same device.

The system 100 further includes a processor 12, the processor 12 comprising hardware. In some embodiments the processor 12 is housed within a portion of the system 100, in other embodiments, the processor 12 is remote from the system 100 but is in wired and/or wireless communication with the system 100.

The processor 12, controller, or circuit, as used herein can be incorporated in any suitable processing device, such as a printed circuit board. In other embodiments, the circuitry and/or software of the present application may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The processor 12 can be configured to receive data and/or signals from any or all of the energy source 4, the imaging sensor 6, the excitation light energy source 8, and/or the emission energy sensor 10 through any suitable wired and/or wireless transmission.

The processor 12 is configured to classify each image of the plurality of images into a first group of images above a predetermined threshold for a number of photons per image or a second group of images below the predetermined threshold the number of photons per image. The processor 12 is also configured to analyze the first group of images to track locations of the one or more portions for each of the first group of images and to track a fluorescence trajectory of each photon in the first group of images. The processor 12 is also configured to determine whether the emission energy is from one or more independently emitting quantum systems based on the measured emission, the tracked locations of the one or more portions and the fluorescence trajectory.

In some embodiments, the processor 12 can also determine an inside number of images of the first group of images within the predetermined tracking radius and an outside number of images of the first group of images external to the predetermined tracking radius.

The methods and systems of the present disclosure are further discussed in the Examples section below:

EXAMPLES

In the following examples and herein, it is disclosed that resonance energy transfer between fluorophores separated by less than 10 nm results in accelerated fluorescence blinking and consequently lower localization probabilities impeding sub-10 nm fluorescence imaging. Time-resolved fluorescence detection in combination with photoswitching fingerprint analysis can be used advantageously to determine the number and distance even of spatially unresolvable fluorophores in the sub-10 nm range. In combination with genetic code expansion (GCE) with unnatural amino acids and bioorthogonal click-labeling with small fluorophores photoswitching fingerprint analysis enables sub-10 nm resolution fluorescence imaging in cells.

To decipher the limits SMLM methods such as dSTORM are facing in the sub-10 nm regime that cause the observed significant deterioration in localization probability, DNA origami with different interfluorophore distance was reviewed. Data demonstrated that the on/off photoswitching kinetics is influenced by interfluorophore distance in the sub-10 nm range. Photoswitching fingerprint analysis in combination with time-resolved fluorescence detection can overcome these limitations, as discussed below and herein. The concept is demonstrated on DNA origami carrying four fluorophores at distances of 18, 9, 6, and 3 nm and its translation to biological systems is shown by the disclosed investigation of the stoichiometry and interfluorophore distance of subunits of oligomeric receptors in cells labeled by genetic code expansion (GCE) with unnatural amino acids and click labeling using tetrazine-dyes.

The 10 Nanometer (10-nm) Resolution Barrier

Figure 7:
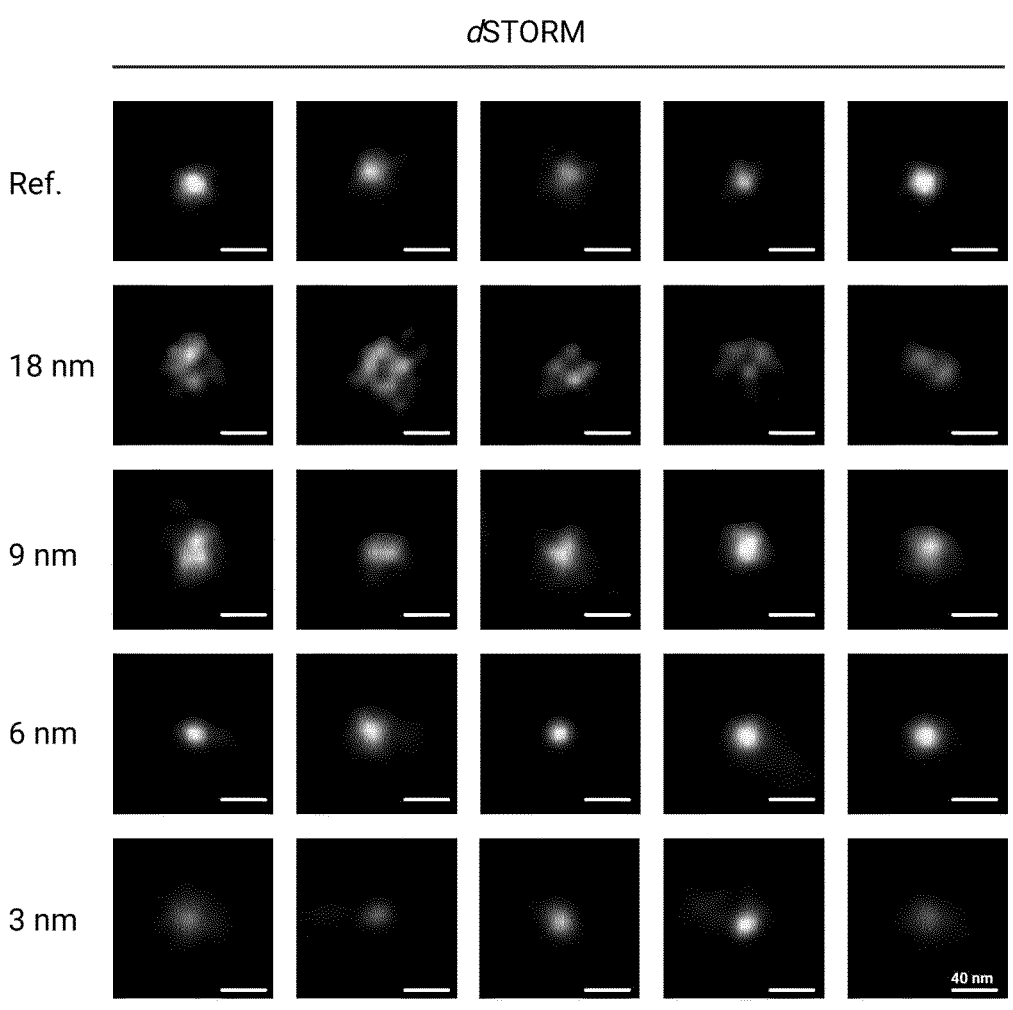
FIG. 7 are dSTORM images of DNA origami with one (Ref.) or four Cy5 dyes with interfluorophore distances of 18, 9, 6, and 3 nm.
Figure 8:
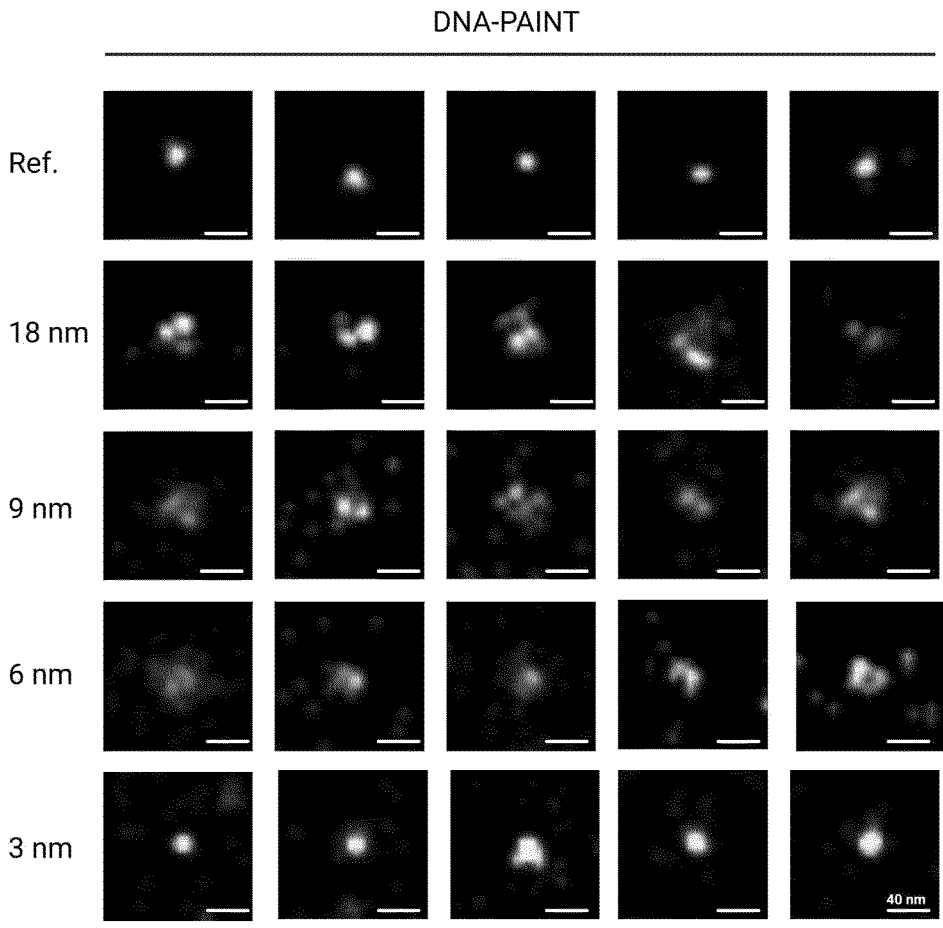
FIG. 8 are DNA-PAINT images of DNA origami with one (Ref.) or four docking strands separated by 18, 9, 6, and 3 nm.
Figures 9A, 9B, 9C, 9D, 9E:
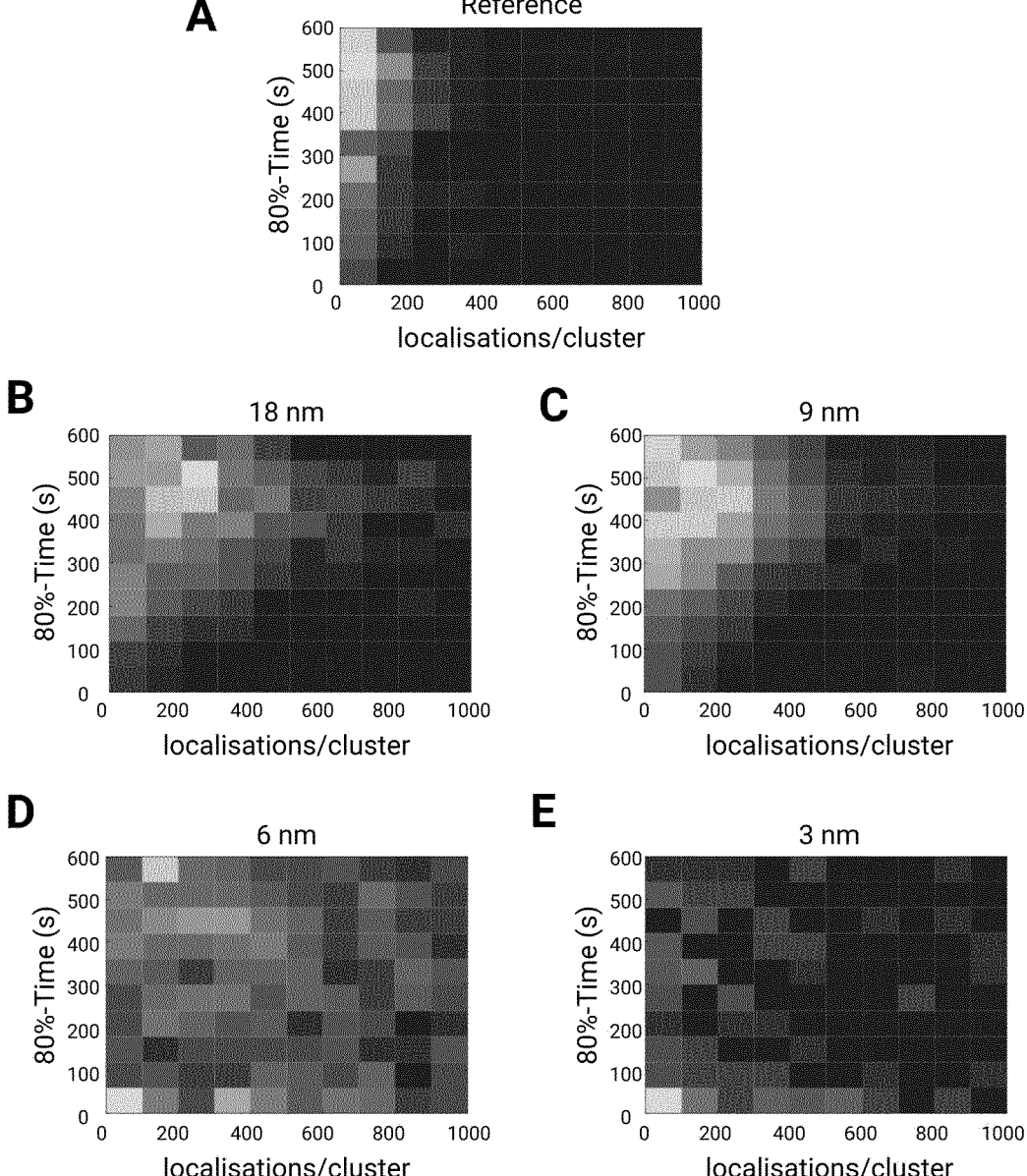
FIGS. 9A-9E are bivariate histograms of detected localizations and the times after which 80% of all localizations were detected per individual DNA origami. The histograms show that for shorter interfluorophore distances of 3 and 6 nm 80% of all localizations are detected during the first minute.

To investigate the problems associated with sub-10 nm fluorescence imaging in more detail, DNA origami carrying four Cy5 dyes (which are the dyes that can be used in Direct stochastic optical reconstruction microscopy (dSTORM)), which is a technique of single-molecule super-resolution imaging, which may not include an activator fluorophore) separated by 18, 9, 6, and 3 nm were designed and immobilized on coverslips via biotin-streptavidin binding (FIGS. 1A, 3A-3G, and 4). As reference the same DNA origami labeled with only a single Cy5. dSTORM was used, imaging was performed in standard photoswitching buffer using exclusive 640 nm irradiation. While dSTORM can resolve the four fluorophores at 18 nm distance in some cases it cannot resolve the fluorophores separated by 9, 6, and 3 nm (FIG. 1B and FIG. 7). For direct comparison DNA-PAINT using Cy3B-labeled imager strands was performed (FIG. 1C and FIG. 8). DNA-PAINT clearly achieves a higher spatial resolution but also fails to resolve the fluorophores for shorter distances of 6 and 3 nm. Even though intact DNA origami carrying four fluorophores (FIG. 1B and FIG. 1C) was detected, for most DNA origami investigated four fluorophores (FIG. 7 and FIG. 8) could not be detected.

However, there is a difference in photoswitching kinetics, i.e. blinking noticeable in the dSTORM movies recorded from the 6 nm and 3 nm DNA origami. While the DNA-PAINT movies recorded for the different origami do not show any difference in blinking behavior throughout the entire recording time, the dSTORM recorded videos of the 6 nm and 3 nm origami showed often a "flickering" fluorescence intensity during the first seconds, i.e. very fast blinking compared to the expected well-defined blinking of Cy5 dyes as observed for the reference and the 18 nm origami. Even for the 9 nm DNA origami some fluorescent spots appeared to show faster blinking. Comparison of the fluorescence signal densities during the first seconds and after a few minutes indicates that faster blinking is accompanied with faster photobleaching These observations point out that the on/off photoswitching kinetics of Cy5 dyes is substantially accelerated at shorter interfluorophore distances.

In order to understand what causes the changes in photoswitching kinetics the dSTORM switching mechanism is reviewed. dSTORM temporally separates the fluorescence of individual organic dyes by transferring the majority of them into a nonfluorescent off-state at the beginning of the experiment upon irradiation with intensities of a few kW $cm^{-2}$ in thiol-based photoswitching buffer. The fluorescent on-state of a small subset of fluorophores is then generated by irradiating the sample usually at shorter wavelengths, i.e. typically at about 405 nm. Unfortunately, there is no real consensus as to the origin of photoswitching of the two favorite dSTORM cyanine dyes Alexa Fluor 647 (AF647) and Cy5. While a recent study identified the formation of a Cy5-thiol adduct with absorption maximum at 310 nm as off-state in dSTORM experiments another study proposed the formation of a radical formed by one-electron reduction of the cyanine dye with a lifetime of a few tens of milliseconds and an absorption maximum at ~450 nm. But, Cy5 fluorescence can be restored from the off-state also upon irradiation with red light demonstrating that the off-state exhibits a broad absorption spectrum. This also corroborates the experimental finding that dSTORM imaging can be performed using exclusive irradiation at the absorption maxima of AF647 and Cy5.

These considerations indicate that the nonfluorescent off-state of fluorophores can serve as energy transfer acceptor for the on-state of other fluorophores, i.e. for interfluorophore distances <10 nm the on-state of one fluorophore can serve as donor and excite fluorophores residing in their off-state (acceptors) via fluorescence resonance energy transfer (FRET) into higher excited states from which the on-state can be repopulated. Because FRET from a donor with emission maximum at ~670 nm to an acceptor with a low extinction coefficient in the red wavelength range is inefficient, it is difficult to detect by standard means, e.g. fluorescence quenching of the donor (on-state). However, with increasing number of off-states present in the near-field of a donor the impact of these energy transfer processes on the fluorescence behavior of the multichromophoric system increases and will be measurable. In addition, albeit inefficient, each successful FRE event that transfers a fluorophore from the off- to the on-state will change the blinking pattern of the multichromophoric systems. Therefore, photoswitching kinetics should directly report about the interfluorophore distance in the sub-10 nm range. In practice this means that photoswitching should be accelerated at shorter interfluorophore distance and result in accumulation of fluorophores in their on-state.

Multichromophoric systems composed of several fluorophores separated by less than 10 nm show very complex fluorescence trajectories including collective off-states and different intensity levels also in the absence of photoswitching buffer because the fluorophores can interact by various energy transfer pathways including energy hopping, singlet-singlet- and singlet-triplet-annihilation. Therefore, multichromophoric systems often behave like single emitters in photon antibunching experiments. In addition, red-absorbing cyanine dyes such as Cy5 show a peculiar complicated behavior because of photoinduced isomerization from the fluorescent trans to a nonfluorescent cis state and back-isomerization. In addition, both the absorption spectra of the triplet state ($\lambda$max=695 nm, $\dot{\iota}$=105.000 cm-1 M-1) and cis state ($\lambda$max=675 nm, $\varepsilon$=326.000 cm-1 M-1) overlap strongly with the fluorescence emission of Cy5. Considering the fact that Cy5 spends ~50% of the time in its cis state under equilibrium conditions in aqueous solutions that exhibits a lifetime of ~200 $\mu$s it appears that Cy5 fluorophores separated by less than 10 nm can interact by various energy transfer pathways that result in the observation of blinking processes on different time scales.

Consequences for Sub-10 nm Fluorescence Imaging

Figures 1A, 1B, 1C, 1D, 1E, 1F, 1G, 1H:
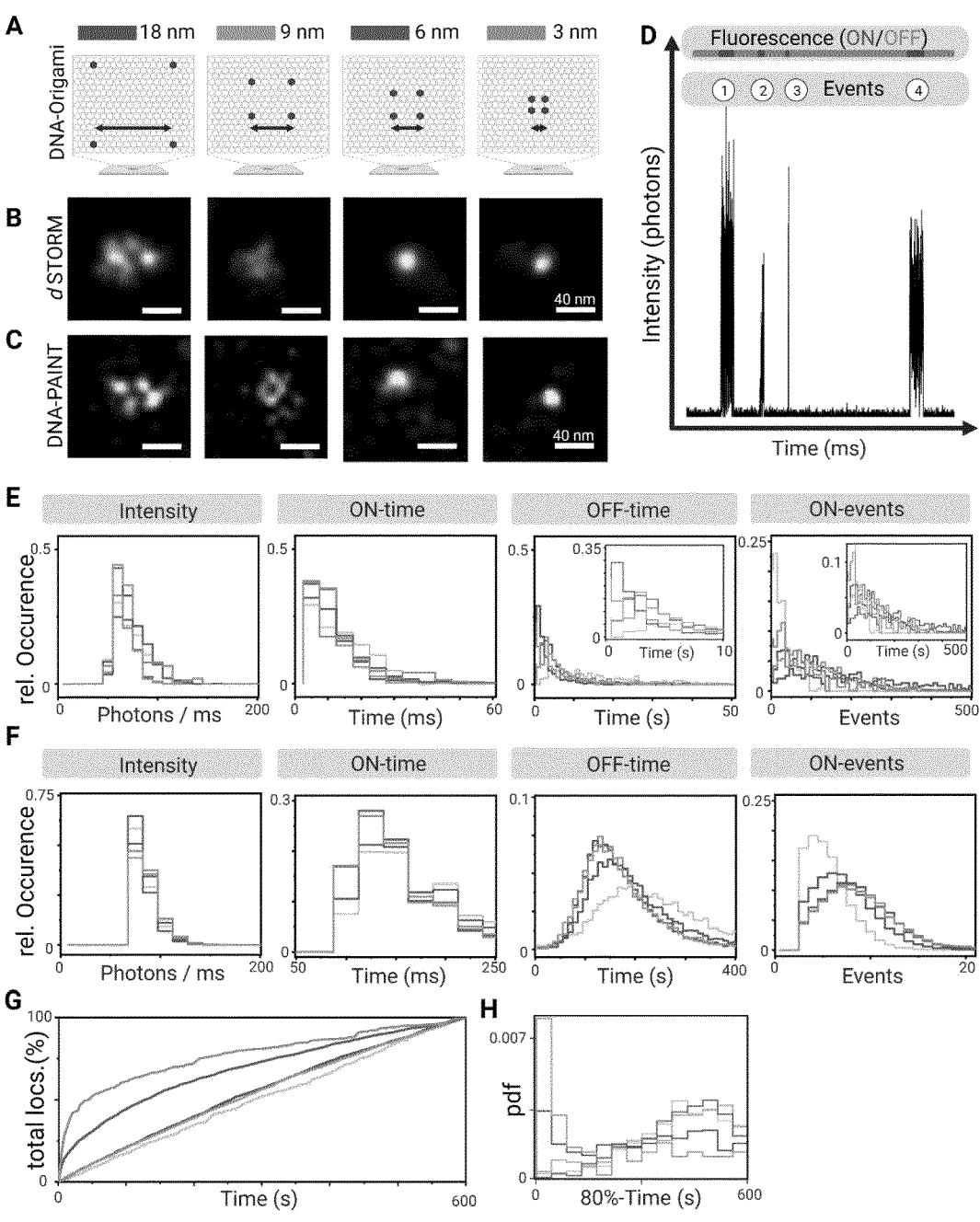
FIGS. 1A-1H are dSTORM and DNA-PAINT imaging of DNA origami.

To elucidate how the described energy transfer processes compromise super-resolution microscopy in the sub-10 nm range the fluorescence trajectories recorded in dSTORM experiments from individual DNA origami with different interfluorophore distance at a temporal resolution of 5 ms (FIG. 1D) were analyzed to investigate if the blinking pattern of individual fluorophores, termed in the following photoswitching fingerprints, can be used to decode information about the underlying multichromophoric system. Analysis of individual photoswitching fingerprints revealed that the on-state of multiple labeled DNA origami shows similar lifetimes (on-time) but shorter off-state lifetimes (off-times) compared to the single dye reference as expected for multiple blinking fluorophores (FIG. 1E). In addition, the data clearly point out that the off-times decrease with decreasing interfluorophore distance (see enlarged section in FIG. 1E), i.e. the photoactivation rate increases with decreasing interfluorophore distance as expected for energy transfer between the on- and off-state. Furthermore, the on-state intensity is identical for the reference and the 18 and 9 nm DNA origami but slightly higher for the shorter interfluorophore distances (FIG. 1E). In contrast, DNA-PAINT experiments revealed photoswitching parameters independent of the distance of docking strands. Only the singly labeled reference shows, as expected longer off-times and less on-events (FIG. 1F). This result is expected since the binding of imager to docking strands is decoupled from irradiation. The broad distributions of the number of on-events indicates that for the majority of DNA origami less than four fluorophores and docking strands, respectively, are localized (FIGS. 1E and 1F).

The low localization probability in both, dSTORM and DNA-PAINT experiments could be explained by incomplete incorporation of modified oligonucleotides and labeling, respectively. In addition, in DNA-PAINT steric hindrance of docking and imager strands with lengths of 11 and 10 bases, respectively, can distort labeling and transient binding, respectively, especially at shorter distances. In dSTORM experiments fast blinking observed as flickering at the very beginning of irradiation promotes fast photobleaching and might thus impede the localization of all fluorophores as individual emitters.

Another way of considering the blinking statistics of DNA origami is to plot the summed up localizations detected per frame as a function of time. Here the singly labeled reference and the 9 and 18 nm DNA origami show a linear increase in the number of localizations with time in dSTORM experiments (FIG. 1G). In a DNA origami carrying a single or four non-communicating Cy5 dyes each fluorophore will reside on average for several milliseconds in the on-state and several seconds in the off-state. Accordingly, homogeneous blinking is observed until photobleaching occurs. At shorter distances, however, the DNA origami show substantially faster blinking due to energy transfer from the on- to the off-state and subsequent repopulation of the on-state. The distribution of times after which 80% of all localizations are detected per DNA origami confirms fast blinking during the first minutes for the majority of the 3 and 6 nm DNA origami (FIG. 1H and FIGS. 9A-9E). Thus, our data clearly show that the temporal development of localizations detected from a sample labeled with Cy5 fluorophores changes at interfluorophore distances of <10 nm.

The consequences of sub-10 nm fluorescence imaging are apparent considering that at the very beginning of a dSTORM experiment all fluorophores reside in their fluorescent on-state and have to be transferred to their off-state upon irradiation. During this time fast photoswitching can be initiated and fluorophores might be photobleached already during the first few tens of seconds of the experiment, e.g. during sample alignment. Consequently, this results in substantially decreased localization probabilities and lower structural resolutions just like as it has been observed in previous structured illumination single-molecule localization experiments.

Figures 2A, 2B, 2C, 2D, 2E, 2F, 2G, 2H, 2I, 2J, 2K:
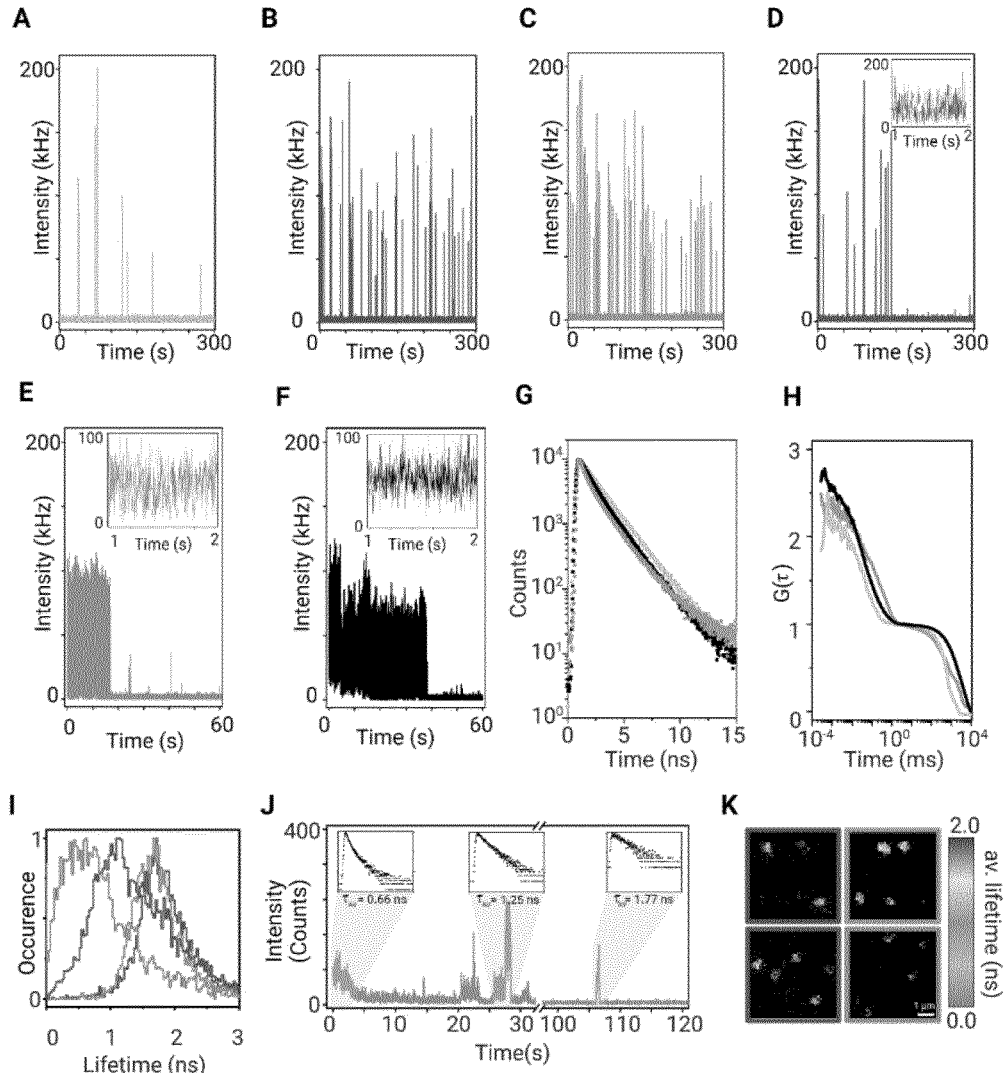
FIGS. 2A-2K illustrate various energy transfer pathways being responsible for fast blinking observed in the sub-10 nm range.
Figure 10:
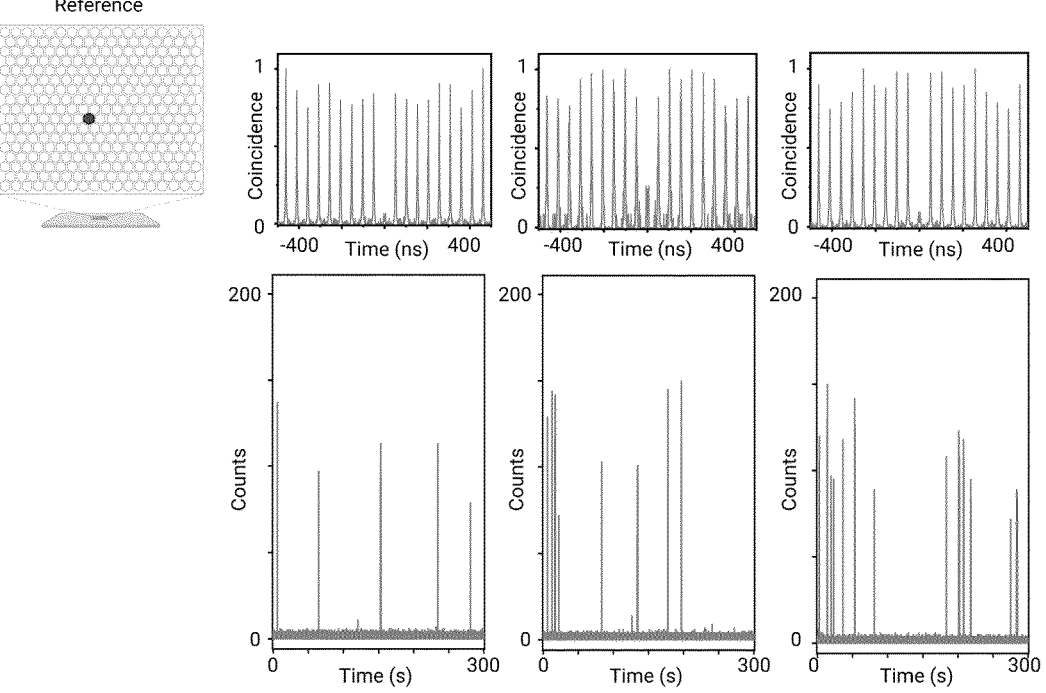
FIG. 10 is illustrations of fluorescence trajectories and corresponding normalized interphoton time (coincidence)

Time-Resolved Fluorescence Detection Reveals the Average Interfluorophore Distances To obtain a more detailed picture of the photoswitching characteristics, individual DNA origami with higher temporal resolution by time-resolved confocal single-molecule fluorescence microscopy (FIGS. 2A-E) was investigated. Single-molecule surfaces were scanned with very low irradiation intensity to minimize premature photobleaching, individual DNA origami selected and parked in the laser focus to record the fluorescence intensity and lifetime with time. In photoswitching buffer, the reference DNA origami displayed blinking with short (milliseconds) on-states and long (seconds) off-states (FIG. 2A and FIG. 10). As expected for four independently emitting fluorophores 18 nm DNA origami displayed more switching events per time with similar intensities (FIG. 2B and FIG. 11). The 9 nm DNA origami showed very similar behavior, however, some parts of the trajectories indicated faster photoswitching kinetics especially at the beginning of irradiation (FIG. 2C and FIG. 12). In contrast, some of the 6 and 3 nm DNA origami showed very fast photoswitching kinetics at the very beginning of the trajectories. Magnified views of the first seconds of the trajectories emphasize that the off-state lifetimes of DNA origami with interfluorophore distances of 3 and 6 nm are much shorter, i.e. blinking occurs on the millisecond time scale (FIGS. 2D, 2E and FIGS. 13 and 14).

In addition, photon antibunching experiments were performed to investigate the number of emitting fluorophores contributing to the detected fluorescence signal per single DNA origami (FIGS. 10-14). Photon antibunching experiments take advantage of the fact that the probability of emitting two consecutive photons drops to zero for a single emitter for time intervals shorter than the excited-state lifetime. For sufficiently short laser pulses the number of photon pairs detected per laser pulse can be used to determine whether the emission is from one or more independently emitting quantum systems. Since the intensity of the central peak contains information about the number of independently emitting molecules, the number of photon pairs detected in the central peak, $N_c$, at delay time zero, to the average number of the lateral peaks, $N_{l,av}$, can be used to determine the number of independently emitting fluorophores. For example, neglecting background, $N_c/N_{l,av}$ ratios of 0.0, 0.5, 0.67, and 0.75 are expected for 1-4 independently emitting fluorophores, respectively. If, for interfluorophore distances of <10 nm the on-states are repopulated via energy transfer a higher $N_c/N_{l,av}$ ratio measured for the 3 and 6 nm DNA origami would be expected. And in fact, the $N_c/N_{l,av}$ ratios increase from 0.067 (reference) via 0.073 (18 nm) and 0.085 (9 nm) to 0.207 (6 nm) and 0.255 (3 nm) for the different DNA origami (FIG. 15). Higher $N_c/N_{l,av}$ ratios are prevented by efficient energy hopping, singlet-singlet- and singlet-triplet-annihilation between Cy5 fluorophores in the on-state. Nonetheless, the slightly increased ratios detected for sub-10 nm interfluorophore distance is in accordance with the slightly higher fluorescence intensities recorded in dSTORM experiments form the 3 and 6 nm DNA origami (FIG. 1E).

To dissect the two different energy transfer pathways (trans/cis and on/off) the 3 nm DNA origami in the absence of photoswitching, i.e. in PBS, pH 7.6 containing 1 mM trolox/troloxquinone and an oxygen scavenging system to prolong the observation time was investigated. The fluorescence trajectories of the 3 nm DNA origami showed similar blinking behavior in trolox buffer during the first seconds of irradiation but more fluorescence intensity levels (FIG. 2F and FIG. 16). The similarity of the trajectories in the absence and presence of photoswitching buffer corroborates that in dSTORM experiments with interfluorophore distances of <10 nm all fluorophores are efficiently transferred to the on-state resulting in fast blinking or flickering dependent on the temporal resolution of the experiment. Average fluorescence decays generated from n=7-10 fluorescence trajectories of individual reference and 3 nm DNA origami recorded in aqueous buffer by time-correlated single-photon counting (TCSPC) (FIGS. 10, 14, and 16)) revealed a fluorescence quenching pathway at 3 nm interfluorophore distance indicated by a short fluorescence lifetime component (FIG. 2G). While the reference DNA origami labeled with a single Cy5 displayed a monoexponential fluorescence lifetime of ~1.8 ns the fluorescence decay of the 3 nm DNA origami recorded in trolox buffer exhibited multiexponential kinetics with a short lifetime component of ~600 ps due to energy transfer from one fluorophore in the trans to another fluorophore residing in the cis state, neglecting energy transfer to the shorter-lived triplet state (FIG. 2G). As a photoinduced process the efficiency of trans/cis isomerization, i.e. the degree of energy transfer is determined by the irradiation intensity and thus not seen in standard ensemble TCSPC experiments where low irradiation intensities can be applied (FIG. 17).

The fluorescence decay of 3 nm DNA origami recorded in photoswitching buffer exhibited multiexponential kinetics with a shorter fluorescence lifetime component of ~400 ps (FIG. 2G). The shorter fluorescence lifetime component confirms the additional energy transfer pathway in photoswitching buffer from one fluorophore in the on-state (donor) to another fluorophore in the off-state (acceptor). Furthermore, direct comparison of the fluorescence intensity autocorrelation functions of 3 nm DNA origami recorded during the first seconds of the trajectories demonstrates that the fluorescence fluctuations are dominated by energy transfer from the fluorescent trans to the nonfluorescent triplet and the cis state of Cy5 in trolox buffer. However, in photoswitching buffer an additional small on/off component appears in the few hundred microseconds range which is attributed to energy transfer from the on- to the off-state followed by repopulation of the on-state (FIG. 2H). Since all the observed on/off processes are strongly controlled by the excitation efficiency, reduction of the irradiation intensity slows down the blinking kinetics but simultaneously decreases the fluorescence intensity in the on-state and thus the localization precision (FIGS. 18A-18C).

The interfluorophore distance determines the off-state lifetime in dSTORM experiments and is also encoded in the fluorescence lifetimes, whereas the number of on-events detected contains information about the number of fluorophores present. Consequently, the fluorescence lifetime of DNA origamis decreases with decreases interfluorophore distance (FIG. 2I). Furthermore, the fluorescence lifetime of fluorophores in the 3 nm DNA origami increases during the fluorescence trajectory with progressing fluorophore photobleaching (FIG. 2J). In the example shown, the average fluorescence lifetime increases from 0.66 ns at the very beginning via 1.25 ns to 1.77 ns at the end when all fluorophores but a single survived (FIG. 2J and FIG. 19). This demonstrates that the quenching efficiency of the on-state is determined by the number of off-states (quenchers) present. Fluorescence lifetime (FLIM) images of the four DNA origami measured in trolox buffer confirm that fast photobleaching of fluorophores during the first seconds of irradiation impede the observation of the described energy transfer processes. While individual 18 and 9 nm DNA origami are imaged with lifetimes of ~2 ns, 6 and 3 nm DNA origami show partially patchy spots with substantially shorter fluorescence lifetimes (FIG. 2K and FIG. 20).

Sub-10 nm Super-Resolution Fluorescence Imaging in Cells

To translate the findings into biological applications, i.e., super-resolution imaging in cells, the labeling problem is to be solved. While site-specific and efficient labeling of DNA origami with organic dyes is substantially straightforward, site-specific fluorescence labeling of biomolecules separated by only a few nanometers remains challenging. In addition, the displacement of the fluorophore from the point of interest (the linkage error) and the conformational flexibility of the linker determines the localization accuracy achievable in super-resolution imaging experiments. Approaches to minimize the displacement of the fluorophore have been introduced including nanobodies and peptide tags but still yield linkage errors of a few nanometers, thus preventing the translation of 1-5 nm localization precision into image resolution in real biological samples. Furthermore, the sheer size of the fluorescent probe including fluorophore, linker, and affinity reagent does not only increase the linkage error but also limit the achievable labeling density. One approach to solve the labeling problem is direct covalent site-specific attachment of an organic dye to a protein of interest, which can be achieved by genetic code expansion (GCE) incorporating a non-canonical amino acids (ncAAs) into the protein of interest that can be efficiently labeled by bioorthogonal click chemistry with small organic dyes. The method enables site-specific efficient labeling of intra- and extracellular proteins with a linkage error of ~1 nm with super-resolution microscopy suited organic dyes. Latest studies demonstrated that click labeling of non-natural amino acids with small tetrazine-dyes is a versatile tool for the labeling of sterically difficult to access protein sites also in crowded environment.

Figures 3A, 3B, 3C, 3D, 3E, 3F, 3G:
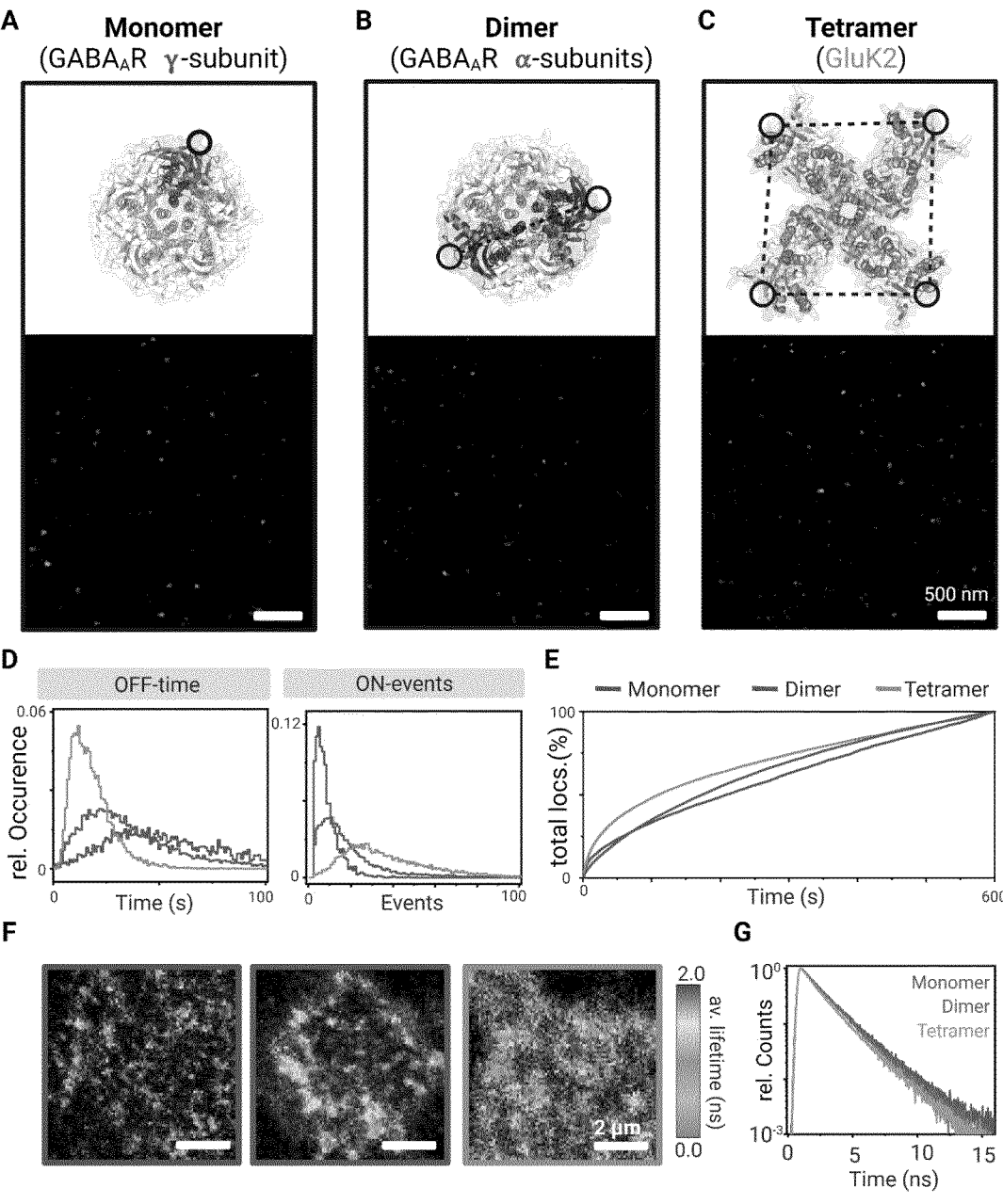
FIGS. 3A-3G illustrate time-resolved photoswitching fingerprint analysis in cells.
Figure 4:
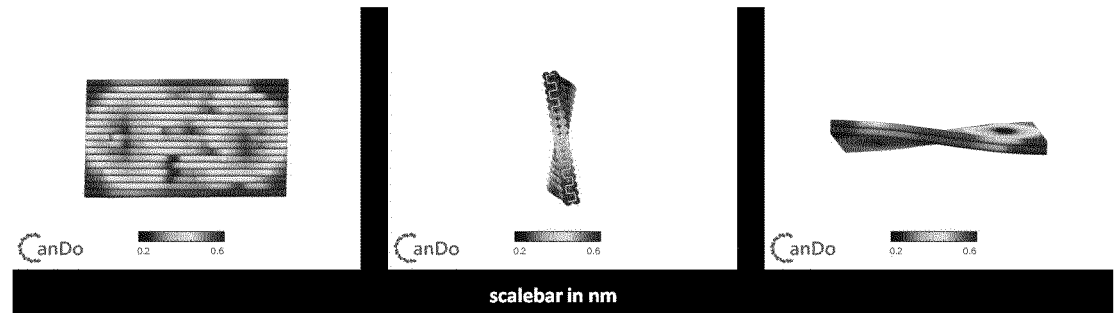
FIG. 4 illustrates DNA origami stability calculation. The stability of the designed rectangle DNA origami structures were calculated using the software CanDO with standard DNA parameters. Heatmap in nm.
Figure 5:
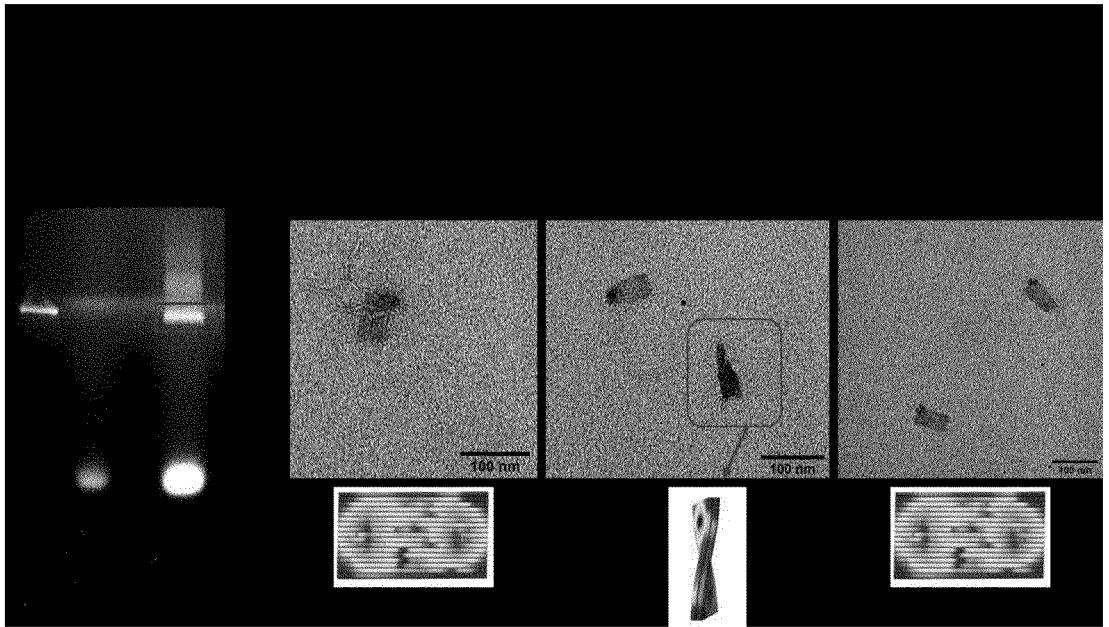
FIG. 5 illustrates DNA origami quality control. Hybridized DNA origami structures were purified using 1.5% agarose gel. The marked band was cut out and the shape of the DNA origami structures were analyzed using electron microscopy.
Figures 6A, 6B:
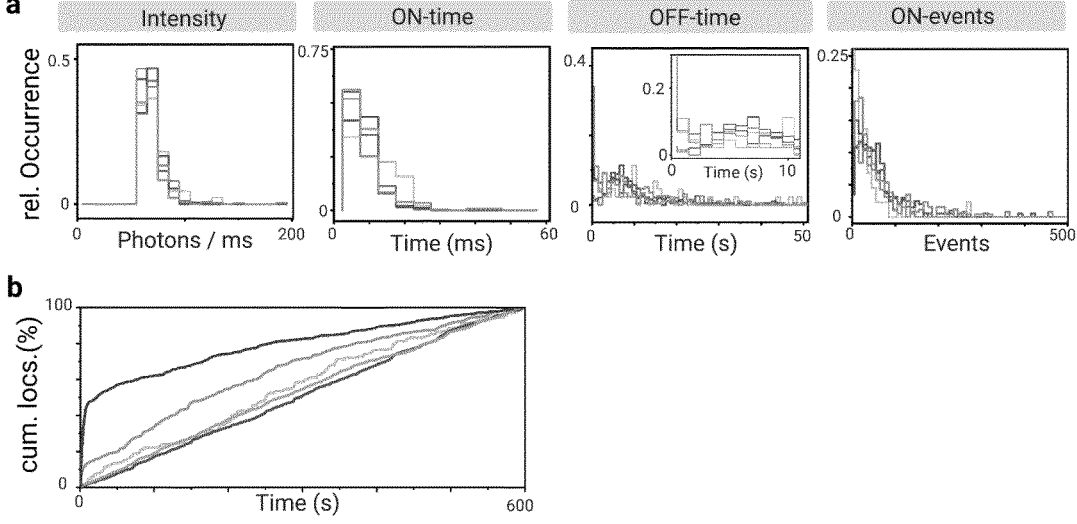
FIGS. 6A-6B illustrate photoswitching fingerprint analysis of DNA origami imaged by dSTORM in standard photoswitching buffer in the presence of oxygen scavenger.

The combination of time-resolved photoswitching fingerprint analysis in combination with GCE with ncAAs and click-labeling can be used to determine information about the molecular stoichiometry and interfluorophore distances in the sub-10 nm range in biological samples. Two different multimeric proteins were selected, the hetero-pentameric γ-aminobutyric acid type A (GABA-A) and the tetrameric kainate receptor (GluK2). Site-specific labeling was achieved by incorporation of one or more trans-cyclooct-2-ene (TCO)-modified ncAAs (TCO*-L-lysine) into the extracellular domains of the (i) monomeric γ2-subunit, (ii) dimeric α2-subunit of GABA-A, and (iii) homotetrameric GluK2 (FIGS. 3A-3C). To identify the best positions for the insertion of ncAAs, various click constructs were generated: L198TAG and S217TAG for GABA-A receptors γ2-subunit, K73TAG, S171TAG, S173TAG, S181TAG, S201TAG, and K274TAG for GABA-A α2-subunit, and in addition to the previously described constructs S47TAG, S272TAG, S309TAG, S343TAG, positions S398TAG, K494TAG and S741TAG were tested for tetrameric GluK2 due to their rectangular positioning. All positions were selected to be at unstructured, extracellular regions of the pentameric GABA-A receptor (PDB-ID 6HUG) or homotetrameric GluK2 receptor (PDB-ID 5KUF). The generated click mutants were tested for ncAA incorporation and labeling efficiency in HEK293T cells (FIGS. 21A and 21B).

TCO*-L-lysine (TCO*A) reacts with tetrazine-dyes in an ultrafast, specific, and bioorthogonal inverse electron-demand Diels-Alder reaction and allows thus efficient site-specific labeling of receptors with one, two, and four Me-Tet-Cy5 dyes, respectively, with minimal linkage error. While the distances between the two fluorophores in the α2-subunits of GABA-AS181TAG is ~5 nm, the interfluorophore distances in the tetrameric GluK2S398TAG is ~7 nm (FIGS. 3A-3C and FIGS. 21A-21B). Hence, dSTORM cannot resolve the different fluorophores and the resulting images display homogenous distributions of the receptors with no indications of clustering or different labeling stoichiometry (FIGS. 3A-C and FIGS. 22A-22C). Photoswitching fingerprint analysis of the receptor signals recorded in dSTORM experiments shows that the number of on-events and the lifetime of the off-states are unequivocally different reflecting the different number of fluorophores present per membrane receptor. On average ~7 and ~15 on-events (median) for singly (γ2) and double (α2) labeled GABA-A receptors were detected, respectively, and ~33 on-events (median) for the fourfold labeled GluK2 receptor (FIG. 3D). Hence, the number of on-events contains information about the number of fluorophores present per spatially unresolvable area (e.g. the receptor stoichiometry) even though the fluorophores are separated by less than 10 nm. This result reports most impressively that site-specific TCO*A incorporation into subunits of multimeric proteins by GCE followed by bioorthogonal click labeling with tetrazine-dyes enables quantitative labeling of protein sites separated by only a few nanometers.

The temporal evolution of localizations (on-events) detected per frame displays that energy transfer between the on- and off-states of the four Cy5 fluorophores in the GluK2 receptor results in shortening of the off-state lifetime and correspondingly more frequent blinking during the first minutes of irradiation (FIG. 3E) similar to the observation for the 6 and 3 nm DNA origami (FIG. 1G). For the single and double labeled GABA-A receptor unequivocal differences in the temporal evolution of localizations (FIG. 1E) demonstrating that energy transfer from an on- to a single off-state is difficult to identify in SMLM data at an interfluorophore distance ~5 nm could not be detected. In the presence of three possible acceptors (GluK2), however, energy transfer to the off-state and repopulation of the on-state can be easily identified (FIG. 1E). To explore if energy transfer between the on- and off-state can be detected, time-resolved fluorescence experiments were again performed. FLIM images of HEK293T cells in photoswitching buffer clearly demonstrated that the singly labeled γ2 GABA-A receptor exhibits a monoexponential lifetime of ~1.85 ns independent of the irradiation intensity whereas GluK2 receptors exhibit a shorter fluorescence lifetime because of energy transfer from the trans on- to the off- and cis state (FIG. 3F and FIGS. 23A-23B). FLIM images of the double-labeled α2 GABA-A receptor are, in accordance with the photoswitching fingerprint analysis (FIGS. 1D and 1E), less conclusive confirming that energy transfer from an on- to a single off-state remains difficult to identify even by time-resolved fluorescence spectroscopy (FIG. 3F and FIGS. 23A-23B).

This impression is also supported by average fluorescence decays (FIGS. 23A-23B). Here, both the average fluorescence decays of α2 GABA-A and GluK2 exhibit multiexponential character with short fluorescence lifetime components of ~0.65 ns and ~0.75 ns and amplitudes of ~0.16 and ~0.38, respectively (FIG. 3G). This means that energy transfer between two Cy5 separated by ~5 nm gives maximally raise to the appearance of a 650 ps component in the fluorescence decay with a small amplitude. On the other hand, energy transfer between four Cy5 separated by ~7 nm causes a slightly longer lifetime component of ~750 ps but with higher amplitude and is thus easier to detect.

Discussion of Sub-10 nm Super-Resolution Fluorescence Imaging in Cells

Since in dSTORM experiments only a single fluorophore is expected to reside in the on-state per diffraction-limited area, being cycled between its singlet-ground and first excited singlet-state for several milliseconds, fluorophore interactions have been presumed to play a negligible role. Hence, a direct relation between fluorophore interactions and image resolution in SMLM experiments is not given. However, as disclosed herein dipole-dipole induced energy transfer between the on-state and off-state of fluorophores accelerates photoactivation resulting in faster repopulation of the on-state, and in combination with other additional energy transfer pathways from the trans on-state of cyanine dyes to the cis and triplet state, in fast blinking. Such fast switching events are elusive in dSTORM experiments because samples are usually irradiated at high intensity for a time to turn the majority of fluorophores into their off-state before data acquisition. Due to this premature photobleaching, the localization probability decreases substantially with decreasing interfluorophore distance in the sub-10 nm range. The energy transfer efficiency is controlled by the acceptor concentration, i.e. the number of fluorophores residing in the off-, cis and triplet state. Since these states are populated via the excited state of fluorophores, the observed energy transfer efficiency depends critically on the irradiation intensity (FIGS. 18A-18C and FIGS. 23A-23B). The effects described are unavoidable in dSTORM experiments if sub-10 nm spatial resolutions are to be achieved because of the required high labeling density.

The influence of these energy transfer pathways on the achievable spatial resolution in the sub-10 nm range has so up to now not been perceived by the superresolution fluorescence imaging community. Or to be precise, near-field fluorophore interactions that decrease the localization probability of fluorophores separated by less than 10 nm have so far not been considered. The resulting lower image quality sparked a debate about the potential of new structured illumination SMLM methods for molecular resolution imaging but the contradiction between localization precision and localization probability remained enigmatic. The disclosed findings herein are also applicable to quantitative SMLM approaches. Since photoswitchable fluorophores can switch multiple times between the on- and off-state before they permanently photobleach repeated localizations from the same fluorophore are detected, which complicates quantifying numbers of molecules. Multiple methods have been developed to correct for blinking-caused artifacts to enable quantification of SMLM data. However, all previous approaches rely on interfluorophore distance independent photoswitching kinetics of fluorophores to group localizations that likely come from the same fluorophore. Thus, the results disclosed herein identify a new ability of quantitative SMLM at high labeling densities with interfluorophore distances in the 10 nm range and sub-10 nm range.

Near-field interactions of fluorophores can also be advantageous for developing a completely new approach to reveal the number of fluorophores and their interfluorophore distance in the sub-10 nm range. The analysis bases on the finding that the information about the number of fluorophores present and their interfluorophore distance is encoded in their photoswitching fingerprints. The number of on-events gives directly the number of fluorophores provided the temporal resolution of the experiment is high enough to resolve fast blinking processes. The distance can be derived from the off-state lifetime of the fluorophores (FIGS. 1E and 3D), the temporal evolution of detected localizations (FIGS. 1G and 3F), the photon antibunching signature (FIG. 15) and the fluorescence lifetime of the fluorophores (FIGS. 2G, 2I-2K, 3F, 3G and FIGS. 19, 20, and 23a-23B). Since all these processes are strongly controlled by the excitation efficiency, reduction of the irradiation intensity slows down the blinking kinetics and enhances the probability to accurately analyze the photoswitching fingerprints but simultaneously decreases the fluorescence intensity in the on-state and thus the localization precision (FIGS. 18A-18C). Since rhodamine and oxazine dyes also enter off-states that absorb at shorter wavelengths and can be photoactivated, photoswitching fingerprint analysis must not remain limited to the red spectral range. The simpler photophysics, i.e., the absence of trans/cis isomerization can potentially simplify data analysis.

The data herein demonstrates that GCE and site-specific incorporation of ncAAs into proteins followed by click-labeling volunteers as a method for biological superresolution microscopy in the sub-10 nm range because of the virtually quantitative labeling efficiency. Anticipating photoswitching fingerprint analysis of endogenous proteins, a potential limitation of GCE with ncAAs is the overexpression of the protein of interest. However, new emergent genome editing tools such as CRISPR/Cas9 might enable site-specific incorporation of ncAAs into endogenous proteins. Furthermore, orthogonal ribosomes in combination with quadruplet codons will contribute significantly to reduce suppression of endogenous amber codons and improve GCE efficiency, and therefore enable quantitative insertion of multiple ncAA into the protein of interest. The results herein demonstrate that energy transfer between identical fluorophores (e.g. between the trans and cis state and on- and off-state) can be used to determine the interfluorophore distance. Hence two or more identical (or substantially identical) ncAAs can be incorporated at different sites into the same protein or multiprotein complex. Bioorthogonal click-labeling with the same fluorophore in combination with time-resolved single-molecule fluorescence spectroscopy can then be used advantageously for distance measurements akin to standard FRET investigations.

The disclosure of fast blinking as a result of energy transfer between on- and off-states of fluorophores provides guidance how to further improve sub-10 nm fluorescence imaging. For example, GCE and bioorthogonal click labeling in combination with confocal fluorescence lifetime dSTORM and photoswitching fingerprint analysis are superresolution microscopy method for imaging in the 10 nm range and sub-10 nm range. One possibility to avoid the acceleration of photoswitching rates and accumulation of dyes in the on-state are the use of DNA-PAINT where only one imager strand is present per 10 nm area simultaneously during the experiments, or fluorophores whose switching mechanism is independent of irradiation, e.g. spontaneously blinking dyes such as the Si-rhodamine dye HMSiR. Their use in refined SMLM methods might thus represent the method of choice to improve the localization probability and thus enable reliable sub-10 nm fluorescence imaging. However, HMSiR exhibits pH-dependent blinking properties and lower localization precision. DNA-PAINT achieves a higher spatial resolution than dSTORM (FIG. 1C and FIG. 8) but requires site-specific labeling with docking strands with a length of ~10 DNA bases. Another possibility to avoid energy transfer between adjacent fluorophores is to expand the sample before imaging. Post-labeling expansion microscopy combined with SMLM may improves the labeling efficiency and reduces the linkage error.

Use of Fluorophores in Imaging

Generally, fluorophores (fluorescent dyes, including organic dyes to differentiate against fluorescent proteins) are hydrocarbon molecules having a chain of several conjugated double bonds. The absorption and emission wavelengths of a dye are approximately proportional to the number of carbon atoms in the conjugated chain. One fluorescent dye for single-molecule localization microscopy (SMLM) by direct stochastic optical reconstruction microscopy (dSTORM) is the cyanine dye Cy5 and/or its homologue Alexa Fluor 647 or other chemically related cyanine dyes. These dyes show well-suited blinking (photoswitching) in so-called photoswitching buffers, which is used in SMLM. Other fluorescent dyes can be used with the methods and devices of the present disclosure, including rhodamine and silicon-rhodamine dyes that show similar blinking in photoswitching buffers. Photoswitching buffers are buffers that reduce or oxidize the fluorescent dye in its excited singlet or triplet state. In addition, fluorescein dyes and oxazine dyes as well as Bodipy-dyes are useful for time-resolved photoswitching fingerprint analysis. All fluorescent dyes useful for the invention have to be able to enter a non-fluorescent (so-called) off-state in photoswitching buffer whose absorption is, albeit only minimally, in resonance with its fluorescence emission. That is, a fluorescent dye residing in its fluorescent on-state can excite another fluorescent dye residing in its off-state and thus promote recovery of the on-state.

These dyes could be used in combination with genetic code expansion (GCE) for the site-specific labeling of proteins or protein complexes or aggregates with unnatural amino acids and similar or identical fluorescent dyes (using bioorthogonal click chemistry). Photoswitching fingerprint analysis and or time-resolved single-molecule fluorescence spectroscopy and imaging, respectively, can then be used to determine the number of fluorescent dyes and their distances. Using different incorporation sites of the unnatural amino acids the method can be useful to determine the three-dimensional structure of the protein or protein complex and/or to determine the distance between two positions.

The methods and devices of the present disclosure can also be used to generate interfluorophore distance maps, i.e. by analyzing the photoswitching fingerprint in a SMLM image pixel-wise. Hence, (high fluorophore density) sites with sub-10 nm fluorophore distances can be visualized in SMLM images. Accordingly, the method can be used to monitor molecular interactions of proteins, lipids, carbohydrates, e.g. aggregation associated with the onset of e.g. neurodegenerative diseases, by labeling monomers with fluorescent dyes and time-resolved analysis of photoswitching fingerprints.

Supplementary Discussion of Sub-10 nm Super-Resolution Fluorescence Imaging in Cells Further details and examples of methods and devices of the present disclosure are presented and discussed below:

1. Materials and Methods 1.1 Design, Hybridization and Quality Control of DNA-Origami Structures In this example, DNA-origami rectangle structures were designed with caDNAno 2.2.0. Stability calculations of the origami designs were performed using CanDO. All dye/TCO modified staple strands were ordered at biomers.net GmbH, whereas all biotinylated strands were ordered at SigmaAldrich Inc. All unmodified staple strands were ordered at Merck KGaA. The phage M13mp18 derivat DNA type p7560 was used as scaffold DNA (tilibit nanosystems, M1-32). Hybridization was done by mixing 10 nM scaffold DNA with 15× surplus of unmodified staple strands and 30× surplus of modified staple strands in hybridization buffer, consisting of 5 mM Tris(hydroxymethyl)aminomethane (TRIS) (Merck, 1.08382.2500), 5 mM sodium chloride (NaCl) (Sigma, S5880-1 KG), 1 mM ethylene diamine tetraacetic acid (EDTA) (Sigma, E1644-250G) and 12 mM magnesium chloride (MgCl2) (AppliChem, A4425,0500) using a ThermoCycler (C1000 Thermal Cycler, BioRad) with a linear thermal gradient of −1° C./min from 90° C. to 4° C. For DNA-PAINT Origami, trans-cyclooctene modified staple strands were used. These origami structures were incubated with a 10 fold surplus of docking strand 5'-modified with methyl-tetrazine (5'-3': TTA TAC ATC TA, biomers.net) per TCO-staple for 2 h at 4° C. after hybridization. The hybridized samples were purified by electrophoresis in a 1.5% agarose gel (Sigma, A9539-500G) in 1×TBE buffer, consisting of 4.5 mM TRIS (Merck, 1.08382.2500), 4.5 mM boric acid (Merck, K1898765) und 10 mM EDTA (Sigma, E1644-250G) and 0.5×TBE with 12 mM MgCl2 (AppliChem, A4425,0500) as running buffer. After melting the agarose with a microwave, the solution was cooled down to ~60° C. until adding 12 mM MgCl2 (AppliChem, A4425, 0500). The gel was poured shortly thereafter. A small amount (~10 μL) of a sample was picked as reference, which was mixed with 2 μL intercalating dye (Safe-Green™, Applied Biological Materials Inc., G108-G). A small amount of pure scaffold as well as pure staple strands were mixed in hybridization buffer and used as references. These solutions were also mixed with intercalating dye. The rest of the hybridized Origami samples were not mixed with intercalating dye. All samples were mixed with loading dye, consisting of 10 mM TRIS (Merck, 1.08382.2500), 60% glycerol (v/v) (Merck, 1.37028.1000) und 0.03% bromophenol blue (w/v) (Carl Roth, T116.1). Electrophoresis was done at 70 V, using a programmable DC voltage source (PowerPac™ Basic, BioRad), for ~2 h in water/ice bath. The part of the gel including the references were cut across the length of the gel and the bands marked at an UV transilluminator (UST20M-8E, INTAS). Afterwards, the marked gel was combined with the not illuminated part of the gel, containing the DNA-origami structures not mixed with intercalating dye. Not illuminated DNA-origamis were cut out according to the high of the marked references. The extracted gel parts were divided by cutting several times and purified via Freeze N' Squeeze columns (Freeze N' Squeeze, 7326165, BioRad) according to the manufacturer instructions using a benchtop centrifuge (Biofuge fresco, Heraeus) at 13.000 g. For all measurements, the DNA-origami were produced freshly on the same day of the measurements.

The shape and the quality of the purified DNA-origami structures were checked via transmission electron microscopy (JEM 1011, JEOL) and negative staining of the samples. Therefore, carbon coated 100 Mesh TEM-grids were used and glowed freshly. The prepared grids were incubated with 15 μL sample solution for 2 minutes. Afterwards the solution was peeled of using a filter paper. The grid was dipped into a 0.75% uranyl acetate solution (EMS, 22400) and peeled of immediately. This step was repeated 4 times until the grid was incubated with 0.75% uranyl acetate solution (EMS, 22400) for 45 seconds. The solution was peeled of and air-dried.

1.2 DNA Origami Sequences

All dye modified staple sequences were also ordered unmodified.

| Start | End | Sequence (5'-3') | modification |
|---|---|---|---|
| 10[7] | 8[16] | CGAATTCGCCGGGTACCGATAGCATGTCAATCTACCTCGA | |
| 1[56] | 3[79] | GTGGATGTTCTTCTAAGTGGTTGTATATCCCATAATCGGC | |
| 9[184] | 11[175] | TATAACTACTTAGGTTGGGCACAAGAATTGAGAGAGACTA | |
| 17[184] | 19[175] | GTGAGTGAATAAATCAATAGAAACGTCACCAATACCTTTT | |
| 14[71] | 18[74] | ATAAATCAAGTACCTTTAATTGCTTTCGGT | 3'-TCO/Cy5 (9 nm) |
| 27[8] | 27[7] | ATGGTGGTAGAATAGCCCGAGATACCTGTTTG | |
| 23[48] | 20[56] | AACTGGCTCATTATACAATCAGGT | |
| 22[71] | 25[74] | CATAGTAAAGTATTAAGAG | 3'-TCO/Cy5 (9 nm) |
| 2[159] | 1[151] | GACGACAATAAACAACGAGCCAGT | |
| 21[80] | 16[88] | AATACTGCAAACGAGAATCACCGGAACCAGAGTATAACAG | |

-continued

| Start | End | Sequence (5'-3') | modification |
|---|---|---|---|
| 31[16] | 20[24] | AATAAAGAACGTGGACTCCCTTAT | |
| 25[80] | 20[88] | GACTCCTCACAGTTAAAAGAAAAATCTACGTTAGTTCAGA | |
| 26[167] | 29[183] | GGAGGTTTCGTAACGATCTAAAGTTTTGTTAA | |
| 13[24] | 10[8] | GTACCAAAGATGAACGGTAATCGTAAAACGCT | |
| 22[63] | 20[48] | GAGCAACACTATCATATAATAGTACTTTACCC | |
| 8[175] | 11[167] | CAAATCCAATCGCAAGTAGGTCTG | |
| 25[75] | 27[79] | GCTGACATTACCCGCTGGCTG | |
| 6[167] | 9[183] | TATTCTAAGCTAATATCAGAGAGATAACCTTA | |
| 25[88] | 22[80] | AAGAGAAGATAACGCCAAAAGGAA | |
| 25[120] | 21[127] | CAGTACCATTAGGAATACCACATTATCTGACAGGAGGTTG | |
| 13[88] | 10[84] | CAGTATGTTTTTTGAGAGAT | 3'-TCO/Cy5 (6 nm) |
| 30[47] | 32[24] | AGACTTTTGGCTACAGCAGCATCGGAACGAGGTCCAACGT | |
| 19[112] | 16[120] | CTCCCTCAGAGCCGCCACTAAAGT | |
| 28[183] | 28[184] | TTCAGGTTTTACATCGGGAGAAACGTAGATT | |
| 21[184] | 23[175] | AAACATCAGAAGATGATGAAGCCAGAATGGAATTCATTTC | |
| 25[24] | 22[8] | TTGGGCTTCGACGATAAAAACCAAAATAGACC | |
| 30[39] | 32[48] | TCATGAGGAATTCGACAACTCGTATTAAATCCGCGAAAGA | |
| 5[88] | 2[80] | GTGCATCTCTGAACAAGAAAAATA | |
| 31[80] | 28[88] | CCAAAAGGAGCCTTTACATGTTAC | |
| 24[175] | 27[167] | ACAAAATCGCGCAGAGTACAGTAA | 5' biotin |
| 26[143] | 31[135] | GAACCGCCCGTAACACTGTAGCATTCATCGCCGAATTTCT | |
| 14[7] | 12[16] | AAGTGTAAGAGCCGGAAGCAGCTAAATCGGTTCGCTCACA | |
| 17[88] | 14[80] | TAAGAGGTTAATAGTAGTAGCATT | |
| 14[111] | 17[101] | GGAAGGTAAATATTACCATTTT | |
| 21[24] | 19[15] | CAAAAGAATCAAATATCGCGTTTTAATTCCCTTAATGAAT | |
| 33[56] | 28[48] | TTTGCCCGTTTTCACGAGGACTAAGAAAGAGGAAGGGAAC | |
| 14[159] | 12[144] | TTTACCAGCGCCAAAGACGCAAAGAAGCCCTT | |
| 29[56] | 25[63] | CAAAAGAAGTAACAAAGCTGCTCACTCTGAAACATGAA | |
| 13[184] | 15[175] | AAGCGCTCGATAGCTTAGATCAATAGAAAATCCCTTAGA | |
| 20[175] | 23[167] | TACATTTAACAATTTCGCGAATTA | |
| 29[152] | 24[144] | ATAGTTAGAGTACCGCCACCCTCACGAGAGGGTACAGGAG | |
| 17[24] | 15[15] | AACCAGACCAATAAAGCCTCAGAGCATAAATAGTGCCTAA | |
| 3[144] | 0[152] | AGCCGTTTTTATTTTCTTCTTACC | |
| 5[24] | 3[15] | GAACAAACAGGGTTTTCCCAGTCACGACGTCTTGGGCACG | |
| 33[0] | 32[16] | TTGAGGATTTAGAAGTATTAGACTCAAAGGGC | |
| 6[83] | 7[79] | GCACCCAGCTACGCGTCTTT | |
| 23[16] | 20[24] | CCCTTCACCGCCTGGCAGAGGCGG | |
| 9[102] | 10[102] | AAGCATTAGACCGGAGAGGG | 3'-TCO/Cy5 (6 nm) |
| 11[16] | 6[16] | TGTTTCCTGTGTGCTTGTATATGTACGTGAGCGAGTAACAAC | |

-continued

| Start | End | Sequence (5'-3') | modification |
|---|---|---|---|
| 29(88) | 26[80] | CCCCAGCGACAAGAACCGGATATT | |
| 5[56] | 2[48] | GTCACGTTTACGAGCAAAGGCGAT | |
| 15[48] | 12[53] | GTTTAGCTATATTTTCGAAGAGAAGCC | |
| 9[56] | 6[48] | CAAAAACACCTGAATCAGCCAGCT | |
| 2[155] | 5[143] | CTAATGCATCAGGAAGATCGCACT | 3'-Cy5 (18 nm) |
| 29[24] | 26[8] | ACTACGAATGCCCTGACGAGAAACACCAGCAG | |
| 21(88) | 18[80] | GGAATCGTCGTTTTCATCGGCATT | |
| 31[144] | 28[152] | TTGATACCGATAGTTGTACAAACT | |
| 22[39] | 25[48] | TTACCAGAGAGATGGTTTAATTTCA | 3'-TCO/Cy5 (9 nm) |
| 17[120] | 13[119] | TAATTGCTCAACCGATTGAGGGAGTACATACA | |
| 26[111] | 29[111] | GCCACCACCCTCATTGATTATACCAAGCGCGA | |
| 18[101] | 21[111] | GTAGCGCATAAATATTCATTGA | |
| 15[112] | 12[117] | TCATTAAAGGTGAATTAGATAGCCGAA | 5' biotin |
| 6[135] | 9[143] | TCCCGACTACACCCTGAACAAAGT | |
| 26[7] | 24[16] | GCGAAAATGTTTGCCCCAGAACGAGTAGTAAAAGTTGCAG | |
| 11[8] | 11[7] | GTCATAGCATTCCACACAACATACTAATCATG | |
| 33[88] | 29[87] | AGTAACATAGGAACAACTAAAGGATCTTTGAC | |
| 33[24] | 30[8] | TTACAAACAAGTTTCCATTAAACGGGTAATGT | |
| 3[16] | 0[24] | AATATAGGGGCCTTGACGCCCTGG | |
| 31(48) | 28[56] | AGGCTTTGTTGAAAATTCAATCAT | |
| 16[79] | 19[79] | CAATTCTGCGAACGAGTCTTTTCATAATCAAA | |
| 1[16] | 0[0] | AAACGACGAGTGACTCTATGATACCGACAGTG | |
| 4[43] | 7[135] | AGCTTTCCGGCACCGCCCAATCCA | |
| 28[111] | 31[103] | AATCCGCGACCTGCTCATTGTATC | |
| 22[111] | 27[111] | CAACTAATGAACTAACCCTTGAGTAACAGTGCATCTTTTCAGGGATAG | |
| 22[7] | 20[16] | AGTGAGACTTTTTCTTTTCCGAGAGGCTTTTGTTTGCGTA | |
| 21[56] | 18[48] | AAATGTTTTTATTAGCGATTAAGA | 3'-TCO/Cy5 (18 nm/9 nm) |
| 3[96] | 5[102] | TCCAAGAAGATAAGTCGCCAGTT | 3'-Cy5 (3 nm) |
| 5[120] | 2[112] | TATCGGCCGAACGCGCCTGTTTAT | |
| 24(79) | 27[71] | TGCCCCCTGCCTATTTGCGCATAG | |
| 1[24] | 3[47] | GCCAGTGCCAAGCTTTCTCAGGAGTAAGTTGGAAGGGGGA | |
| 7[144] | 4[144] | ACGATTTTTTGTTTAAATCGTAGGAATCAGCC | |
| 3[118] | 0[120] | AGTACCGCACAGGGCTTA | |
| 5[48] | 0[56] | TGGGATAGGCGGCGGTTGTGCTGCTGTAGAAACAAAATAA | |
| 31[168] | 32[152] | TACCATATCTGAATAATGGAAGGGCGCCGACA | |
| 7[16] | 4[24] | GGGCTTAAGCTACGTGATCGGCTG | |
| 30[143] | 32[120] | GGATTTTGTAAACAGCAACCATCGCCCACGCATAACCGAT | |
| 9[80] | 4[88] | AAATATTTGCATTAAACCAGAGCCTAATTTGCCGCCATTC | |

-continued

| Start | End | Sequence (5'-3') | modification |
|-------|-----|------------------|--------------|
| 16[184] | 16[184] | GCTTCTGTATCCTTGAAAACATAGATAACCTT | |
| 13[120] | 8[112] | TAAAGGTGAGCTGATAAATTAATGCGGGAGAAATAAAAAC | |
| 2[39] | 7[47] | GTAACGCCGGCGGATTGACCGTAATTCATCAACGTCTGGC | |
| 1[120] | 3[143] | TGTAATTTAGGCAGAGGCATTTTCATGTTCAGAACAAGCA | |
| 4[15] | 1[15] | CACATAAATCATTTCTCTCGTCGGGTAAGCAACGGCCCTGCCATTGTA | |
| 1[80] | 3[71] | GAATTCATGTCAACCTTATGACAATGTCCCGCCCAATCAA | |
| 18[135] | 21[143] | GCGACAGAAGGCAGGTCAGACGAT | |
| 22[143] | 25[143] | CCACATCAGTTGAGATGGCGGATAAGTGCCGT | |
| 7[104] | 11[103] | AAATAAACAGGGAAGCTATTTTGTAAGGGTGA | |
| 18[39] | 23[47] | GAAAGACTGTTTTGCCAGAGGGGGACCCTCTTATTTTAAG | |
| 21[152] | 17[159] | ATATTCACTCGATAGCAGCACCGTCTCATCACCAGTAGCA | |
| 8[55] | 4[56] | TAACCAATCTTCCTGTTTACCAACCGATCGGT | |
| 22[167] | 25[183] | AGCGCAGTAGTATAGCCCGGAATAGGTGTTCG | |
| 11[128] | 15[135] | CCATCAATATGATAATTTTAAGAAAAGTAAGCATCACCGT | |
| 26[135] | 29[143] | ACCCTCAGGATTTGTATCCACAGA | |
| 5[184] | 7[175] | ATCTTCTGTTTTAGTTAATAAGGCTTATCCGGCGCGAGAA | |
| 9[120] | 6[112] | TTAACTGATGCGGGAGGTTTTGAA | 3'-TCO/Cy5 (3 nm) |
| 28[175] | 31[167] | TAACGTCAGATGAATATTAGAACC | |
| 8[47] | 11[39] | AGGAACGCCATCAAAAAAATTTTT | |
| 14[39] | 19[47] | AAATTAAGCGGAAGCAAACTCCAAGGAAGCCCCGGATTGC | |
| 4[47] | 7[39] | CTTCGCTATTACGCCAATAATTCG | 5' biotin |
| 28[87] | 24[88] | TTAGCCGGACCTTCATCAAGAGTACCGTATAA | |
| 5[112] | 3[117] | GACGACAGCCGGAAACAAACCA | 5'-TCO/Cy5 (3 nm) |
| 18[127] | 16[112] | ATCAAGTTTGCCTTTATTAGAGCTACGGTGTC | |
| 1[88] | 3[111] | GCGCACGACTTAAGTGTTTAACAACAACAATACGGGTATT | |
| 25[152] | 21[151] | TTGATATACTCTGAATTTACCGTTTGGCCTTG | |
| 8[183] | 8[184] | TGCTGATGAACTTTTTCAAATATATATGTAAA | |
| 4[79] | 7[71] | CAACTGTTGGGAAGGGGCTAACGA | |
| 2[167] | 5[183] | GTCCAGACTAGCAAGCAAATCAGATATAGTTC | |
| 20[15] | 19[7] | TTGGGCGCCAGGGTGGAGCTGCAT | |
| 30[79] | 32[56] | ATTGCGAAAAAAGGCTTTTGCGGGATCGTCAGGGTCAGCA | |
| 22[103] | 25[111] | GCAGATACGATTAGGATTAGCGGG | |
| 7[112] | 4[120] | AGCCATATTATTTATCTTCTGGTG | |
| 31[112] | 28[120] | AGCTTGCTTTCGAGGTTGATAAAT | |
| 26[71] | 29[79] | AAATCAACTACACTAAAACACTCA | |
| 20[79] | 23[71] | ATGACCATAAATCAAACAGTCAGG | |
| 30[103] | 32[112] | GAATAGAATATCATTTTGCGGAACAAAGAAACATATTCGG | |
| 23[8] | 23[7] | GCTGATTGCAAGCGGTCCACGCTGGGGCAACA | |

-continued

| Start | End | Sequence (5'-3') | modification |
|---|---|---|---|
| 12[52] | 8[56] | TTTATCATATATTTTAAATGCTCATTTTT | |
| 16[23] | 12[24] | GCGTTGCGTGAGTGAGCTAACTCATTGTTATC | |
| 30[7] | 28[16] | TCCAGTTTGGGTTGAGTGTAATACGTAATGCCAAATCAAA | |
| 10[143] | 13[143] | AACATTCAACCGTTCTGCAACATATAAAAGAA | |
| 10[39] | 15[47] | AGAGAATCAACATTATGACCCTGT | |
| 24[52] | 27[39] | ATTTTAATCATTGTGAATTACGAAAGAGG | |
| 4[175] | 7[167] | TTGAAATACCGACCGTACAAAGAA | 5' biotin |
| 27[48] | 24[53] | ACGGTGTACAGACCAGCGGAACCTATT | 5' biotin |
| 32[183] | 33[191] | TTATACTTCAAAATTATTTGCACGTGTTTGGAATCCTGAT | |
| 6[143] | 8[128] | AGCGAACCAATAAGAAAGCAGCCTTTACAGAG | |
| 10[63] | 9[55] | TTGCCTGAGAGTCTGGAAAAGCCC | |
| 1[112] | 0[96] | CGCCAACAATTGAGAATCGCCATATCCTTAGT | |
| 13[80] | 8[88] | TTATTACGGCAATAATGTAGGTAAAGATTCAATAAAATTC | |
| 14[47] | 19[39] | AATTAGCAAATAACCTATTAGATACATTTCGCAAGCAAAG | |
| 18[7] | 17[23] | GTCGTGCCCAGTCGGGAAAGAGCTTCAAAGCG | |
| 12[116] | 8[120] | CAAAGGGAGACAGTCAAATCAAGAATAAC | |
| 28[119] | 24[117] | TGTGTCGACAAGCCCAATAGGAACTTTAACGGGGT | |
| 20[151] | 16[144] | CCGCCACCCCTCAGAGCCACCACTAGAGCCAGCAAAAC | |
| 30[71] | 32[80] | TAATAATTAACGTTATTAATTTTAAAAGTTTGAGGCCGCT | |
| 5[103] | 6[102] | TGAGGGGACGCCTTAAATC | 3'-TCO/Cy5 (18 nm/6 nm/3 nm) |
| 10[71] | 15[79] | TCAGGTCAGCATGATTAAGACTCCAACATCCACGCGAGCT | |
| 12[183] | 12[184] | TCAATAGTCCCTTTTTAACCTCCGGGAGAAGAG | |
| 20[47] | 23[39] | TGACTATTATAGTCAGCTTATGCG | |
| 19[16] | 16[24] | CGGCCAACGCGCGGGGCATTAAATT | 5' biotin |
| 24[183] | 24[184] | ACCAAGTTATTACCTGAGCAAAACTTTGAAT | |
| 17[80] | 12[88] | CCTTTTGATTGATTCCGAAAAGGTGGCATCAAGAGGAAAC | |
| 23[128] | 27[135] | AGGTAGAAAGATTGTATGTACTGGTAATAAGTCCATGTAC | |
| 27[144] | 24[152] | TGAGTTTCGTCACCAGTTTGATGA | |
| 18[14] | 20[128] | AATCAGTAAACCGCCAAGAACCACCACCAGAG | |
| 16[15] | 15[7] | CTCACTGCCCCGCTTTCAGCCTGGG | |
| 29[184] | 30[179] | AGAAATTGTAAAACAGAAACG | |
| 18[167] | 21[183] | TGAAACCAAAACAAATAAATCCTTCATTAAAC | |
| 10[83] | 11[79] | CTACAAAGGCTAAAGTAATGT | |
| 19[48] | 16[48] | ATCAAAAAGTTTGCCATAGATTTAGTTTGACC | |
| 9[152] | 5[159] | AATTGAGCGAACGCGAGGCGTTTTCCATTACCGCGCCCAA | |
| 8[79] | 11[71] | TTTTTGTTAAATCAGCAATGCCTG | |
| 4[111] | 7[103] | CAGGCAAAGCGCCATTCAGTTACA | |
| 23[144] | 20[152] | AGCGTCATACATGGCTCCTCAGAG | |

-continued

| Start | End | Sequence (5'-3') | modification |
|-------|-----|------------------|--------------|
| 26[48] | 31[39] | ATTCAGTGAACAGATGACGAACTGACCAACTTTGTAGCAAC | |
| 4[183] | 4[184] | TTAATGGTTAAAATAAGAATAAACAACCTAAAT | |
| 11[144] | 8[152] | GAAATAGCAATAGCTACGTCAAA | |
| 18[73] | 23[79] | CATAGCCCCCAGACTGGATAGCGTCCTTACGAGGACGTTGGG | |
| 14[135] | 17[143] | GCGACATTGAATATAATGCTGTAG | |
| 25[184] | 27[175] | CCTGATTGCAATAACGGATATCACCGTACTCACAGTACCT | |
| 13[152] | 8[144] | ACACCACGAATAATAAGAGCAAGACAGAGGGTATGAAAAT | |
| 10[47] | 15[39] | AGCAAACAAGAACCCTTTCAACGCAAGGATAAAAATGGTC | |
| 19[104] | 23[103] | GGAACCGCCTCAAATGCTTTAAACAATAAAAC | |
| 26[39] | 29[47] | ATAAGGCTGGCACCAACCTAAAAC | |
| 1[48] | 3[39] | AAGCCAGGCCCCGCTTCTAATCTATTTACGCTGCTGGCGA | |
| 6[151] | 3[135] | AGTATAAAGCCAACGCTCAACAGTTCATCGAG | |
| 27[16] | 24[24] | TCCGAAATCGGCAAAACCTGAGAG | |
| 30[178] | 33[183] | TCTTTCCAGACGTTAGTAAAGATGATGGCAATTCATCAATATA | |
| 1[152] | 1[183] | AATAAGAGAATATAAAGTACCGACAAAAGATT | |
| 5[80] | 0[88] | TCGTAACCAGGCTGCGTGTCTTTCCTTATCATGCTGAATT | |
| 0[191] | 3[175] | AAGCCTGTACTAGAAACCGGAATCATAGTAAAGTAATTCTTAAGGCGT | |
| 6[101] | 13[111] | AAGATTAACGTTTAGCTATAGCAAACGTAGAAAA | |
| 14[143] | 19[135] | ACAAAAGGCACCGACTATGTTTTAAATATGCAACCCTCAG | |
| 0[183] | 3[167] | TTAGTATCATATGCGTTATACAAAGTGATAAA | |
| 16[175] | 19[167] | AAATCGTCGCTATTAAATTTGAAT | |
| 2[71] | 5[79] | TCCTAATTGGTGTAGATGGGCGCA | |
| 30[135] | 32[144] | CTAAACAAGGAGCGGAATTATCATCATATTCCATGACAAC | |
| 10[167] | 13[183] | TTAAGCCCGAATAAGTTTATTTTGTCACAATT | |
| 6[39] | 9[47] | CATTAAATCCCGGTTGATAATCAG | |
| 7[8] | 7[7] | AGTAAACATAAAGACGGAGGATCCGTGTAATG | |
| 11[104] | 12[96] | GAAAGGCCTTACCAGAAGGAAACC | |
| 29[120] | 25[119] | ACAACGGAAACCGCCACCCTCAGAGTTTTGCT | |
| 12[175] | 15[167] | GAATTTATCAAAATCATTAATTTT | |
| 30[111] | 32[88] | CGGAGTGAGGTTTATCTCGCTGAGGCTTGCAGGGAGTTAA | |
| 33[152] | 28[144] | TGATTATCATGAATTTTCTGTATGCAGCCCTCACAACGCC | |
| 17[102] | 18[102] | TGCGGATGGCGCGTCAGACT | 3'-TCO/Cy5 (18 nm) |
| 24[116] | 20[112] | CAGTGGGAACAACATTATTACCCCGCCGCCAGCATCCC | |
| 12[79] | 15[71] | AACGGAATACCCAAAAATTTGGGG | |
| 31[8] | 31[7] | AGTCCACTGAAAAACCGTCTATCAGGAACAAG | |
| 28[79] | 31[71] | AACGAGGCGCAGACGGCTCCAAAA | |
| 6[15] | 4[16] | CCGTCCCTCCTGGTTGCCGAACTCTGAGGATTCTCCGTGGACGCATTT | |
| 15[144] | 12[152] | TGAGCCATTTGGGAATTCTTACCG | |
| 9[88] | 6[84] | AAATTGTAAGTTGCTATTTT | 3'-TCO/Cy5 (6 nm) |

-continued

| Start | End | Sequence (5'-3') | modification |
|-------|-----|------------------|--------------|
| 17[48] | 12[63] | CAGGTCAGGATTAGAGTACAGGCAAGGCAAAGAATACTTTTGCGGCTG | |
| 20[183] | 20[184] | AAATTAATTTAATGGAAACAGTACAGAAAACA | |
| 15[96] | 19[103] | TTCTGACGGAAATTATTGGAAGTTTCATTCCACCACCACC | |
| 33[120] | 29[119] | CACCAGAACTTTCAACAGTTTCAGAACAAAGT | |
| 14[167] | 17[183] | TCATATGGCCATTACCATTAGCAAGGCCGTAT | |
| 6[71] | 9[79] | AATTTTATGGAAGATTGTATAAGC | |
| 10[7] | 8[16] | CGAATTCGCCGGGTACCGATAGCATGTCAATCTACCTCGA | |
| 1[56] | 3[79] | GTGGATGTTCTTCTAAGTGGTTGTATATCCCATAATCGGC | |

1.3 Single Molecule DNA Origami Surface Preparation

For the preparation of DNA-Origami single-molecule surfaces, 8 chambered cover glass systems with high performance cover glass (Cellvis, C8-1.5H-N) were used. The surfaces were washed once with PBS (Sigma-Aldrich, D8537-500ML) prior treatment with 2% Hellmanex (Hellma, 9-307-011-4-507) for 1 hour. After washing the chambers three times with PBS (Sigma-Aldrich, D8537-500ML), the surfaces were incubated with 1 M KOH (Fulka, 06005) for 20 min. After alkaline treatment, the chambers were washed with PBS (Sigma-Aldrich, D8537-500ML). Afterwards, the surfaces were incubated with 10% polyethylenlyglycol 400 (Fulka, 81170) over night at 4° C. Afterwards, the surfaces were rinsed 3 times with PBS (Sigma-Aldrich, D8537-500ML) before incubating the chambers with 0.5 g/l BSA-Biotin (ThermoFisher, 29130) in PBS) overnight at 4° C. In the following, the chambers were washed three times with PBS (Sigma-Aldrich, D8537-500ML) before incubation with 0.5 g/l Neutravidin (ThermoFisher, 31050) in PBS (Sigma-Aldrich, D8537-500ML) for 20 min. The surfaces were washed three times with PBS (Sigma-Aldrich, D8537-500ML) and incubated with purified DNA-Origami solution, 1:5 diluted in PBS (Sigma-Aldrich, D8537-500ML)+ 50 mM MgCl2 (AppliChem, A4425,0500) for 10 min. The prepared samples were washed at least three times in PBS (Sigma-Aldrich, D8537-500ML)+50 mM MgCl2 (AppliChem, A4425,0500) prior to imaging.

1.4 Cell Culture

HEK-293-T cells (German Collection of Microorganisms and Cell Cultures, Braunschweig, Germany; #ACC635) were maintained in T25-culture flasks (Thermo Fisher, Cat. Nr. 156340) in Dulbeccos's Modified Eagle's Medium (DMEM, Sigma-Aldrich, #D5796) supplemented with 10% FCS (Sigma-Aldrich, #F7524), and 1% Pen-Strep (Sigma-Aldrich, #P4333)

1.5 Plasmid Constructs

All plasmids were amplified by transformation to E. coli XL1—Blue followed MIDI-prep DNA isolation and sequencing (Nucleobond®, Xtra Midi, Macherey & Nagel, #740410). The plasmid for the expression of clickable α2 subunit of the GABA-A receptor was obtained from Addgene (Addgene #49169). The superecliptic pHluorin tag was removed by introducing a XhoI restriction site upstream of the GABA-A coding sequence and subsequent cutting with XhoI-XhoI. The plasmids for the expression of the GABA-AR β1 and γ2 subunits were provided by Andrea Barberis. The plasmid for the expression of clickable GluK2 were provided by Peter Seeburg. The amber stop mutants of GluK2, GABA-AR α2 and GABA-AR γ2 subunits were generated by introducing a TAG stop codon via PCR-based site-directed mutagenesis of the vectors using custom designed primers (Sigma) and Q5 High-Fidelity DNA Polymerase (New England BioLabs). The plasmid for the expression of the tRNA/aminoacyl transferase pair (pCMV tRNAPyl/NESPylRSAF, herein termed PylRS/tRNAPyl) were provided by Edward Lemke. The plasmid for the expression of the tRNA/aminoacyl transferase pair (pNEU-hMbPylRS-4xU6M15, herein termed PylRS/4xtRNAPyl) was provided by Irene Coin (Addgene, #105830).

1.6 Transfection of HEK293T Cells

Transfection of HEK293T cells was carried out using the JetPrime Transfection Reagent (Polypus, #114-01) according to manufacturer instructions. HEK293T cells were seeded on 4-well Lab-Tek II chambered glass slides (Nunc, cat. no. 155409) coated with 0.5 mg/mL poly-D-Lysine (Sigma-Aldrich, #P6407) the day before transfection. At 70-85% confluency the cells were transfected. Transfection of GluK2 receptors was carried out with 500 ng GluK2 and 500 ng pCMV NES-PylRSAF/tRNAPyl per well. GABA-A receptor subunits were transfected at the following ratio with a total amount of 1750 ng DNA per well: 500 ng α2 subunit, 500 ng β1 subunit, 250 ng γ2 subunit and 500 ng pCMV NES-PylRSAF/tRNAPyl. Additionally, the cells were fed the unnatural amino acid TCO*-A (SiChem, SC-8008) supplemented to the cell media. Therefore, the TCO*-A was diluted 1:4 with 1M HEPES (pH 8.0) and added at a final concentration of 250 μM to the cells. Transfected cells were maintained in an incubator with 5% CO2 at 37° C. for 24 h (GluK2) or 48 h (GABA-AR) depending on transfected constructs and subsequently labeled with fluorophores.

1.7 Bioorthogonal Click Labeling of Receptors

Transfected HEK-293T expressing the TCO*-A modified GluK2, or GABA-A α2 or GABA-A γ2 receptor subunits were labeled with 3 μM tetrazine coupled fluorophores H-Tet-Cy5 (Jena Bioscience, #CLK-015-05) in cell growth medium for 60 min on ice. Then, cells were washed three times with ice-cold PBS. Next, fixation was carried out with 4% formaldehyde and 0.25% glutaraldehyde for 15 minutes at room temperature. Following fixation, cells were again washed three times with PBS and subsequently imaged at the dSTORM setup.

1.8 dSTORM and DNA-PAINT Imaging

Super-resolution imaging was performed using an inverted wide-field fluorescence microscope (IX-71; Olympus). For excitation of Cy5, a 641 nm diode laser (Cube 640-100C, Coherent), in combination with a clean-up filter (Laser Clean-up filter 640/10, Chroma) was used. The laser beam was focused onto the back focal plane of the oil-immersion objective (60×, NA 1.45; Olympus). Emission light was separated from the illumination light using a dichroic mirror (HC 560/659; Semrock) and spectrally filtered by a bandpass filter (FF01-679/41-25, Semrock). Images were recorded with an electron-multiplying CCD camera chip (iXon DU-897; Andor). Pixel size for data analysis was measured to 128 nm. For dSTORM measurement, 120,000 images with an exposure time of 5 ms (frame rate 200 Hz) and irradiation intensity of ~5 kW cm$^{-2}$ were recorded. Single-molecule surfaces were imaged by EPI illumination, whereas prepared cells were imaged by TIRF illumination. dSTORM experiments were performed in PBS-based photoswitching buffer containing 100 mM β-mercaptoethylamine (MEA, Sigma-Aldrich) and 50 mM MgCl2 (AppliChem, A4425,0500) for DNA—Origami measurements, or without MgCl2 for receptor imaging, adjusted to pH 7.6.

For each DNA-PAINT measurement, 18,000 images with an exposure time of 100 ms (frame rate 10 Hz) were recorded. Single-molecule DNA-Origami surfaces were imaged by total internal reflection illumination, excited with a 561 nm diode laser (Genesis MX561-500 STM, Coherent) at an irradiation intensity of ~1.5 kW cm$^{-2}$ in combination with a clean-up filter (Laser Clean-up filter 561/14, Chroma). Emission light was separated from the illumination light using a dichroic mirror (FF403/497/574-Di01; Semrock) and spectrally filtered by a bandpass filter (Bright-LineHC-607/70, Semrock). DNA-PAINT experiments were performed at 5 nM imager-strand concentration (5'-3': CTA GAT GTA T, biomers.net), 5'-modified with Cy3B, in PBS-based buffer containing 5 mM TRIS (Merck, 1.08382.2500), 50 mM MgCl2 (AppliChem, A4425,0500), 1 mM EDTA (Sigma, E1644-250G) and 0.05% Tween20 (ThermoFisher, 28320) adjusted to pH 7.6. All SMLM results were analyzed with rapidSTORM3.3 and the highly resolved pictures were reconstructed with ThunderSTORM. The localization precisions were then calculated according to a suitable method.

For photoswitching fingerprint analysis only fluorescent spots containing more than 500 (dSTORM)/6000 (DNA-PAINT) photons per frame were analyzed. To estimate the number of localizations per fluorophore, the tracking function (Kalman filter) of rapidSTORM3.3 was used. Fluorescent spots were tracked over the whole image stack (120,000 frames for dSTORM and 18,000 frames for DNA-PAINT) within a tracking radius of 150 nm. The information was saved as tracked localization file. A custom written python script was used to calculate the number of frames of consecutive localizations per spot (on-time) as well as the number of frames between on-time events of the same fluorescent spot within the defined tracking radius (off-time). In addition, also the average number of photons detected per frame as well as the number of on-time events per tracked spot was calculated.

1.9 Fluorescence Lifetime Intensity Trajectories

All fluorescence lifetime measurements concerning single-molecule trajectories and photon antibunching measurements were performed on a MicroTime200 (PicoQuant, Berlin, Germany) time-resolved confocal fluorescence microscope setup consisting of a FLIMbee galvo scanner (PicoQuant, Berlin, Germany), an Olympus IX83 microscope including an oil-immersion objective (60×, NA 1.45; Olympus), 2 single photon avalanche photodiodes (SPAD) (Excelitas Technologies, 75154 K3, 75154 L6) and a Time-Harp300 dual channel board. For pulsed excitation a white-light laser (NKT photonics, SuperK extreme) was coupled into the MicroTime200 system via a glass fiber (NKT photonics, SuperK FD PM, A502-010-110). A 100 μm pinhole was used for all measurements. The emission light was split onto the SPADs using a 50:50 beamsplitter (Pico-Quant, Berlin, Germany). To filter out after glow effects of the SPADs used as well as scattered and reflected light, 2 identical bandpass filters (ET700/75 M, Semrock, 294808) were installed in front of the SPADs. The measurements were performed and analyzed with the SymPhoTime64 software (PicoQuant, Berlin, Germany). Measurements were performed with an irradiation intensity of ~0.5-2.5 kW cm$^{-2}$ in T3 mode with 25 ps time-resolution, whereas all photon antibunching measurements were performed in T2 mode. For photon antibunching experiments, the Sync cable was disconnected and replaced by the SPAD 2 cable. For analyzing the fluorescence lifetime of the trajectories, the decay parameters were determined by least-squares deconvolution, and their quality was judged by the reduced χ2 values and the randomness of the weighted residuals (χ2=~1). In the case that a monoexponential model was not adequate to describe the measured decay, a multiex-ponential model was used to fit the decay ($\tau av = \tau 1 a 1 + \tau 1 a 1$). For reference structures and 18 nm DNA-origamis monoexponential fluorescence decay was measured.

1.10 Photon Antibunching Measurements

Photon antibunching experiments take advantage of the fact that the probability of emitting two consecutive photons drops to zero for a single emitter for time intervals shorter than the excited-state lifetime. After photon emission, a molecule must be re-excited and wait, on average, one fluorescence lifetime before another photon can be emitted. For sufficiently short laser pulses the number of photon-pairs detected per laser pulse in photon antibunching experiments can be used to determine whether the emission is from one or more independently emitting quantum systems. As expected for dSTORM experiments where only a single fluorophore is expected to reside in the on-state per DNA origami, the ratio of the number of photon pairs detected in the central peak at delay time zero to the average number in the lateral peaks in the interphoton-time (coincidence) histograms is <0.20 demonstrating the presence of a single emitter in the confocal laser focus with low background contributions. This result shows that although increased photoactivation at interfluorophore distances of <10 nm transfers fluorophores from the off- to the on-state the probability for two fluorophores residing simultaneously in the on-state showing independent fluorescence emission is negligible. Even if two fluorophores are simultaneously in the on-state, other energy transfer processes such as homo energy transfer and single-singlet annihilation can occur so that the on-state is dominated by the emission of a single fluorophore. The data in the interphoton time histograms can be quantified for the purpose of determining the number of independent emitters by determining the ratio of the number of photons in the central peak, Nc, to the average number in the neighboring lateral peaks, Nl,av. Ensemble antibunching measurements show that the number of photon pairs detected in the neighboring peaks decreases at large inter-photon times but is nearly constant for very short times, i.e., in the first neighboring peaks. For determination of Nl,av, the average number of events in the nearest 8 peaks, 4 to each side of the zero-time peak, was used.

1.11. Time-Correlated Single Photon Counting (TCSPC)

Measurements take place in a 0.3 mm path-length fluorescence cuvette (Hellma, 105.251-QS) on a FluoTime 200 time-resolved spectrometer (PicoQuant, Berlin, Germany) in combination with a pulsed diode laser (635 nm) as the excitation source with a SepiaII module (PicoQuant, Berlin, Germany), a PicoHarp300 TCSPC module and picosecond event timer (PicoQuant, Berlin, Germany) (80 MHZ, 50 ps pulse length, 8 ps resolution, 10.000 photons in the maximum channel). The results were analyzed with the FluoFit 4.4.0.1 software (PicoQuant, Berlin, Germany). To exclude polarization effects, fluorescence was observed under an angle (54.7°). The decay parameters were determined by least-square deconvolution, and their quality was judged by the reduced $\chi 2$ values.

The described embodiments and examples of the present disclosure are intended to be illustrative rather than restrictive, and are not intended to represent every embodiment or example of the present disclosure. While the fundamental novel features of the disclosure as applied to various specific embodiments thereof have been shown, described and pointed out, it will also be understood that various omissions, substitutions and changes in the form and details of the devices illustrated and in their operation, may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiment of the disclosure may be incorporated in any other disclosed or described or suggested form or embodiment as a general matter of design choice. Further, various modifications and variations can be made without departing from the spirit or scope of the disclosure as set forth in the following claims both literally and in equivalents recognized in law.

Throughout the specification, where compositions are described as including components or materials, it is contemplated that the compositions can also consist essentially of, or consist of, any combination of the recited components or materials, unless described otherwise. Likewise, where methods are described as including particular steps, it is contemplated that the methods can also consist essentially of, or consist of, any combination of the recited steps, unless described otherwise. The invention illustratively disclosed herein suitably may be practiced in the absence of any element or step which is not specifically disclosed herein.

The practice of a method disclosed herein, and individual steps thereof, can be performed manually and/or with the aid of or automation provided by electronic equipment. Although processes have been described with reference to particular embodiments, a person of ordinary skill in the art will readily appreciate that other ways of performing the acts associated with the methods may be used. For example, the order of various steps may be changed without departing from the scope or spirit of the method, unless described otherwise. In addition, some of the individual steps can be combined, omitted, or further subdivided into additional steps.

The invention claimed is:

1. A method for imaging cells, the method comprising:

transfecting one or more cells with one or more plasmids to form transfected one or more cells;

labeling the transfected one or more cells with a dye;

exciting the dye with an energy source, wherein the dye is configured to emit an emission light;

imaging one or more portions of the transfected one or more cells with a sensor, for a predetermined exposure time, a plurality of times to form a plurality of images;

classifying each image of the plurality of images into a first group of images above a predetermined threshold for a number of photons per image or a second group of images below the predetermined threshold the number of photons per image;

analyzing the first group of images to track locations of the one or more portions for each of the first group of images and to track a fluorescence trajectory of each photon in the first group of images;

determining an inside number of images of the first group of images within the predetermined tracking radius and an outside number of images of the first group of images external to the predetermined tracking radius;

applying a pulsed, excitation light energy to the transfected one or more cells;

measuring an emission energy from the excited, transfected one or more cells; and determining whether the emission energy is from one or more independently emitting quantum systems based on the measured emission, the tracked locations of the first group of images and the fluorescence trajectory.

2. The method of claim 1, wherein the dye is selected from the group consisting of a cyanine dye, a rhodamine dye, a silicon-rhodamine dye, fluorescein dyes, oxazine dyes, Bodipy-dyes, and combinations thereof.

3. The method of claim 1, wherein the dye is selected from the group consisting of Cy5, Alexa Fluor 647.

4. The method of claim 1, wherein the dye is labeled by direct covalent site-specific attachment of an organic dye to a protein of interest, which can be achieved by genetic code expansion (GCE) incorporating a non-canonical amino acids (ncAAs) into the one or more cells that can be labeled by bioorthogonal click chemistry.

5. The method of claim 1, wherein the energy source excites the dye with an irradiation intensity of about 1.5 KW cm$^{-2}$ to about 5 KW cm$^{-2}$.

6. The method of claim 1, wherein the predetermined exposure time is about 5 ms (frame rate 200 Hz) to about 100 ms (frame rate 10 Hz).

7. The method of claim 1, wherein the plurality of times is about 18,000 times to about 120,000 times.

8. The method of claim 1, wherein the locations of the one or more portions, for each of the first group of images are tracked within a predetermined tracking radius of about 150 nm.

9. The method of claim 1, wherein an irradiation intensity of the pulsed, excitation light is about 0.5 kW cm$^{-2}$ to about 2.5 kW cm$^{-2}$.

10. A system configured to image one or more cells, the system comprising:
  a holder configured to receive dye labeled, transfected one or more cells;
  an energy source configured to excite the dye of the dye labeled, transfected one or more cells;
  an imaging sensor configured to image one or more portions of the dye labeled, transfected one or more cells, for a predetermined exposure time, a plurality of times to form a plurality of images;
  an excitation light energy source configured to apply a pulsed, excitation light energy to the dye labeled, transfected one or more cells;
  an emission energy sensor configured to measure an emission energy from the excited, transfected one or more cells; and
  a processor comprising hardware, the processor configured to:

classify each image of the plurality of images into a first group of images above a predetermined threshold for a number of photons per image or a second group of images below the predetermined threshold the number of photons per image;
analyze the first group of images to track locations of the one or more portions for each of the first group of images and to track a fluorescence trajectory of each photon in the first group of images;
determine an inside number of images of the first group of images within the predetermined tracking radius and an outside number of images of the first group of images external to the predetermined tracking radius; and
determine whether the emission energy is from one or more independently emitting quantum systems based on the measured emission, the tracked locations of the first group of images and the fluorescence trajectory.

11. The system of claim 10, wherein the dye is selected from the group consisting of a cyanine dye, a rhodamine dye, a silicon-rhodamine dye, fluorescein dyes, oxazine dyes, Bodipy-dyes, and combinations thereof.

12. The system of claim 10, wherein the dye is selected from the group consisting of Cy5, Alexa Fluor 647.

13. The system of claim 10, wherein the dye is labeled by direct covalent site-specific attachment of an organic dye to a protein of interest, which can be achieved by genetic code expansion (GCE) incorporating a non-canonical amino acids (ncAAs) into the one or more cells that can be labeled by bioorthogonal click chemistry.

14. The system of claim 10, wherein the energy source excites the dye with an irradiation intensity of about 1.5 KW cm$^{-2}$ to about 5 KW cm$^{-2}$.

15. The system of claim 10, wherein the predetermined exposure time is about 5 ms (frame rate 200 Hz) to about 100 ms (frame rate 10 Hz).

16. The system of claim 10, wherein the plurality of times is about 18,000 times to about 120,000 times.

17. The system of claim 10, wherein the locations of the one or more portions, for each of the first group of images are tracked within a predetermined tracking radius of about 150 nm.

18. The system of claim 10, wherein an irradiation intensity of the pulsed, excitation light is about 0.5 kW cm$^{-2}$ to about 2.5 kW cm$^{-2}$.

* * * * *